(12) United States Patent
Tan et al.

(10) Patent No.: US 8,643,822 B2
(45) Date of Patent: Feb. 4, 2014

(54) NON-ETCHED FLAT POLARIZATION-SELECTIVE DIFFRACTIVE OPTICAL ELEMENTS

(75) Inventors: Kim Leong Tan, Singapore (SG); David M. Shemo, Windsor, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 530 days.

(21) Appl. No.: 12/852,105

(22) Filed: Aug. 6, 2010

(65) Prior Publication Data

US 2011/0027494 A1 Feb. 3, 2011

Related U.S. Application Data

(63) Continuation-in-part of application No. 12/166,988, filed on Jul. 2, 2008, now abandoned.

(60) Provisional application No. 61/232,313, filed on Aug. 7, 2009, provisional application No. 60/947,690, filed on Jul. 3, 2007.

(51) Int. Cl.
*G02F 1/13* (2006.01)
*G02F 1/1337* (2006.01)

(52) U.S. Cl.
USPC .......................................... 349/202; 349/129

(58) Field of Classification Search
USPC .................. 349/129, 194, 201, 202, 191
See application file for complete search history.

(56) References Cited

U.S. PATENT DOCUMENTS

| | | | |
|---|---|---|---|
| 3,633,999 A | 1/1972 | Buckles | 359/577 |
| 3,843,231 A | 10/1974 | Borel et al. | 349/202 |
| 4,511,220 A | 4/1985 | Scully | 359/495 |
| 4,850,682 A | 7/1989 | Gerritsen | 349/201 |

(Continued)

FOREIGN PATENT DOCUMENTS

| | | | |
|---|---|---|---|
| EP | 1286188 | 2/2003 | G02B 5/28 |
| EP | 2012173 | 1/2009 | G02F 1/1334 |

(Continued)

OTHER PUBLICATIONS

D.C. O'Brien and R.J. Mears, "Computer generated holograms optimized for illumination with partially coherent light using a silicon backplane spatial light modulator as the recording device," *Proc. SPIE*, 1505, pp. 32-37, 1991.

(Continued)

*Primary Examiner* — Edward Glick
*Assistant Examiner* — Dennis Y Kim
(74) *Attorney, Agent, or Firm* — Matthew A. Pequignot; Pequignot + Myers LLC

(57) ABSTRACT

A method of fabricating an optical element including a liquid crystal layer having a spatially-varying tilt angle includes coating a substrate with a linearly photopolymerizable polymer layer, irradiating the linearly photopolymerizable polymer layer with linearly polarized ultra-violet light at a oblique angle, and coating a layer of liquid crystal material on a surface of the irradiated linearly photopolymerizable polymer layer. The liquid crystal material has a predetermined relationship between its tilt angle and a total dose of the linearly polarized ultra-violet light. The linearly photopolymerizable polymer layer is irradiated with at least one dose of linearly polarized ultra-violet light that is sufficient to induce formation of a plurality of discrete regions within the liquid crystal layer having a larger in-plane birefringence than an adjacent or surrounding region.

24 Claims, 37 Drawing Sheets

(56) References Cited

U.S. PATENT DOCUMENTS

| | | | |
|---|---|---|---|
| 4,878,742 A * | 11/1989 | Ohkubo et al. | 349/201 |
| 5,032,009 A | 7/1991 | Gibbons et al. | 349/124 |
| 5,107,357 A | 4/1992 | Cassarly et al. | 349/202 |
| 5,122,888 A | 6/1992 | Iizuka et al. | 349/200 |
| 5,389,698 A | 2/1995 | Chigrinov et al. | 522/2 |
| 5,499,126 A | 3/1996 | Abileah et al. | 349/106 |
| 5,534,386 A | 7/1996 | Petersen et al. | 430/320 |
| 5,548,427 A | 8/1996 | May | 349/117 |
| 5,578,351 A | 11/1996 | Shashidhar et al. | 428/1.23 |
| 5,859,682 A | 1/1999 | Kim et al. | 349/124 |
| 5,877,876 A * | 3/1999 | Birdwell | 349/39 |
| 5,930,012 A | 7/1999 | Mears et al. | 359/15 |
| 6,046,787 A | 4/2000 | Nishiguchi | 349/129 |
| 6,118,586 A | 9/2000 | Tanabe et al. | 359/566 |
| 6,122,023 A | 9/2000 | Chen et al. | 349/86 |
| 6,124,920 A | 9/2000 | Moseley et al. | 349/201 |
| 6,141,361 A | 10/2000 | Mears et al. | 372/20 |
| 6,226,066 B1 | 5/2001 | Reznikov et al. | 349/124 |
| 6,288,762 B1 * | 9/2001 | Sasaki et al. | 349/129 |
| 6,300,991 B1 * | 10/2001 | Schadt et al. | 349/124 |
| 6,304,312 B1 | 10/2001 | Tanabe et al. | 349/201 |
| 6,323,984 B1 | 11/2001 | Trisnadi | 359/245 |
| 6,369,377 B1 | 4/2002 | Shih et al. | 250/225 |
| 6,417,905 B1 | 7/2002 | Woo et al. | 349/124 |
| 6,479,218 B1 * | 11/2002 | Choi | 430/321 |
| 6,496,239 B2 | 12/2002 | Seiberle | 349/98 |
| 6,496,287 B1 | 12/2002 | Seiberle et al. | 359/15 |
| 6,538,775 B1 * | 3/2003 | Bowley et al. | 359/3 |
| 6,577,429 B1 | 6/2003 | Kurtz et al. | 359/279 |
| 6,630,289 B1 | 10/2003 | Kwok et al. | 430/321 |
| 6,721,025 B2 | 4/2004 | Woo et al. | 349/124 |
| 6,734,936 B1 * | 5/2004 | Schadt et al. | 349/117 |
| 6,747,781 B2 | 6/2004 | Trisnadi | 359/279 |
| 6,867,834 B1 * | 3/2005 | Coates et al. | 349/119 |
| 6,876,417 B1 | 4/2005 | Seiberle et al. | 349/124 |
| 6,943,930 B2 | 9/2005 | Mi et al. | 359/247 |
| 6,947,368 B2 | 9/2005 | Hendriks et al. | 369/112.26 |
| 6,988,811 B2 | 1/2006 | Leidig et al. | 362/19 |
| 7,120,107 B1 | 10/2006 | Takahashi et al. | 369/112.12 |
| 7,128,426 B2 | 10/2006 | Watanabe | 353/122 |
| 7,130,258 B2 | 10/2006 | Hendriks et al. | 369/112.01 |
| 7,184,385 B2 | 2/2007 | Hendriks | 369/112.08 |
| 7,215,383 B2 | 5/2007 | Hannah et al. | 348/615 |
| 7,304,719 B2 | 12/2007 | Albert et al. | 355/71 |
| 7,375,784 B2 | 5/2008 | Smith et al. | 349/129 |
| 7,399,084 B2 | 7/2008 | Morikawa et al. | 353/31 |
| 7,413,311 B2 | 8/2008 | Govorkov et al. | 353/34 |
| 7,413,317 B2 | 8/2008 | Solomon et al. | 362/19 |
| 7,583,341 B2 * | 9/2009 | Umeya | 349/117 |
| 8,243,251 B2 * | 8/2012 | Yokoyama | 349/201 |
| 2002/0163694 A1 | 11/2002 | Mears et al. | 398/87 |
| 2003/0142378 A1 | 7/2003 | Mears et al. | 359/15 |
| 2003/0206337 A1 | 11/2003 | Liang et al. | 359/352 |
| 2004/0212790 A1 | 10/2004 | Leidig | 355/2 |
| 2005/0128380 A1 * | 6/2005 | Zieba et al. | 349/96 |
| 2005/0140837 A1 | 6/2005 | Crawford et al. | 349/2 |
| 2005/0213212 A1 | 9/2005 | Ooi et al. | 359/495 |
| 2005/0248705 A1 * | 11/2005 | Smith et al. | 349/124 |
| 2006/0194000 A1 | 8/2006 | Schadt et al. | 428/1.1 |
| 2006/0203164 A1 | 9/2006 | Silverstein et al. | 349/117 |
| 2006/0203302 A1 | 9/2006 | Hendriks et al. | 358/484 |
| 2006/0239171 A1 | 10/2006 | Ooi et al. | 369/112.16 |
| 2007/0020404 A1 | 1/2007 | Seiberle et al. | 428/1.2 |
| 2007/0076150 A1 * | 4/2007 | Hale et al. | 349/117 |
| 2008/0204847 A1 | 8/2008 | Kamm et al. | 359/238 |
| 2009/0009668 A1 | 1/2009 | Tan et al. | 349/1 |
| 2009/0257106 A1 | 10/2009 | Tan et al. | 359/279 |
| 2010/0224796 A1 * | 9/2010 | Mertz et al. | 250/459.1 |
| 2010/0260030 A1 * | 10/2010 | Tao et al. | 369/112.02 |

FOREIGN PATENT DOCUMENTS

| | | | | |
|---|---|---|---|---|
| JP | 2001174614 | | 6/2001 | G11B 11/105 |
| WO | WO 9852077 | | 11/1998 | G06K 19/06 |
| WO | WO 2008087575 | | 7/2008 | G02B 27/48 |

OTHER PUBLICATIONS

S.T. Warr nd R.J. Mears, "Polarization insensitive operation of ferroelectric liquid crystal crossbar devices," *Electron. Lett.*, 31, pp. 714-716, 1995.

S. Hashimoto et al., "SXRD (Silicon X-tal Reflective Display): A new display device for projection displays," *SID 05 Digest*, pp. 1362-1365, 2005.

V.G. Chigrinov et al., "New developments in liquid crystal photoaligning by azo-dyes," *SID 06 Digest*, pp. 1253-1256, 2006.

M. Schadt, H. Seiberle, A. Schuster and S.M. Kelly, "Photo-generation of linearly polymerized liquid crystal aligning layers comprising integrated optical patterned retarders and color filters," *Jpn. J. Appl. Phys.* Part 1, 34, pp. 3240-3249, 1995.

K.L. Tan et al., "Dynamic holography for optical interconnections. II. Routing holograms with predictable location and intensity of each diffraction order," *J. Opt. Soc. Am. A*, 18(1), pp. 205-215, 2001.

L. Wang et al., Speckle reduction in laser projection systems by diffractive optical element, Appl. Opt. 37, pp. 1770-1775, 1998.

J.I. Trisnadi, "Speckle contrast reduction in laser projection displays," in Projection Displays VIII, Proc. SPIE 4657, M H Wu, Editor (Soc. Photo-Opt. Instru. Engrs., Bellingham, WA, 2002), pp. 131-137.

H. Seiberle et al. "Photo-Aligned Anisotropic Optical Thin Films" *Journal of the Society for Information Display—SID Society for Information Display, ISSN*: 1071-0922, pp. 87-92, Jan. 2004.

H. Seiberle et al., "38.1: Invited Paper: Photo-Aligned Anisotropic Optical Thin Films", SID International Symposium, Baltimore, Maryland, vol. XXXIV, p. 1162, May 2003.

European Search Report from corresponding EP application No. 08159278.4.

European Search Report from corresponding EP application No. 10171889.8.

* cited by examiner (a)      (b)

(Prior-art)

NON-ETCHED FLAT POLARIZATION-SELECTIVE DIFFRACTIVE OPTICAL ELEMENTS

CROSS-REFERENCE TO RELATED APPLICATIONS

This application claims the benefit of priority of U.S. Provisional Appl. No. 61/232,313 filed Aug. 7, 2009, which is hereby incorporated by reference. In addition, this application is a continuation-in-part of U.S. patent application Ser. No. 12/166,988 filed Jul. 2, 2008, now abandoned which claimed priority from U.S. Provisional Appl. No. 60/947,690 filed Jul. 3, 2007, both of which are also hereby incorporated by reference.

MICROFICHE APPENDIX

Not Applicable.

TECHNICAL FIELD

The present application relates generally to liquid crystal (LC) layers having a spatially-varying tilt angle, and in particular, to a method for creating liquid crystal polymer (LCP) having a spatially-varying LCP tilt angle, to optical elements created with the same, and to applications of the LCP.

BACKGROUND OF THE INVENTION

Diffraction gratings and more complex thin holograms, encoded onto programmable liquid crystal (LC)-based spatial light modulators (SLMs), have been actively researched as a way to alter the wavefront of an optical beam. For example, these LC/SLMs may be used for adaptive-optic phase correction, in a synthetic phase array, or in a telecommunication beam steering switch. The LC/SLMs are based typically on either a transmissive or reflective type micro-display panel in order to provide the small pixel pitch requirement. LCs with both in-plane (e.g., such as in-plane-switching (IPS) using nematic LC and ferroelectric LC) and out-of-plane (e.g., planar or parallel aligned (PA) and vertical aligned (VA) nematic LC) rotation of LC director are utilized. The ferroelectric LC (FLC) will be polarization insensitive if the hologram is configured with two phase levels. Polarization insensitivity can be important for systems where the light source has unknown or scrambled polarization, such as for a beam-steering switch used in telecommunication networks. On the other hand, since out-of-plane switching nematic LCs (e.g., PA and VA nematic LC) are known to be polarization sensitive, holograms recorded onto these LC/SLMs generally require a known polarization. Accordingly, these types of LC holograms are typically only useful in optical systems and instrumentation where the light sources are polarized.

Although programmable thin holograms encoded onto LC/SLMs are very versatile, these active components are not cost effective for many applications. In addition, these programmable thin holograms are known to provide relatively small steering angles. For example, a state-of-the art LC on Silicon (LCoS) panel may have less than 10 μm pixel pitch, which at a wavelength of 0.5 μm and utilizing a minimum of two pixels per grating period, provides a maximum beam deflection angle of about 1.4 degrees. All other programmable hologram output (e.g., termed the replay) will have even smaller deflection angles.

Nevertheless, there has been interest in forming passive diffraction gratings or holograms based on these active device. For example, in U.S. Pat. No. 6,304,312, a diffraction grating is formed by injecting liquid crystal monomer between two transparent substrates, each of which is coated with an alignment layer. In one example, the alignment layer is uniform and the diffraction grating is effected by applying a voltage to patterned electrodes provided on the transparent substrates. In another example, the diffraction grating is effected with a patterned alignment layer (e.g. patterned using a photolithography technique). After the liquid crystal layers are aligned, they are then polymerized and/or cross-linked to fix the alignment. Note that the liquid crystal polymer pixels in this reference are limited to having either homeotropic alignment (i.e., perpendicular to the substrate) or planar alignment (i.e., parallel to the substrate). The resulting binary grating (e.g., having a pitch of about 8 μm) is reported to provide only about forty percent diffraction efficiency.

More recently, patterned photo-alignment layers having an even smaller pixel pitch (e.g., 1 μm or shorter) have been proposed. For example, in U.S. Pat. No. 7,375,784 a micropatterned alignment layer is disclosed. While the alignment layer is limited to having only homeotropic alignment (i.e., perpendicular to the substrate) and planar alignment (i.e., parallel to the substrate), the liquid crystal may be aligned with a range of out-of-plane angles. More specifically, local alignment of the liquid crystal is stated to be determined by the average areas of underlying homeotropic alignment and planar alignment regions. Unfortunately, since the alignment of the liquid crystal is related to an average of different regions it cannot be patterned with precision and thus, is not suitable for many applications.

In fact, in order to optimize precision and cost effectiveness, most applications requiring passive holograms use diffractive optical elements with physical steps. Unfortunately, the etching and/or molding processes used to form these diffractive optical elements are relatively complex and time consuming. In addition, the surface relief structure generally requires complex optical thin-film coating processes to protect the delicate structures.

SUMMARY OF THE INVENTION

The instant invention relates to a method of forming optical components having LCP layers with a spatially varying tilt angle, such as diffraction gratings and/or more complex holograms. The instant invention also provides optical components including LCPs with a spatially varying tilt angle, and systems including said optical components.

In accordance with one aspect of the instant invention there is provided a method of fabricating an optical element comprising: a) coating a substrate with a linearly photopolymerizable polymer layer; b) irradiating the linearly photopolymerizable polymer layer with linearly polarized ultra-violet light at a oblique angle; and, c) coating a layer of liquid crystal material on a surface of the irradiated linearly photopolymerizable polymer layer, wherein the liquid crystal material has a predetermined relationship between its tilt angle and a total dose of the linearly polarized ultra-violet light, and wherein the linearly photopolymerizable polymer layer is irradiated with at least one dose of linearly polarized ultra-violet light selected to induce an out-of-plane tilt of the liquid crystal directors in the liquid crystal material to vary with transverse spatial coordinate.

In accordance with one aspect of the instant invention there is provided a method of fabricating an optical element including a liquid crystal layer having a spatially-varying tilt angle, the method comprising the steps of: a) coating a substrate with a linearly photopolymerizable polymer layer; b) irradiating the linearly photopolymerizable polymer layer with linearly polarized ultra-violet light at a oblique angle; and, c) coating a layer of liquid crystal material on a surface of the irradiated linearly photopolymerizable polymer layer, wherein the liquid crystal material has a predetermined relationship between its tilt angle and a total dose of the linearly polarized ultra-violet light, and wherein the linearly photopolymerizable polymer layer is irradiated with at least one dose of linearly polarized ultra-violet light that is sufficient to induce formation of a plurality of discrete regions within the liquid crystal layer having a larger in-plane birefringence than an adjacent region.

In accordance with another aspect of the instant invention there is provided a method of fabricating a polarization-selective diffractive optical element comprising: irradiating an alignment layer at oblique angle through a photo-mask with linearly polarized UV light; coating a liquid crystal layer on the irradiated alignment layer, the liquid crystal layer including a liquid crystal polymer precursor; irradiating the liquid crystal layer to form a liquid crystal polymer film, the liquid crystal polymer film including a plurality of liquid crystal directors aligned parallel to a first plane, the first plane perpendicular to a surface of the liquid crystal polymer film, an out-of-plane tilt of the plurality of liquid crystal directors varying with transverse spatial coordinate in a predetermined pattern, the predetermined pattern selected such that the liquid crystal polymer film forms a polarization-selective phase hologram, whereby linearly polarized light having a first polarization is transmitted through first and second spatially distinct regions of the liquid crystal polymer film with a relative phase delay to provide a non-zeroth order diffraction output, and linearly polarized light having a second polarization is transmitted through the first and second spatially distinct regions with substantially zero relative phase delay to provide a zeroth order diffraction output, the first polarization parallel to the first plane, the second polarization orthogonal to the first polarization, the first region including a first liquid crystal director, the second region including a second liquid crystal director, the first and second liquid crystal directors having different out-of-plane tilts.

BRIEF DESCRIPTION OF THE DRAWINGS

Further features and advantages of the present invention will become apparent from the following detailed description, taken in combination with the appended drawings, in which:

FIG. 1b is a plan-view of the LC hologram shown in FIG. 1a;

FIG. 2b is a plan-view of the LC hologram shown in FIG. 2a;

It will be noted that throughout the appended drawings, like features are identified by like reference numerals.

DETAILED DESCRIPTION

Figure 1A:
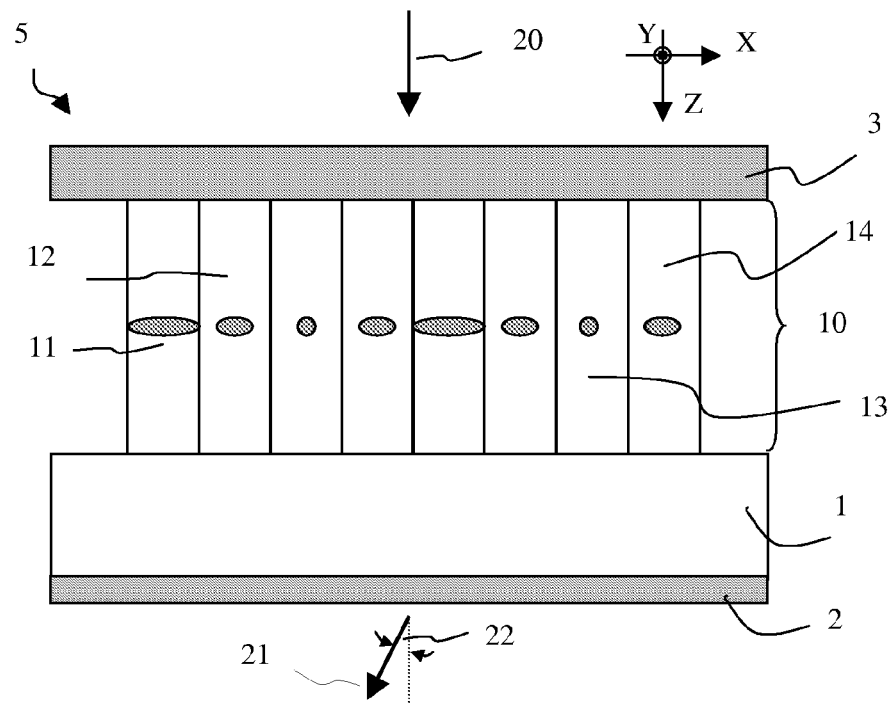
FIG. 1a is a side-view of index indicatrix projection of a prior art LC hologram with azimuthal angle distribution.

A prior-art thin liquid crystal (LC) hologram structure is illustrated in FIG. 1, which is a thickness cross-sectional view along the grating vector. The grating vector is the plane where the light is dispersed by diffraction effect. It is also the pixelation direction for a 1D grating or hologram. The hologram 5 includes a substrate 1, onto which an array of pixels 10 having varying azimuthal LC director orientations is disposed. Four discrete azimuthal LC director orientations are shown as 11, 12, 13 and 14. More specifically, the projection of the LC index indicatrix onto the plane of drawing (XZ-plane) is shown. Pixel 11 has its projected director aligned parallel to the X-axis, whereas pixel 13 has its projected director aligned parallel to the Y-axis. The other two states, pixels 12 and 14 have their projected directors contained within the XY plane but non-parallel to both the X- and Y-axes. The hologram element 5 also includes AR coating stacks 2 and 3 to aid transmission efficiency.

In operation, a light ray incident along the Z-axis 20 is spatially sampled by the hologram, wherein the spatial phase encoding causes the beam to be steered at an angle 22 as output ray 21. It is noted that, depending on the hologram design, other diffraction orders, in addition to 21 may also be present at the output. The output may also contain the zeroth order (undiffracted) light, as a result of diffraction inefficiency.

A key feature of this prior-art LC hologram is that all the pixels are configured as either A-plates (i.e., an optical retardation element having its extraordinary axis oriented parallel to the plane of the layer) or O-plates (i.e., an optical retardation element having its extraordinary axis oriented obliquely to the plane of the layer), with variable LC director azimuthal orientations. In other words, there is no variation in the out-of-plane tilt of the LC directors. Referring to FIG. 1b, the variation in LC director azimuthal orientation across several pixels is shown. The four discrete pixel states, 11, 12, 13 and 14, have their LC directors aligned approximately at 0, 45, 90 and 135 degrees, respectively, relative to the hologram vector 25.

Figure 1B:
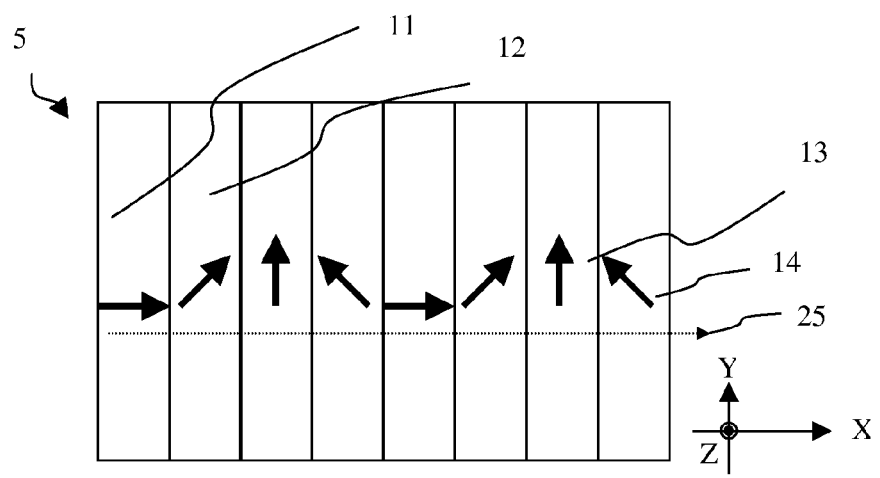

Note that the hologram configuration illustrated in FIGS. 1a and 1b is polarization sensitive. In particular, it is expected that for one circular polarization the four pixel states represent progressively advancing phase distribution and therefore the light will be steered towards one direction. For the opposite handedness of circular polarization, the same four pixel encoding represent progressively delaying phase distribution and the light is steered to the symmetric orders. However, while this LC grating is polarization sensitive, it is not polarization selective. The diffraction effect cannot be completely turned off, even if one has complete control over the incoming polarization. The two circular Eigen-polarizations always replay to symmetric patterns. Other polarizations (linear or in general elliptical) are combinations of the two circular states and hence replay to some mixture of the two circular polarization outputs. No input polarization selection is able to preserve all the light power in the undiffracted order.

Figure 2A:
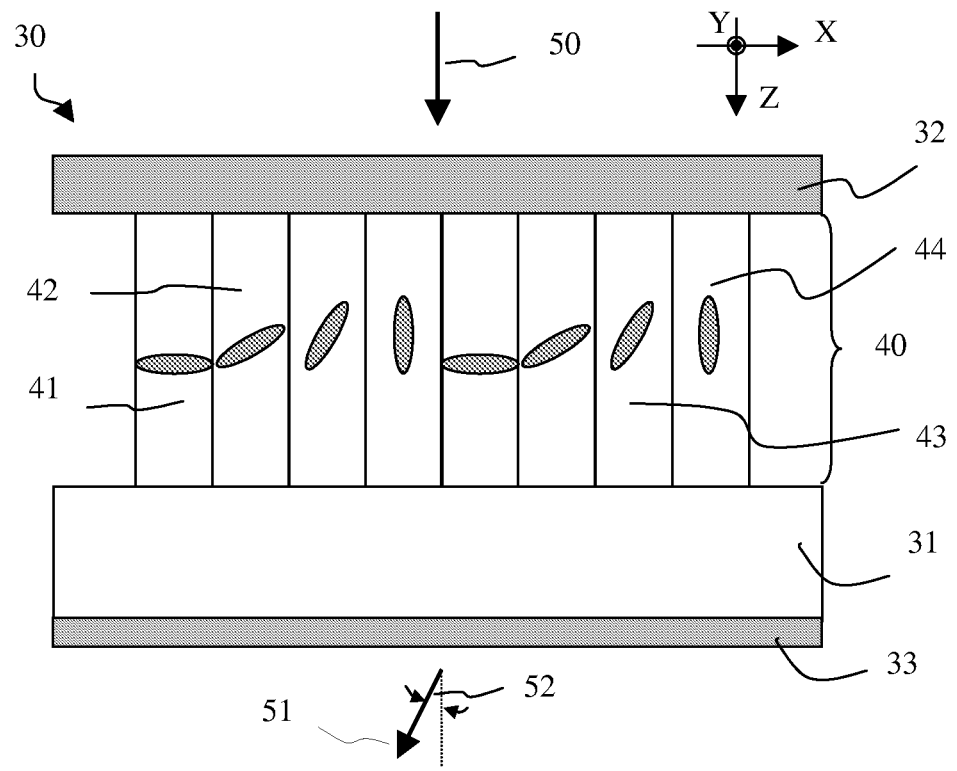
FIG. 2a is a side-view of index indicatrix of an LC hologram with polar angle distribution in accordance with one embodiment of the present invention.
Figure 2B:
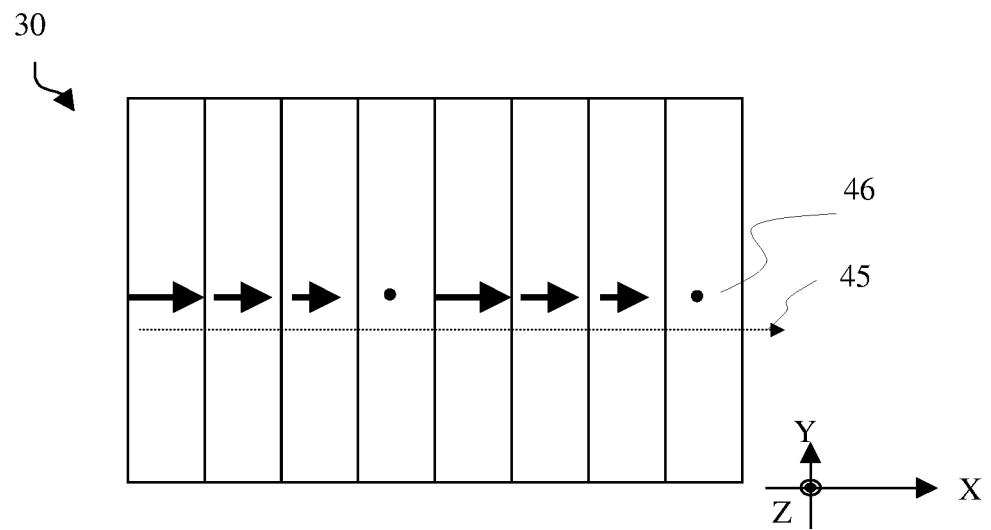

Referring to FIGS. 2a and 2b, there is shown a polarization-selective hologram in accordance with one embodiment of the instant invention. FIG. 2a is a cross-sectional view along the grating vector 45. The hologram 30 includes a substrate 31 onto which a continuously-varying or a pixelated LC layer 40 is disposed. The hologram element 30 also includes AR coating stacks 32 and 33 to aid transmission efficiency. Polarization-selectivity is provided by aligning the LC directors in different pixels with variable amount of out-of-plane tilts, while maintaining a uniform azimuthal orientation. Four discrete pixels states 41, 42, 43 and 44 are shown with approximately 0, 33.6, 53.1 and 90 degree of out-of-plane tilt angles, respectively. At a nominal $\lambda=400$ nm, the ordinary index $n_o$ and extraordinary index $n_e$ of refraction values are 1.61 and 1.75, respectively, such that these four pixels give rise to [0 −0.0461 −0.0921 −0.1382] phase difference per unit length relative to the A-plate configured pixel 41. For an LC film thickness of approximately 2.17 μm, these four pixels provide for [0, $\pi/2$, $\pi$, $3\pi/2$] phase encoding, which are the optimal discrete states for four-level phase-only holograms.

In operation, X-polarized input light 50 incident along the Z-axis is steered to the main diffraction order 51 with a deflection angle of 52. It is noted that, depending on the hologram design, other diffraction orders in addition to 51 may also be present at the output. The output may also contain the zeroth order (undiffracted) light, as a result of diffraction inefficiency. With the orthogonal linear polarization input (for example Y-polarization), the LC hologram 30 presents no optical path length modulation. This light is not diffracted and is contained in the zeroth-order output. In other words, by configuring the LC hologram as an array of variable-tilt encoded pixels, the thin hologram is made polarization-selective. With one linear polarization, the hologram diffracts. With the orthogonal linear polarization, the hologram is highly transparent.

Referring to FIG. 2b, the plane of tilt 46 is parallel to the hologram vector 45. The series of dark arrows indicate the effective in-plane birefringence. More generally, the hologram vector dictates the direction at which the light ray is diffracted whereas the plane of tilt dictates the linear polarization that sees the LC hologram. The linear polarization that is diffracted is aligned parallel to the tilt-plane. The linear polarization orthogonal to the tilt plane is undiffracted.

Figure 2C:
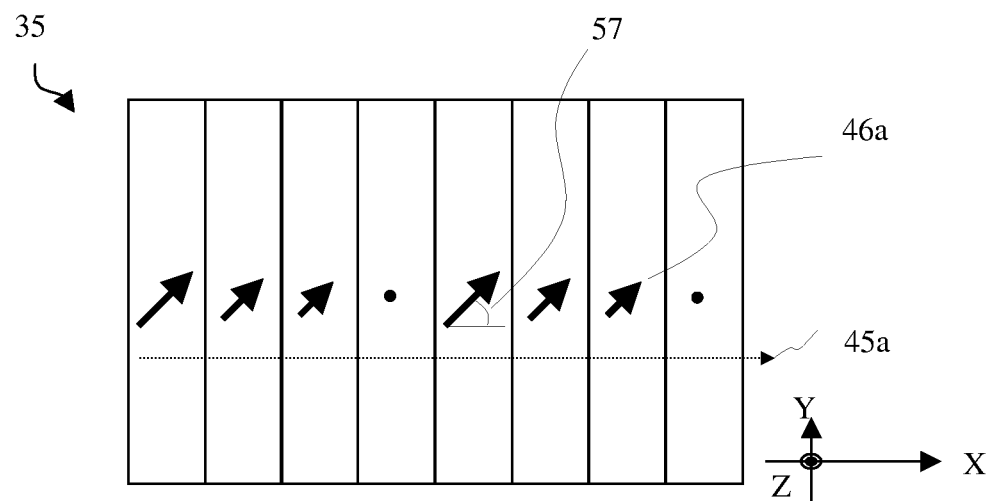
FIG. 2c is a plan-view of director orientations of an LC hologram with polar angle distribution wherein the tilt-plane does not coincide with the grating vector.

Referring to FIG. 2c, there is shown a polarization-selective hologram in accordance with another embodiment of the instant invention. In this embodiment, the hologram vector 45a of the LC hologram 35 is parallel to the X-axis, but the tilt plane 46a is chosen with an azimuthal offset 57 to the hologram vector. As a result, light rays polarized parallel to the tilt plane 46a are diffracted along a plane parallel to the grating vector 46a. Note that while the out-of-plane angle of the LC director in each pixel varies between pixels, the azimuthal angle of the LC director is the same between pixels.

Figure 3:
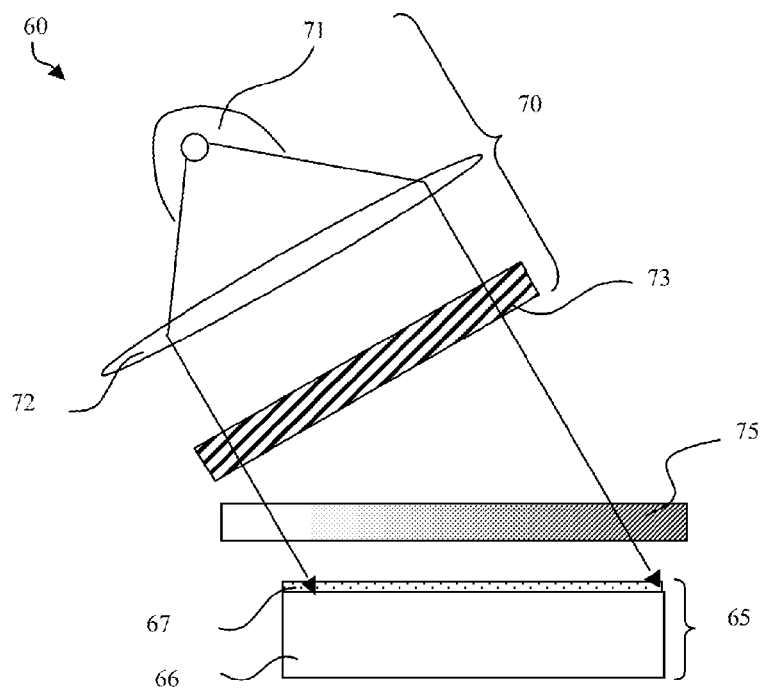
FIG. 3 is a schematic diagram showing a LPUV exposure system setup for LPP for imposing a variable-tilt oblique alignment in a LCP layer.

Referring to FIG. 3, there is shown a system for fabricating a flat non-etched polarization-selective diffractive optical element (e.g., a hologram) in accordance with one embodiment of the invention. The optical setup 60 includes a mount for supporting the device under fabrication 65, a linearly polarized ultra-violet (LPUV) light exposure system 70, and a photo-mask 75. The device under fabrication 65 includes a substrate 66 onto which a linear photo-polymerizable (LPP) alignment layer 67 is deposited. The LPUV exposure system 70 includes a UV light source 71, a collimating lens 72, and a UV polarizer 73. The photo-mask 75 is patterned to provide varying levels of light to the alignment layer in a predetermined manner. In particular, the photo-mask 75 is patterned to provide varying levels of energy density to the alignment layer as a function of transverse spatial coordinate. In one embodiment, the photo-mask 75 is a variable transmission mask. In another embodiment, the photo-mask 75 is a variable size aperture mask.

In operation, the light source 71 provides LPUV light at an oblique angle to the surface of the substrate 66. In this embodiment, the light source is shown to be tilted relative to the horizontal substrate. In other embodiments, the substrate is tilted relative to the light source. The non-normal LPUV light incidence and its energy density dose induce a change in the alignment layer 67 that causes the LC director in a subsequently deposited LCP pre-cursor layer to be aligned at an oblique angle (tilted out of the plane of the substrate at some azimuthal angle). In this embodiment, the UV polarizer 73 is oriented to transmit, with high transmission, UV light polarized parallel to the plane of drawing (e.g., which is the plane of incidence). Depending on the chemistry of the LPP material, this configuration will typically result in the LC director of the subsequently deposited LCP layer to be aligned in an azimuthal plane that is parallel or orthogonal to the LPUV plane of incidence. The actual out-of-plane tilt of the LC director is dependent on the LPUV energy density dose delivered to the LPP alignment layer 67. Since the photo-mask 75 provides various energy densities to the alignment layer 67 in a predetermined pattern a spatially variable tilt LCP film, which has variable in-plane retardance, results. Although the out-of-plane tilt of the LC director varies in a predetermined manner across the film, the azimuthal angle of the LC directors is constant as for example, illustrated in FIGS. 2b and 2c. For example, in one embodiment the LC director is aligned homogeneously along a single azimuthal plane but with variable tilt angles. Once the LPP layer is exposed to LPUV in this manner, then a thin layer of liquid crystal polymer precursor is coated on the alignment layer. This layer is then exposed to UV light (e.g., which does not have to be polarized) to cross-link the LCP precursor and fix the LC directors at the predetermined oblique angles. Accordingly, this method allows diffraction gratings and more complex thin holograms to be encoded on thin LCP layers, supported by a single substrate, to provide stable diffractive optical elements that are suitable for a wide range of applications. In addition, since the LCP film need only be supported by a single substrate the thin NEF polarization-selective diffractive element is easily integrated with other optics.

Note that this fabrication technique has been described with reference to a LCP precursor, which is preferably cross-linked with a subsequent UV irradiation to convert it to LCP. In general, the LCP layer may be formed using any of the LPP and liquid crystalline compounds known in the art, the latter of which may be polymerized and/or cross-linked with UV irradiation and/or thermally. For example in one embodiment, the LPP layer is formed by spin-coating a 2 wt % solution of a LPP in cyclopentanone on a glass substrate (e.g., for 60 seconds at 3000 RPM) to obtain a 50 nm thick alignment layer. In other embodiments, the LPP layers are formed using another coating method such as wire-coating, gravur-coating, slot-coating, etc. LPP layers, which often include cinnamic acid derivatives and/or ferulic acid derivatives, are well known in the art. In accordance with the instant invention, the LPP layer will be of the type to generate an out-of-plane tilt in the subsequently applied LC or LCP layers. Various compounds suitable for forming the LPP layer are available from Rolic (Allschwil, CH). In one embodiment, the LPP coated glass is baked for a predetermined time (e.g., 5 minutes) at a predetermined temperature (e.g., 180 degrees) before being LPUV irradiated through the photo-mask. In one embodiment, the LPP is irradiated in a two step process. In the first step, the layer is exposed to linearly polarized light without the photo-mask (e.g., through a standard aperture, to set the lowest tilt-angle at all locations). In a second step, the layer is exposed to the linearly polarized light through the photo-mask (e.g., to set the higher tilt-angles at select locations corresponding to the transmitting areas of the photo-mask). In this embodiment, the total energy density (i.e. dose) delivered will be higher at those regions exposed in the first and second irradiation steps, as compared to those regions only exposed in the first irradiation step. In general, the required energy density and wavelength of illumination will be dependent on the LPP material. In general, the energy density will be typically between 30-300 mJ/cm2, while the wavelength range will be typically between 280 and 365 nm. In the embodiment shown above, the photo-mask is patterned to provide varying amounts of energy. In other embodiments, the photo-mask is moved relative to the substrate to provide the varying amounts of energy. In each case, the incident angle of LPUV will be typically between 20 and 60 degrees. As discussed above, the irradiated LPP layer is used as an orientation layer for the subsequently coated LCP layer. In one embodiment, the LCP layer is formed from liquid crystalline material that includes a liquid crystal polymer precursor. LCP precursor materials, which for example may include a cross-linkable diacrylate nematic liquid crystalline compound, are well known in the art. In accordance with the instant invention, the LCP material will be of the type that will appropriately respond to the tilt inducing LPP layer. Various LCP precursor compounds suitable for forming the LCP layer are available from Rolic (Allschwil, CH). In one embodiment the LCP precursor layer is spin-coated on the LPP layer as a 15 wt % solution in anisole. In other embodiments, the LCP layers are formed using another coating method such as wire-coating, gravur-coating, slot-coating, etc. The resulting LLP/LCP device is then typically baked (i.e annealed) for a predetermined time to promote good alignment of the LCP to the LPP alignment layer. Advantageously, the subsequent photo-chemical cross-linking of the LCP layer is believed to provide improved reliability under high power illumination and short wavelength laser exposure.

Figure 4:
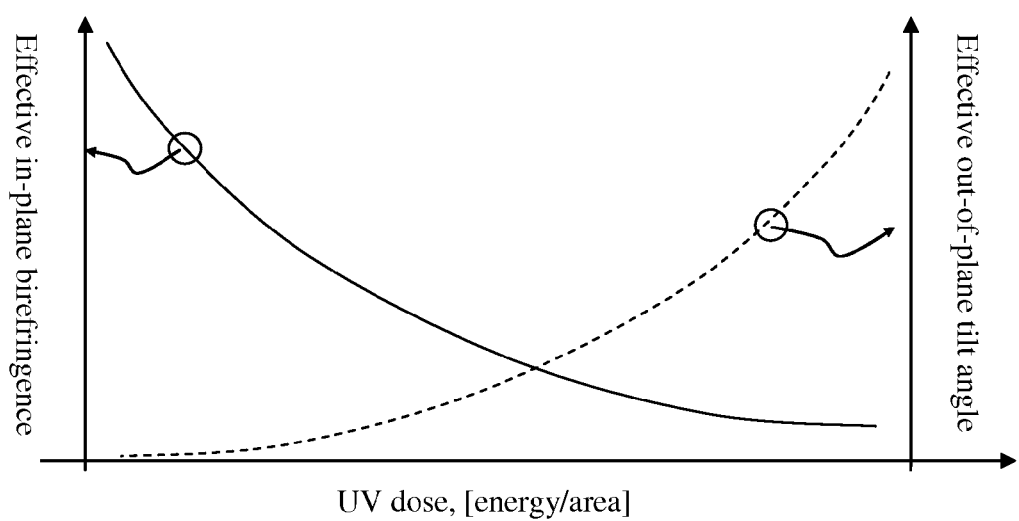
FIG. 4 is a schematic diagram showing the effective in-plane birefringence and effective out-of-plane LC director tilt as a function of the LPUV dose of the LPP alignment layer.

An example of a response curve of LPUV exposure dose for a LPP/LCP system is shown in FIG. 4. The solid line plots the in-plane birefringence as a function of the LPUV dose density. In the case of creating a variable retarder, the LPUV dose density corresponds to a transverse spatial coordinate. The effective in-plane birefringence is obtained by taking the projection of the full LC indicatrix onto the device plane. The decreasing effective birefringence with increasing LPUV energy density indicates that the out-of-plane LC director tilt increases with LPUV energy density. The LC director tilt is plotted as a dashed line in FIG. 4.

In general, the photo-mask 75 will be patterned in dependence upon the intended application. In one embodiment, the photo-mask 75 is patterned to provide varying energy densities to the alignment layer 67 in a pixelated manner. In other embodiments, the photo-mask 75 is patterned to provide varying energy densities to the alignment layer 67 in a continuously graded manner. In one embodiment, the pixels are periodic (e.g., at regular intervals). In another embodiment, the pixels are non-periodic (e.g., random or in a predetermined pattern). Advantageously, the use of the photo-mask 75 allows the LCP layer to be patterned with a large number of phase profile levels and with increased precision. In one embodiment, the photo-mask 75 is patterned to provide two levels of phase profile. In another embodiment, the photo-mask 75 is patterned to provide more than two levels of phase profile. In general, most applications will require at least 4 levels of phase profile in order provide reasonable diffraction efficiency. The level of phase profile on diffraction efficiency is described below.

The simplest thin hologram is a regular grating, where the grating period has as many pixels as there are distinct phase levels. A phase-only grating is also called a kinoform. The diffraction expression predicts that a m-level grating produces p-order diffraction output with an efficiency, $\eta_p^m$, of $$\eta_p^m = \mathrm{sinc}\!\left(\frac{p\pi}{m}\right)^2 \tag{1}$$

where sin c(x) is sin(x)/x, sin c(0)=1, and p= . . . −2m+1, −m+1, 1, m+1, 2m−1, . . . .

The p-order diffracted angle is governed by, $$\sin(\theta_p) = \frac{p\lambda}{\Lambda}, \tag{2}$$

where $\lambda$ is the wavelength of illumination and $\Lambda$ is the grating period (i.e., the pitch). Taking a small angle approximation (e.g., sin(θ)~θ) and a Fourier transform lens of focal length f, $$\Delta x = f\theta_p = p\frac{f\lambda}{2w}, \tag{3}$$

where $\Delta x$ is the spatial translation of the diffracted output, and w is the pixel pitch, the expression above can be generalized as, $$\Delta x = \sigma\frac{f\lambda}{w} \text{ and } (\Delta x, \Delta y) = (\sigma, \tau)\frac{f\lambda}{w}, \tag{4}$$

for 1D and 2D hologram replay, respectively, where (σ,τ) represents the fractional hologram main diffraction order location within the zeroth-order replication region, and fλ/w is the physical size centered at the optical axis (e.g., see K. L. Tan et al., "Dynamic holography for optical interconnections. II. Routing holograms with predictable location and intensity of each diffraction order," *J. Opt. Soc. Am. A*, 18(1), pp. 205-215, 2001). The fractional orders lie within ±½ replication region. In this notation, the spatial sampling and replication (i.e., artifacts of hologram recording device and hologram replay) is decoupled from the hologram generation. For each grating recording, unless all m level phase steps are present in the grating and the total available phase range is $2\pi*(m-1)/m$, and each encoding cell has 100% pixel-fill duty cycle ratio, the diffraction efficiency of the first replay order will be lower than predicted in eq. (1).

Assuming that the LC hologram recording and replay operation is idealized (lossless), the ideal first order diffraction efficiencies for several phase-only gratings are given as follows:

$$m=2, \eta_1=40.5\%, m=4, \eta_1=81.1\%, m=8, \eta_1=95.0\%,$$
$$m=12, \eta_1=97.7\% \text{ and } m=16, \eta_1=98.7 \quad (5)$$

Accordingly, for a highly efficient hologram replay, the number of distinct phase levels should be greater than 8.

Figure 5:
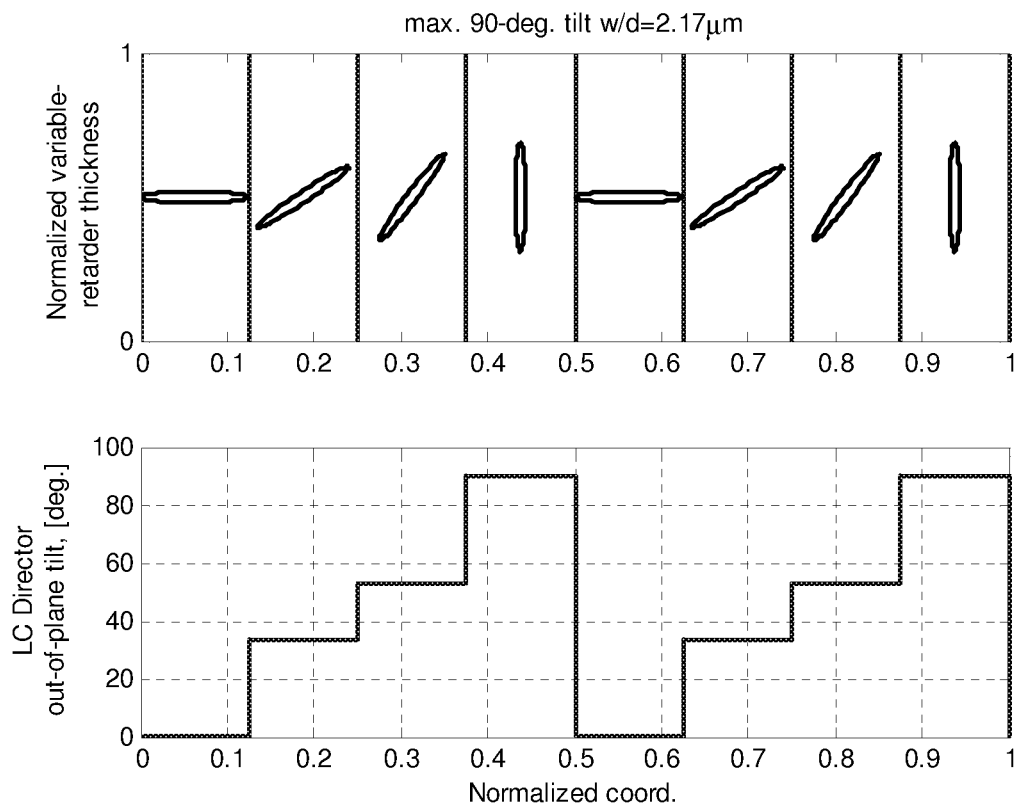
FIG. 5 shows the out-of-plane polar angle tilt profile of a $\sigma=-\frac{1}{4}$ polarization-selective grating giving an asymmetric replay and having four discrete states of LC polar angle tilts.
Figure 6:
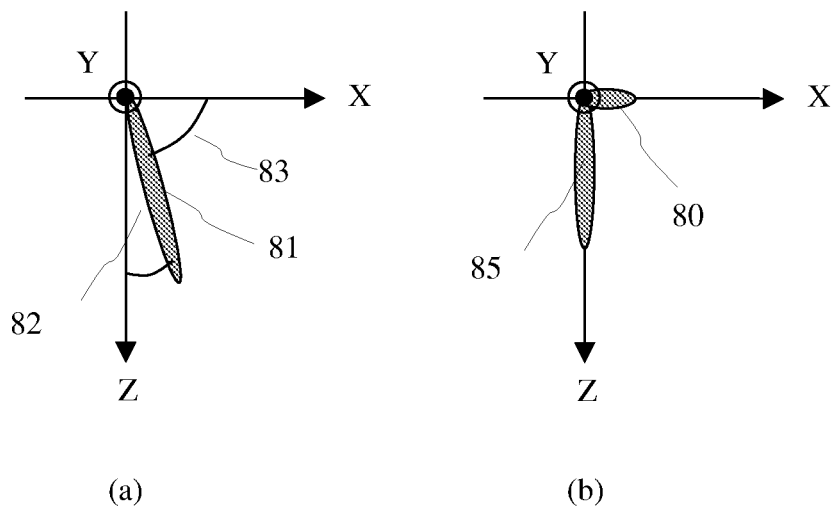
FIG. 6 shows the projection of uniaxial O-plate birefringence into in-plane and out-of-plane birefringence components.
Figure 7:
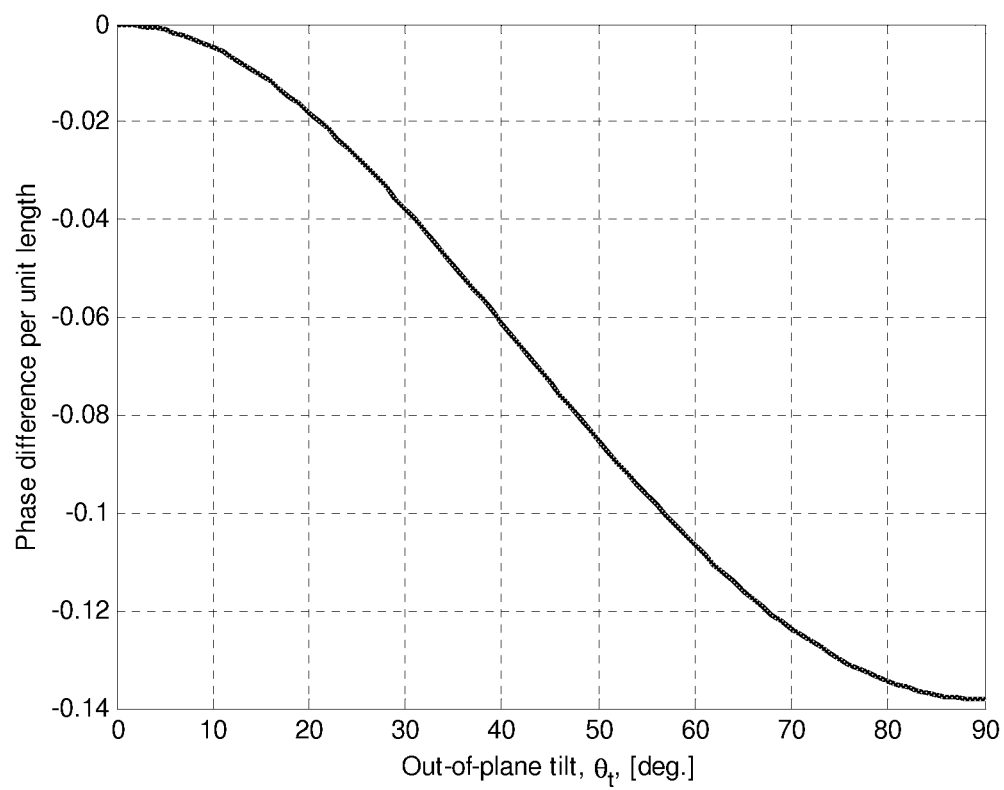
FIG. 7 shows the phase difference of a given LC director tilt, as compared to an A-plate configured pixel, using a proprietary LCP uniaxial material at $\lambda=400$ nm.

A four-level phase-only hologram is illustrated in FIG. 5. The top plot represents a side view showing the LC director orientation along the tilt-plane. The bottom plot, which is an out-of-plane polar angle tilt profile, shows the discrete tilt steps required to realize the lossless quarternary phase hologram. This configuration is frequently termed −¼ fractional replay, because the light is mainly steered to ¼ distance to the left of the zeroth order within the central replay replication. This σ=−¼ polarization-selective periodic phase mask (e.g., a grating), which exhibits asymmetric replay, diffracts light having a linear polarization input parallel to the plane of drawing and is transparent to the orthogonal linear polarization. As discussed above, this four-level hologram is expected to yield a maximum of 81% diffraction efficiency in the first diffraction order. In order to increase the diffraction efficiency, more phase levels are required. Without loss of generality, a single encoding element can be represented as an LC director inclined at an angle with respect to the Z-axis and contained within the XZ plane. Referring to FIG. 6, the LC director 81 forms a polar angle offset 82 $\theta_c$ with the Z-axis. The LC director out-of-plane tilt 83 $\theta_t$ is given by $\pi/2-\theta_c$. From the quadratic equations describing the index ellipsoid, the in-plane $n_a$ and out-of-plane $n_c$ effective indices are represented by the projection onto the XY-plane 80 and projection along the Z-axis 85. These effective indices are given by, $$\frac{1}{[n_a(\theta_t;\lambda)]^2} = \frac{\cos^2(\theta_t)}{[n_e(\lambda)]^2} + \frac{\sin^2(\theta_t)}{[n_o(\lambda)]^2}, \quad (6)$$

and $$\frac{1}{[n_c(\theta_t;\lambda)]^2} = \frac{\sin^2(\theta_t)}{[n_e(\lambda)]^2} + \frac{\cos^2(\theta_t)}{[n_o(\lambda)]^2}, \quad (7)$$

where $n_e(\lambda)$ and $n_o(\lambda)$ are the dispersion of the extraordinary and ordinary indices of the uniaxial material. In terms of advancing phase, relative to an A-plate aligned pixel ($\theta_t=0$), Eq. (6) gives a non-linear increase of phase ramp with increasing of out-of-plane tilt. The phase difference relative to an A-plate configured pixel (i.e., $n_a(\theta_t;\lambda)-n_e(\lambda)$) is plotted in FIG. 7. From the plot, an encoding pixel, aligned with the LC tilt at ~56.7°, yields a phase difference per unit length of −0.1. In other words, a 2 µm pixel height provides for 200 nm phase advance relative to the A-plate pixel. This gives the required π phase step at λ=400 nm. A linear phase ramp, as is often required in a multiple-level phase hologram, can be configured from the phase per unit length versus tilt angle profile.

Figure 8:
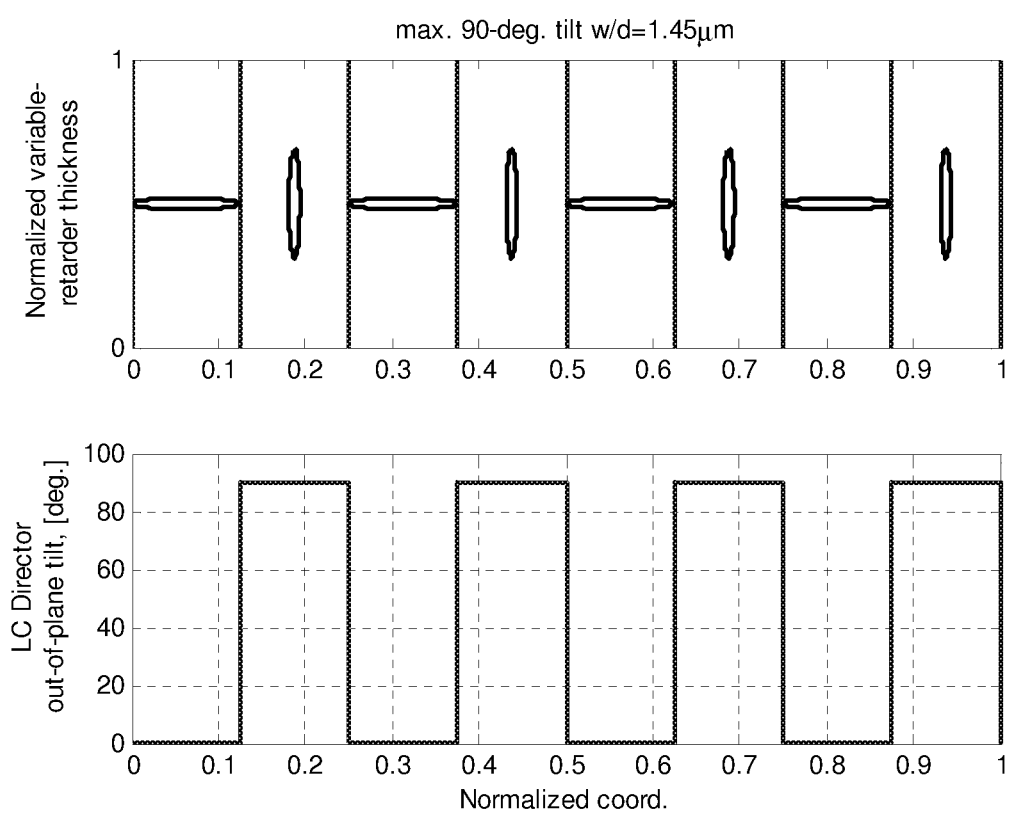
FIG. 8 shows the out-of-plane polar angle tilt profile of a $\sigma=\pm\frac{1}{2}$ polarization-selective grating giving a symmetric replay and having two discrete states of LC polar angle tilts.
Figure 9A:
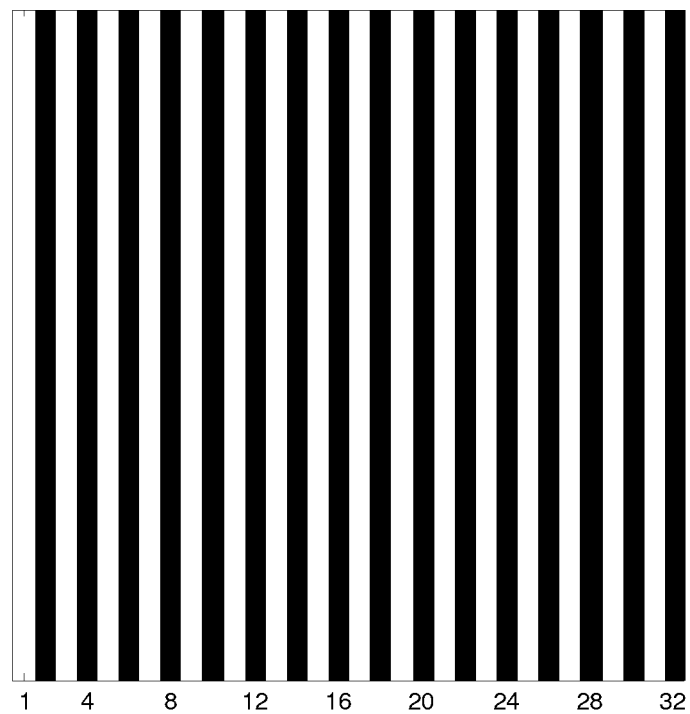
FIG. 9a illustrates a spatial phase profile of a binary LC grating with $\sigma=\pm\frac{1}{2}$ fractional order where the dark/bright stripes represent two LC polar angle tilts having an optical path difference (OPD) of $\pi$ phase.
Figure 9B:
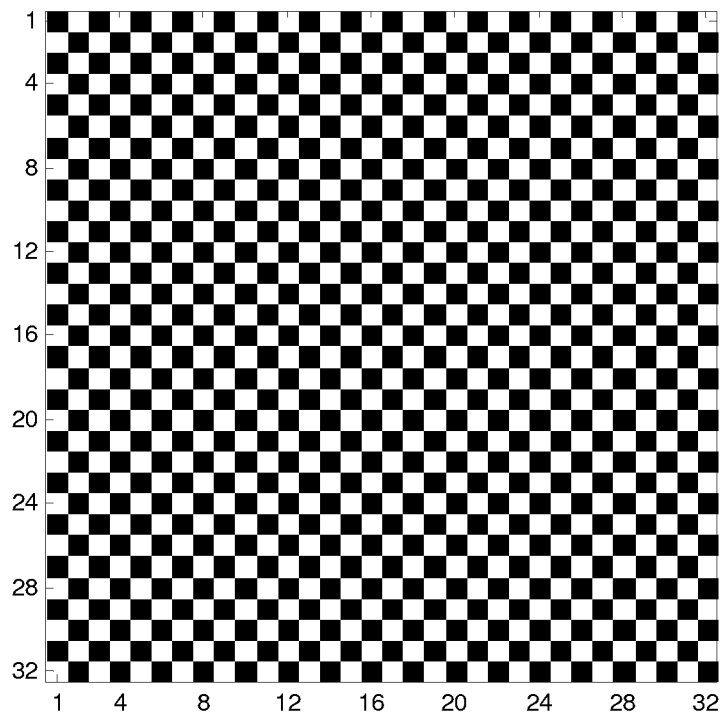
FIG. 9b illustrates a spatial phase profile of a binary hologram for a symmetric spot array generator, where $\sigma=\pm\frac{1}{2}$ and $\tau=\pm\frac{1}{2}$ fractional order.
Figure 9C:
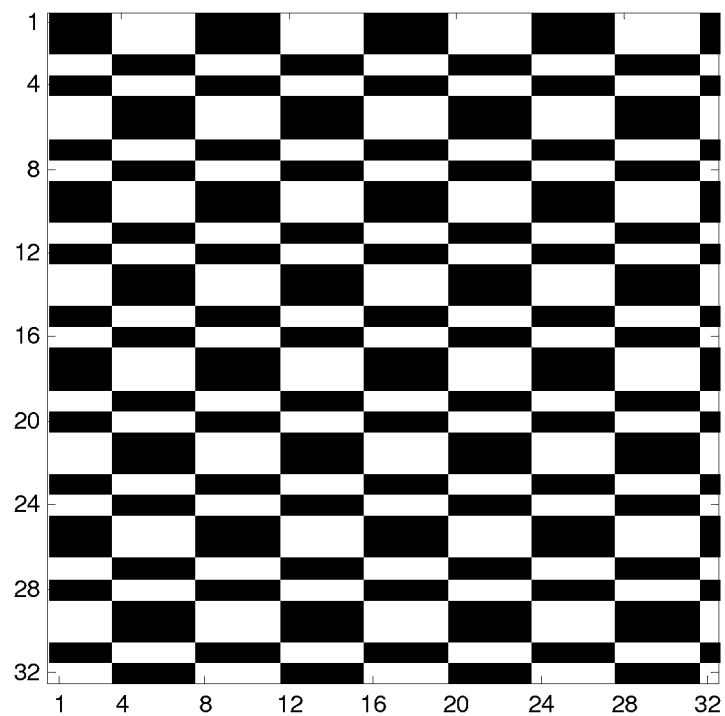
FIG. 9c illustrates a spatial phase profile of a binary hologram for a non-equal spacing spot array generator, where $\sigma=\pm\frac{1}{8}$, $\tau=\pm\frac{3}{8}$ fractional order.

Referring to FIGS. 8 and 9a-c, there are shown various embodiments of thin, polarization-selective holograms having two phase levels. FIG. 8 shows a binary LC hologram, encoded as alternating A-plate/C-plate pixels. The top plot represents a side view showing the LC director orientation along the tilt-plane. The bottom plot shows the out-of-plane polar angle tilt profile. This σ=±−½ polarization-selective periodic phase mask (e.g., a grating) gives a symmetric replay and diffracts light having a linear polarization input parallel to the plane of drawing and is transparent to the orthogonal linear polarization. As discussed above, this two-level hologram is expected to yield a maximum of 40.5% diffraction efficiency in the first diffraction order. In order to increase the diffraction efficiency, more phase levels are required. Note that this hologram gives the highest frequency encoding capability at the given minimum pixel size. With the same LC material use in the calculations described above, this hologram is only 1.45 µm thick, sufficient to create a π phase step with the full LC birefringence. An image of this binary LC hologram may be presented as a series stripes, as shown in FIG. 9a. In this embodiment, the bright stripes represent 0 phase pixels whereas the dark-stripes represent the π phase pixels. In other embodiments, the bright stripes represent π phase pixels whereas the dark-stripes represent the 0 phase pixels (i.e., the two LC polar angle tilts have an optical path difference of π phase). Referring to FIG. 9b, there is shown an embodiment of a 2D beam steering hologram. This checkerboard hologram steers the light to the maximum spatial frequency locations for both X and Y directions. FIG. 9c shows an embodiment of a crossed Dammann grating. This hologram steers light three times as far in the Y-direction as it steers light along the X-direction. In all three binary hologram examples, it has been assumed that the hologram operates in the scalar diffraction domain. The effective indices for TE and TM waves are not impacted by the pixelation. Rather, the plane of tilt within the hologram encoding, which is uniform over the entire hologram and may or may not coincide with any of the 1D or 2D steering plane, dictates the linear polarization for which the hologram diffracts and the orthogonal linear polarization for which the hologram is transparent.

One application of a polarization-selective hologram in accordance with one embodiment of the instant invention is in an optical pick-up unit (OPU). For example, consider the prior art OPU system illustrated in FIG. 10. The OPU 100 includes an array of semiconductor laser sources 110, the output of which are spatially multiplexed by an array of Polarization Beam Combiner (PBC) cubes 130, collimated by a lens system 160, folded by a leaky mirror 140, and imaged (focused) onto a single "pit" area on the rotating disc media 150 via a second objective lens element 161. The leaky mirror allows a small fraction (e.g. 5%) of the incident beam energy to be tapped off and focused onto a monitor photodiode (PD) 175 via another lens element 165. The array of semiconductor laser sources 110 is shown as 3 discrete laser diodes (LD), including a first LD 111 at λ=400 nm, a second LD 112 at λ=660 nm, and a third LD 113 at λ=780 nm. The outputs from the array of LDs 110 are substantially linearly polarized (e.g., 'S' polarized with respect to the PBC hypotenuse surface). The linearly polarized beams are passed through an array of low-specification polarizers 120, which protect the LD sources 110 from unwanted feedback should the orthogonal polarization ray be reflected towards the laser cavities by the first 131, second 132, and/or third 133 PBCs in the array 130.

In operation, the main beam in each of the LD sources is steered along the common path 180 towards the information layer (IL) within the disc media 150. Prior to reaching the achromatic quarter-waveplate (QWP) 145, the beam is substantially linearly polarized. The achromatic QWP 145 transforms the linear polarization (LP) into circular polarization (CP), the handedness of which is dependent on the orientation of the optic axis of the achromatic QWP 145 (e.g., for a given S- or P-polarization input). In this example, where 'S' polarization is input to the achromatic QWP 145, left-handed circular polarization will result if the optic axis (i.e., slow-axis) of the achromatic QWP 145 is aligned at 45° counter clockwise (CCW) with respect to the P-plane of the PBC (e.g., with the assumption of intuitive RH-XYZ coordinate system while looking at the beam coming to the observer). When the rotating disc media 150 is a pre-recorded compact disc (CD) or digital versatile disc (DVD), where there is a physical indentation of a recorded pit, the optical path length difference between a pit and its surrounding "land", at ⅙ to ¼ wave, causes destructive interference (e.g., at least partial) and reduces the light detected by the main photodiode 170 positioned at the second port of the PBC cube array 130. In the absence of a pit, there is no destructive interference and the light will be effectively transformed by the achromatic QWP 145, upon double-passing there through, from the initially S-polarization to P-polarization, such that substantially the same light power returns towards the PBC cube array 130.

When the rotating disc medium 150 includes more than one information layer per single side of disc, such as a DVD dual-layer (DL) disc, the separation between the two IL layers is typically between 20-30 μm in order to reduce coherent crosstalk when accessing the disc. Although the objective lens 161 is readily adjusted to focus onto the required IL depth, this refocusing causes spherical aberrations. For the DVD legacy system with an objective lens having about 0.6 numerical aperture (NA) and utilizing 650 nm of illumination wavelength, the change in IL depth may not be critical. However, in other DL formats (e.g., Blu-ray (BD) and high definition (HD)-DVD), the corresponding increase in NA (e.g., 0.85 NA for BD) and decrease in wavelength of illumination (e.g., approximately 405 nm) causes spherical aberrations of roughly 200-300 mλ when the high NA objective lens is refocused onto a second IL depth (e.g., for dual-layer disc format having an approximately 20 μm spacer layer with ~1.5 index of refraction). There are various ways to reduce this aberration. For example, it is common to mechanically adjust the elements in a compound objective lens and/or adjusting the position of the collimation lens to alter the vergence of the entrance beam to the objective lens. Alternatively, various non-mechanical aberration correction schemes have been proposed.

Figure 10:
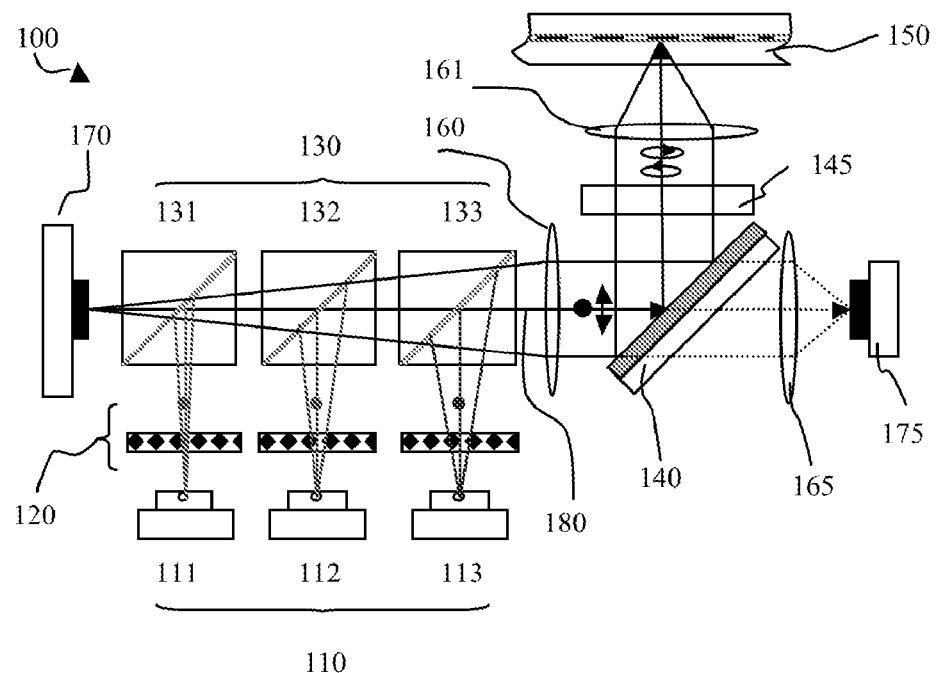
FIG. 10 is a schematic diagram of a prior art 3-wavelength HD-DVD/DVD/CD optical pick-up unit (OPU)
Figure 11:
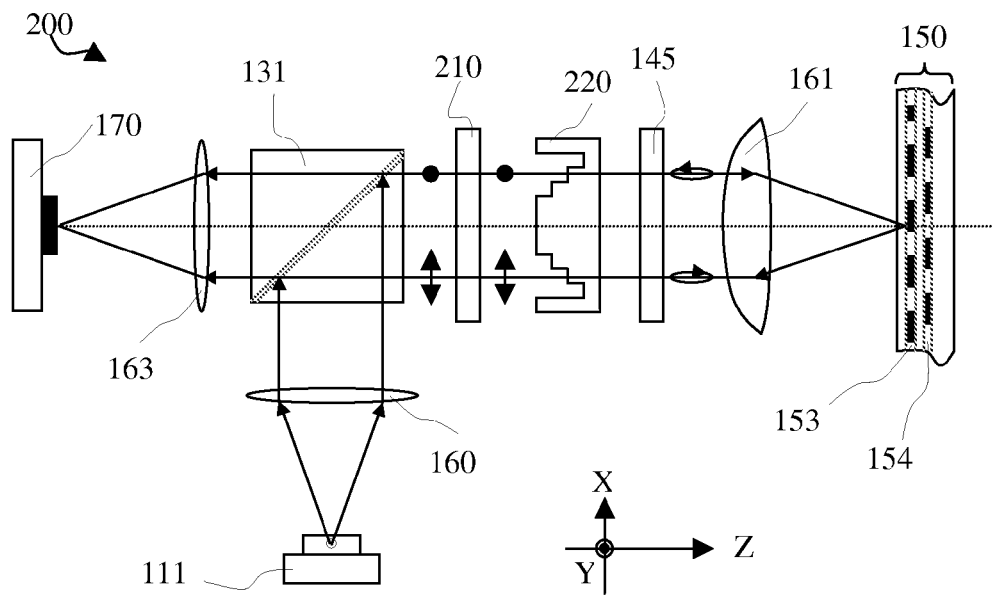
FIG. 11 is a schematic diagram of a prior art OPU including a non-periodic phase mask that functions as a polarization-selective wavefront aberration compensator.

Referring to FIG. 11 there is shown one example of an OPU including non-mechanical aberration correction (i.e., which is similar to the OPU system proposed in U.S. Pat. No. 6,947, 368). In this figure, elements similar to those described in FIG. 10 are referred to with like numbers. In addition to the optical components described in FIG. 10, the OPU 200 in FIG. 11 also includes an actively switched LC cell 210 and a non-periodic phase-mask 220, which are inserted in the parallel beam section between the collimating lens 160 and the objective lens 161. Note that the collimating lens 160 is positioned before the PBC 131 rather than after.

In operation, the beam that is deflected 90-degrees by the PBC 131 is S-polarized with respect to the PBC hypotenuse plane. This beam is passed through the active LC cell 210 such that one of the two orthogonal linear polarizations is output (e.g., S-polarization and P-polarization with respect to the PBC hypotenuse (also parallel to Y-axis and X-axis, respectively)). Depending on the LC mode of operation, the electrical driving state (on or off) for producing a given output (for example S-polarization shown in FIG. 11) can be different. With an 90-degree twisted nematic LC cell, the cell has to be driven off to produce the same polarization output as it is the input. With a VA nematic LC cell, the same polarization output as in the input is obtained without driving the cell. Yet other LC modes such as FLC and IPS nematic LC will require appropriate voltage driving to either alter the polarization or maintain the polarization of incoming light beam.

In FIG. 11, S-polarized radiation is presented to the phase mask 220. The phase-mask 220 includes a series of physical steps etched into a birefringent layer or a birefringent substrate. In general, fabrication of these physical steps is achieved using photo-lithography and dry/wet etching techniques. In one embodiment, the etched steps of the phase mask 220 are exposed to air. In another embodiment, the phase mask 220 is formed by filling the air gaps obtained from patterning and etching with an isotropic material, which may or may not possess the same index as one of the birefringent medium principal indices of refraction. In this embodiment, the air/birefringent phase mask 220 has a uniform slow-axis orientation aligned parallel to the P-plane (e.g., the plane of drawing in FIG. 11) and the step height is configured as $2\pi$ phase jump for air and $n_e$ index of refraction. Hence, when S-polarization is transmitted through the phase-mask 220 it imparts a phase-modulation. When P-polarization (not shown) is allowed to come through the LC cell 210, the phase mask is inactive.

When the objective lens is at the nominal focus (e.g., to be focused on the inner information layer 154 at depth ~100 μm), the LC cell 210 transmits P-polarized light (not shown) that passes through the quarter waveplate 145 and is reflected back and focused on the detector 170 via lens 163. When reading/writing to the outer information layer 153 (e.g., at ~80 μm depth), the objective lens is refocused. Refocusing without changing the vergence of the beam coming to the objective lens causes spherical aberrations. In order to reduce the spherical aberrations, the LC cell 210 is used to transmit S-polarization when the focal position is changed from the nominal value. The S-polarization samples the $n_o$ index in the phase mask 220, to produce the desired wavefront.

Figure 12:
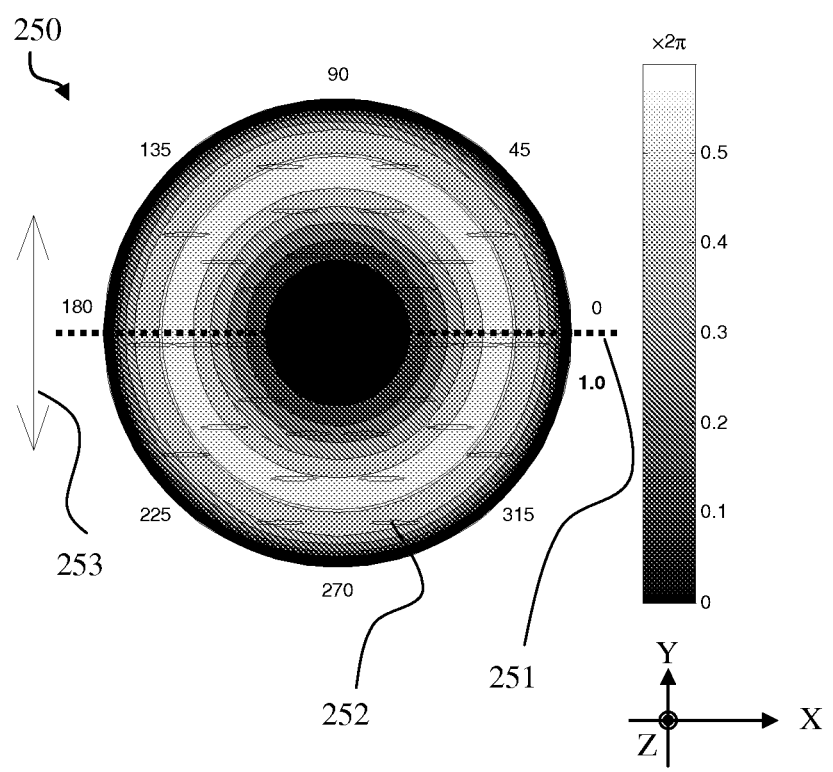
FIG. 12 is a schematic diagram of a prior art non-periodic phase-mask including of annular regions, wherein the optical axis of the uniaxial A-plate is oriented uniformly across all pupil positions.
Figure 13:
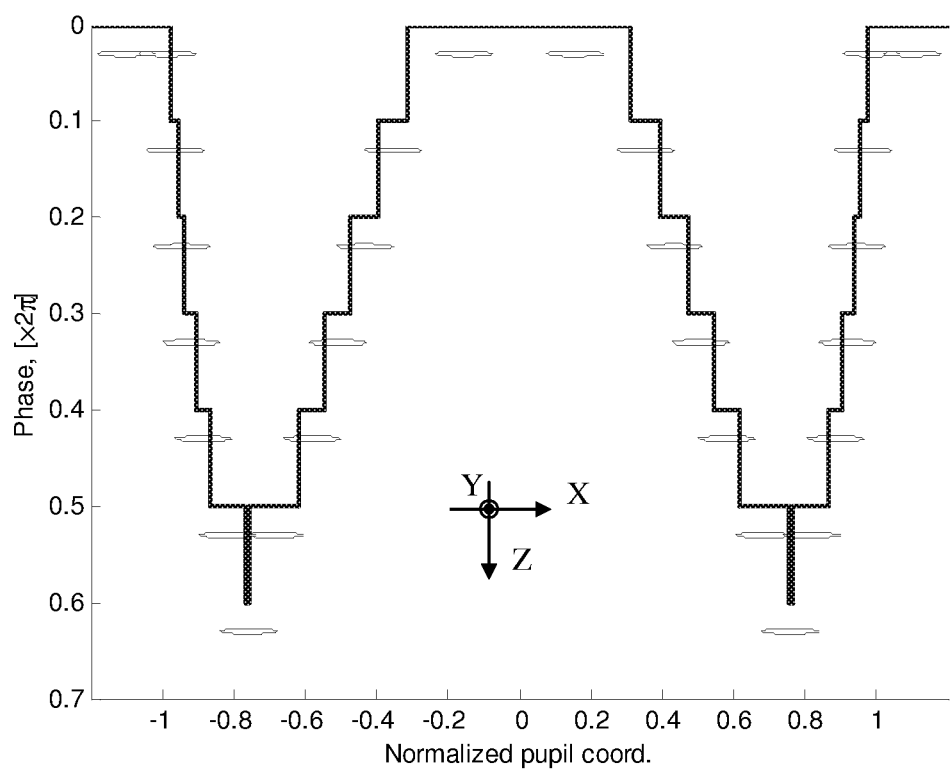
FIG. 13 shows the phase profile of the phase mask illustrated in FIG. 12 along the XZ cross-section.

Note that the phase mask 220 is a surface-relief structure (SRS) including a series of annular zones. For example, consider the prior art phase mask 250 illustrated in FIG. 12, which has a central reference-phase zone. The birefringent material has its optic axis 252 aligned along the X-axis. The incoming S-polarized beam 253 is aligned to the Y-axis. Where the incoming beam samples the air segment within the phase mask, it represents a phase advance relative to the central annular zone. It is the opposite in the focusing beam when the focal distance is brought from ~100 μm to ~80 μm IL depth. The phase profile across the XZ cross-section 251 is shown in FIG. 13. The example indicated close to 1.2π of total phase range is required to reduce the rms wavefront aberrations, as a result of the focal change, from approximately 200 mλ to ~40 mλ. The corrected wavefront aberration is diffraction limited at the operating wavelength.

Referring again to FIG. 11, the etched phase mask 220 in combination with the LC switch 210 allows two polarization states to be selectively corrected for wavefront aberrations dependent on which information layer is being accessed on disc. For a given nominal objective lens focal (either to the inner or the outer information layer), the complement phase profile of the associated aberrations when refocusing is implemented can be encoded onto the phase mask. By switching the LC cell output polarizations, each information layer is accessed with wavefront aberrations contained within the diffraction limit.

Unfortunately, since the phase mask 220 is typically fabricated by etching a birefringent element, it is generally considered to be a relatively expensive optical element. In accordance with one embodiment of the instant invention, a photo-cured LCP layer encoded with a predetermined phase profile (e.g., formed by patterning the effective in-plane birefringence using the oblique photo-alignment technique described with reference to FIG. 3) is used in a non-mechanical aberration correction scheme.

Figure 14:
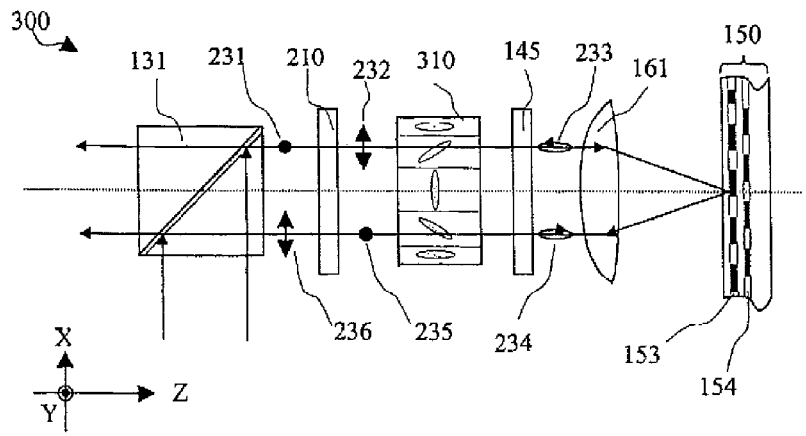
FIG. 14 is a schematic diagram of an OPU including a polarization-selective non-etched flat (NEF) holographic optical element that functions as a polarization-selective wavefront aberration compensator, in accordance with one embodiment of the instant embodiment.

Referring to FIG. 14, a schematic diagram of an OPU 300 in accordance with one embodiment of the instant invention is shown. In this figure, elements similar to those described in FIGS. 10 and 11 are referred to with like numbers. Note that a non-etched and flat (NEF) LC phase mask 310 is provided instead of the conventional etched phase mask 220.

In operation, a collimated beam of light is coupled as S-polarization 231 into the common path through the reflection port of a PBC 131. The LC switch 210 converts the S-polarization to the orthogonal P-polarization 232 (e.g., with respect to the PBC hypotenuse). This P-polarization is parallel to the plane of drawing and is also parallel to the uniform azimuthal orientation of the thin NEF LC phase mask 310. The NEF phase mask has a variable LC out-of-plane tilt, as a function of the pupil position. The effective extraordinary index changes with LC director tilt. Hence, the optical path length is tailored by configuring the LC tilt. In the active phase correction case, the P-polarization samples the phase of each encoding pixel differently, in a manner required to create the complementary phase profiles associated to changing the nominal focal point of the objective lens, when a second information layer is to be accessed, at a different depth than the first information layer where the objective lens has been configured aberration-free. In the non-active phase correction case with the second linear polarization output from the LC cell (not shown), the beam samples the $n_o$ index regardless of the tilt within each encoding pixel. The LC hologram is a transparent zeroth-order grating and no phase preconditioning of the beam is effected.

This preconditioned beam then traverses a quarter-waveplate 145 which converts the first linear polarization 232 into a first circular polarization 233. Upon reflection at the information layer, a second (opposite handedness) circular polarization 234 is obtained. This beam is again converted to the second linear polarization 235 by the quarter-waveplate 145. The phase correction is active in the first pass but the phase correction is inactive in the second pass and vice versa, depending on the LC cell switching. The second pass phase correction does not matter since the beam is not refocused tightly on the way to the photodetector.

Figure 15:
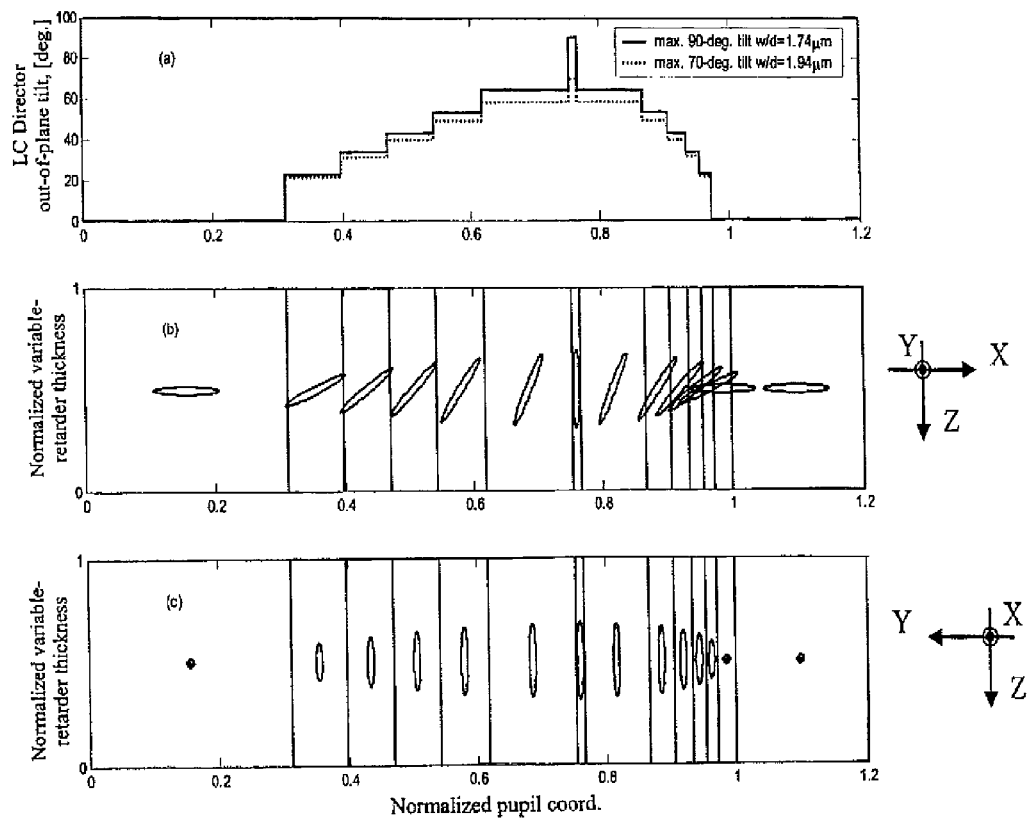
FIG. 15 shows the polar-angle tilt profiles of a LC hologram according to one embodiment of the present invention (top plot shows the out-of-plane polar-angle tilt profiles within each phase-mask region for two cases of maximum LC director tilt angles, whereas the middle and bottom plots show the required index indicatrix projection along the cross-sectional planes of XZ and YZ, respectively)

The LC director tilt profile across the pupil coordinate is shown in FIG. 15. Plot (a) shows the out-of-plane LC director tilt for two cases of maximum tilts: 70 and 90 degrees, in order to generate the discrete-step phase profile as shown in FIG. 13. The calculation wavelength is 400 nm and at this wavelength, the ordinary index $n_o$ and extraordinary index $n_e$ of refraction values are 1.61 and 1.75, respectively. The required LC film thickness is approximately 1.94 μm and 1.74 μm for creating a 1.2π maximum phase range with 70-degree and 90-degree maximum tilt, respectively. This film is very thin and it has a constant physical thickness across the aperture. The polar angle distribution across the pupil gives in the phase correction function. The LC director (also the slow-axis) is aligned along a common plane for example along the XZ-plane in the example given. The LC director profile for several discrete pixels, along the XZ plane, also the tilt plane, is illustrated in plot (b) of FIG. 15. Again the central annular zone has a reference phase provided by the $n_e$ index of the LC film. Progressing outwards from the pupil center, the phase initially advances, by sampling an effective index, between the $n_e$ and $n_o$ of the LC film until zone #7 where the LC is aligned at the maximum tilt (either 70-degree or 90-degree). Beyond this annular zone, the phase difference to the central zone decreases progressively towards the limit of the pupil by decreasing the LC tilt. Along a plane orthogonal to the tilt plane, the projection of the effective LC index indicatrix is shown in plot (c) of FIG. 15. Since this is a vertical plane, the longer indicatrix pixel gives a lower effective retardance for normal incidence rays and hence advancing phase versus the shorter indicatrix pixels.

In the embodiments described with reference to FIG. 14 a polarization-selective hologram in accordance with the instant invention is used in a non-mechanical aberration correction scheme. Advantageously, the non-periodic mask 310 is uniform in layer thickness across the clear aperture. When the optic axis of the uniaxial LC material is aligned to an oblique tilt, as well as the required planar and homeotropic alignment, the phase mask 310 may be used with the liquid crystal cell 210 to provide a polarization-selective wavefront phase correction or total transparency. Advantageously, the polarization-selective phase mask 310 works with linear polarization, which is conveniently provided by the laser diode light sources with a high polarization purity. Accordingly, the polarization-selective phase mask 310 does not need to be positioned after the quarter waveplate 145, wherein the lack of purity of circularly polarized light may reduce diffraction efficiency.

In other embodiments, a polarization-selective hologram in accordance with the instant invention is used as a beam steering element in an OPU. For example, consider the prior art OPU system 400 illustrated in FIG. 16, wherein a polarization-selective periodic grating 410 provides a function similar to the PBS cubes 130 illustrated in FIG. 10. In this system 400, which is similar to that proposed in Japanese Pat. Appl. JP-A-2001-174614 and US Pat. Appl. No. 2006/0239171, the grating 410 is used to angularly (and spatially) separate the return beam from the optical disc from the radiation coming from the laser diodes. In particular, the grating 410 utilizes the large optical rotary power dispersion near the reflection band edge of a cholesteric liquid crystal and near the absorption band etch of an organic dye to preferentially diffract a required circular polarization to +1 order (e.g., also ±1 orders for binary periodic grating) while being transparent to the orthogonal circular polarization (e.g., there is little to no diffraction, and light appears mostly in the zeroth order).

The OPU system 400 includes a co-packaged laser diode and detector module 305. The laser diode section of the module 305 launches a divergent beam towards a collimating lens 162, which produces a parallel beam of a first linear polarization 231 (i.e., which for illustrative purposes shown to be orthogonal to the plane of drawing). The linear polarization 231 is converted to a first circular polarization 233 upon passing through a quarter-waveplate 145. For a preferred cholesteric helical twist having the opposite handedness as the circular polarization input, this circular polarization 233 is not impacted by the periodic grating 410. The beam is then focused on the disc media 150 by a high NA objective lens 161. More specifically, the beam is focused on an information layer 153 in the disc, which is covered with a protective layer 152 and disposed on a substrate 151. Reflection off the disc changes the handedness of the circular polarization such that the reflected beam 234 has a second circular polarization that is opposite to the first. Since this second circular polarization has the same handedness as the cholesteric helical twist, the beam is steered by the cholesteric/isotropic periodic grating 410 on return pass. When the beam is transmitted through the quarter-waveplate 145 for a second time, and a second linear polarization results 236 (e.g., which is orthogonal to the first linear polarization). Depending on the grating pitch and wavelength of operation, the return beam is deflected by an angle 320, according to the grating equation (2). The angular deflection is converted to spatial offset by lens 162, resulting in a beam offset Δx 321.

In other words, the polarization-selective periodic grating 410 functions as a holographic beam splitter, which in a forward propagating direction does not provide beam steering so as to preserve beam energy transmitted to the disc 150, and in a backward propagating direction provides beams steering so as to separate the information-bearing beam from the input beam. While this scheme is promising, there are several drawbacks related to the polarization-selective periodic grating 410. First, the wavelength-selectivity of the periodic grating 410 means that only one wavelength of a multiple-wavelength OPU system (e.g., the BD/DVD/CD system illustrated in FIG. 10) can be configured to be diffracting or non diffracting at a given circular polarization. As a result, in order for the holographic beam-splitter to work in a BD/DVD/CD system, it must be designed with three grating layers. This add costs and weight which counters the aim of reducing component size. Note that the wavelength-selectivity is likely related to the fact that the grating works near the cholesteric reflection band edges. A second drawback of the polarization-selective periodic grating 410 is that it works with circularly polarized light. In an OPU system, circularly polarized light is only available between the quarter-waveplate 145 and the disc 150. In addition, the efficacy of the grating 410 is dependent on the purity of the circularly polarized light generated after the quarter-waveplate. A third drawback is that the periodic grating 410 is typically fabricated with by patterning and etching a substrate, and often by filling the etched substrate. As discussed above, these fabrication techniques are often time consuming and relatively high cost. In addition, when the etched surface is filled with another material, it is likely that the refractive index of the filling material will not match the refractive index of the birefringent grating across all wavelength bands of interest. In the non-diffracting case, the cholesteric pixels and the isotropic pixels do not typically have the same index values and a complete suppression of the unwanted circular polarization at all operating wavelengths may not be possible. A fourth drawback is that the achievable grating resolution is generally limited. For example, consider the first example provided in US Pat. No. 2006/0239171. In this example, where the cholesteric LC has a rather high linear birefringence (e.g., Δn=0.2), the 4×4 matrix modeled circular birefringence is approximately 0.04 (e.g., π phase step at λ=660 nm and physical step height of the binary grating of 8.8 μm). This large step impacts the achievable grating resolution. For example, to create a 1 μm pixel width, a 9:1 aspect ratio (height to width ratio) is required, which makes the etching step difficult. For higher-efficiency multi-level phase gratings, the required phase range may approach 2π, requiring even larger aspect ratios. In other words, the prior art is limited in practice to binary phase gratings having coarse grating resolutions, which are not efficient and have small steering angles.

Figure 16:
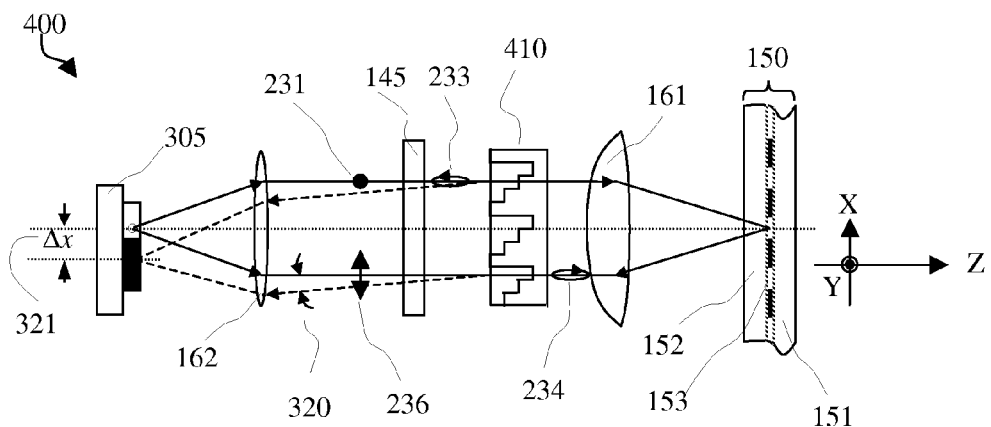
FIG. 16 is a schematic diagram of a prior art OPU including a surface-relief structure (SRS) and/or planar hologram as a polarization-selective beam steering device.
Figure 17:
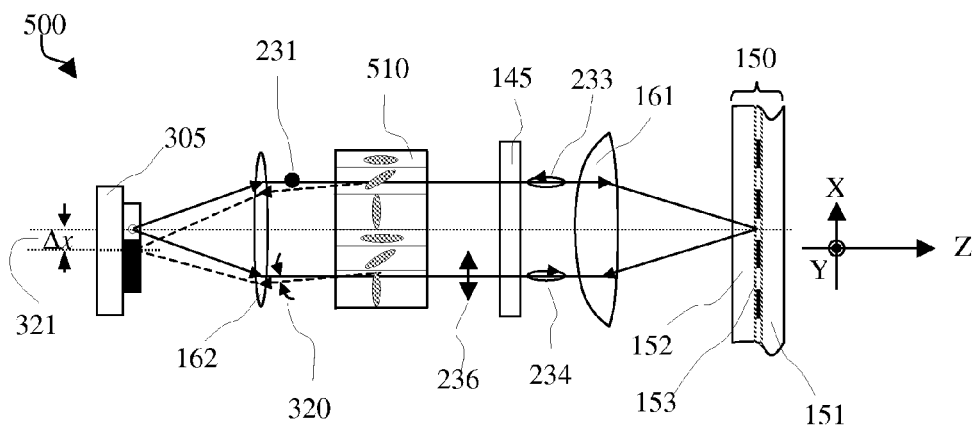
FIG. 17 is a schematic diagram of an OPU including a polarization-selective non-etched flat holographic optical element as the polarization-selective beam steering device, in accordance with one embodiment of the instant invention.

Referring to FIG. 17, a schematic diagram of an OPU 500 in accordance with an embodiment of the instant invention is shown, wherein a polarization-selective periodic LC diffraction grating 510 is provided to replace the polarization-selective periodic grating 410 used in FIG. 16. This non-etched and flat (NEF) LC diffraction grating 510 utilizes a variable tilt LCP film to create an array of variable retarder elements. The slow-axes of all grating pixels are aligned in the same azimuthal plane, but with different amounts of polar angle tilt.

In operation, a co-packaged laser diode and detector module 305 launches a divergent beam towards a collimating lens 162, which produces a parallel beam of a first linear polarization 231 (e.g., which for illustrative purposes is shown orthogonal to the plane of drawing). This linear polarization 231 is orthogonal to the tilt-plane of the polarization-selective LC hologram 510. Since the LC hologram is transparent to this linear polarization, the transmitted light is contained in the zeroth order and is converted to a first circular polarization 233 upon passing through a quarter-waveplate 145. The beam is then focused on the disc media 150 by high numerical aperture (NA) objective lens 161. Reflection at the disc 150 changes the handedness of the circular polarization and upon return, beam 234 has the second (opposite) handedness of beam 233. The second circular polarization then passes through the quarter-waveplate 145 for a second time to provide a second linear polarization 236. This second linear polarization is steered by the polarization-selective LC periodic grating 510 on return pass. Depending on the grating pitch and wavelength of operation, the return beam is deflected by an angle 320, according to the grating equation (2). The angular deflection is converted to spatial offset by lens 162, resulting in a beam offset Δx 321.

In contrast to the prior-art circular-polarization-selective grating 410 discussed above, the polarization-selective LC periodic grating 510 is selectively a hologram and a transparent device, depending on the state of linear polarization input. In contrast to the narrow-band characteristics of a near band-edge cholesteric alternating with isotropic-filling grating 410, the polarization-selective LC periodic grating 510 is operational over a relatively broad band.

Figure 18:
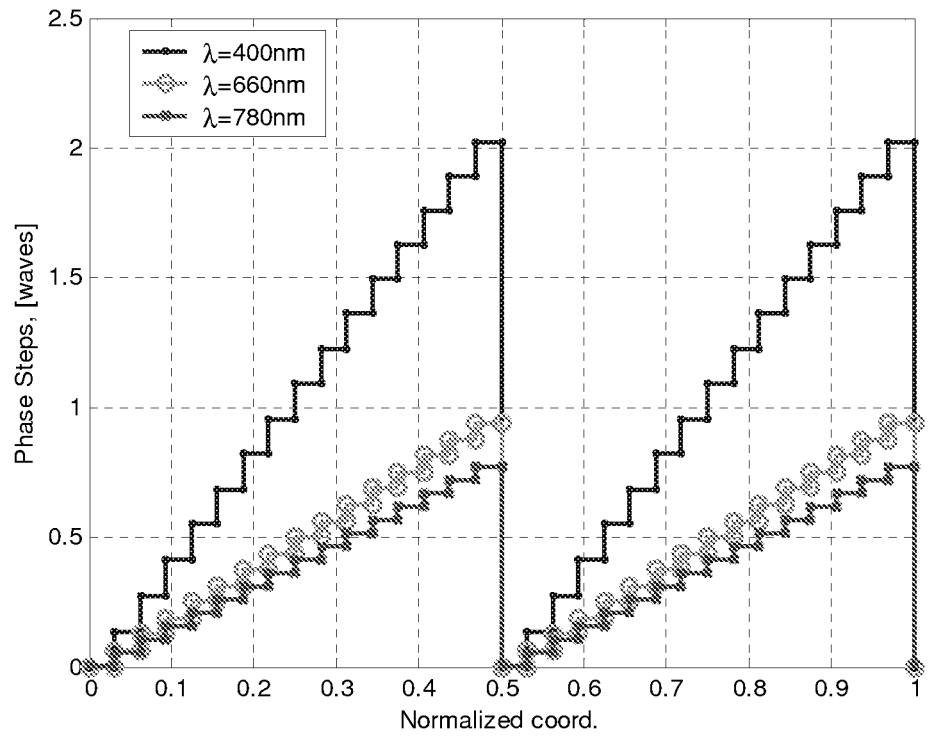
FIG. 18 shows a three-wavelength periodic grating structure steering the light beams to the first order.
Figure 19:
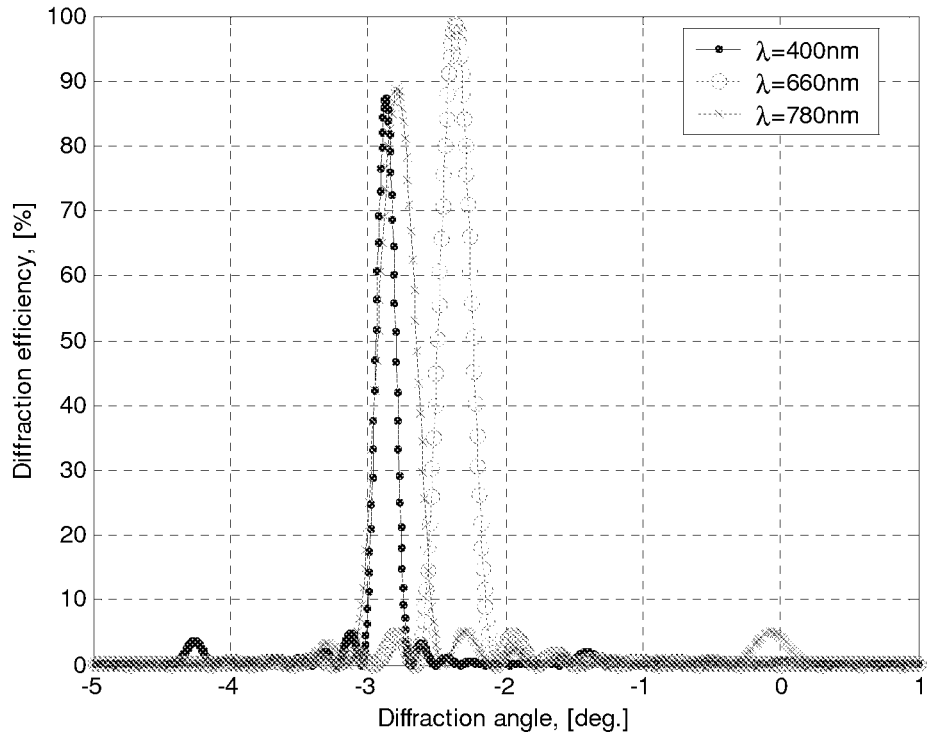
FIG. 19 shows the diffraction angular spectra of a three-wavelength BD/DVD/CD system, for the phase profiles shown in FIG. 18, where each encoding pixel is 1 μm.

As an example, simple grating structures intending to steer light to only the first diffraction order for three discrete wavelength of Blu-ray Disc (BD) or High-definition (HD)-DVD/DVD/CD OPU system is illustrated in FIG. 18. The LC hologram tilt profile is configure as a lossless phase-only grating at the intermediate wavelength of 660 nm. The phase ramp is configured by varying the LC tilt in successive pixels. At the design wavelength of 660 nm, the 16-level phase grating spans 0 to 15π/8 and each encoding pixel is assumed to have a width of 1 μm. With the LC material described above, the LC film thickness is 5.9 μm, if a full range of 0 to 90 degree tilt is usable. At the longer 780 nm wavelength, the natural dispersion of the LC mixture results in less than 2π phase ramp. The hologram diffraction at this wavelength will have zeroth order undiffracted light output. Conversely, the increase birefringence at the short 400 nm wavelength coupled with the shorter full-wave optical path difference requirement results in nearly 4π of phase ramp at λ=400 nm. This means that first order diffraction angles will be approximately the same for all three discrete wavelengths (e.g., at λ=400 nm, the wavelength is nearly half that of λ=780 nm, but its spatial grating period is also nearly half that of the NIR grating). The angular spectrum of the thin LC grating for a polarization input parallel to the LC tilt plane is show in FIG. 19. The design wavelength channel has a first order diffraction efficiency (DE) of approximately 98%. The other two light channels had a first order DE of approximately 88%. In addition, when the input polarization is orthogonal to the LC tilt plane, the LC hologram behaves as a zeroth order grating at any wavelength of illumination. The zeroth order grating may be lossless if polarization purity is assured and external AR losses are excluded.

In US patent application 2006/0239171, the overall thickness of their binary cholesteric/isotropic grating was approximately 10 μm (e.g., which is similar to the above described 5.9 μm). However, the symmetric replay meant that the first order DE is at best 40%. In some other wavelength bands, the reported theoretical DE is less than 10%, due to the phase encoding inefficiency of the dye-based material. With the low circular birefringence in the prior-art techniques, coupled with the requirement to perform photolithography and etching, the aspect-ratio constraint will not permit more than several phase steps. Furthermore, a single grating fabricated this way will not permit simultaneous steering of multiple channels because the circular birefringence is derived close to the absorption/reflection band edges.

Advantageously, the use of the polarization-selective hologram 510 resolves the above-described problems with the prior art (e.g., inadequate phase modulation, severe aspect ratio, low diffraction efficiency, lack of multiple channel operation, etching of material, etc.).

Figure 20:
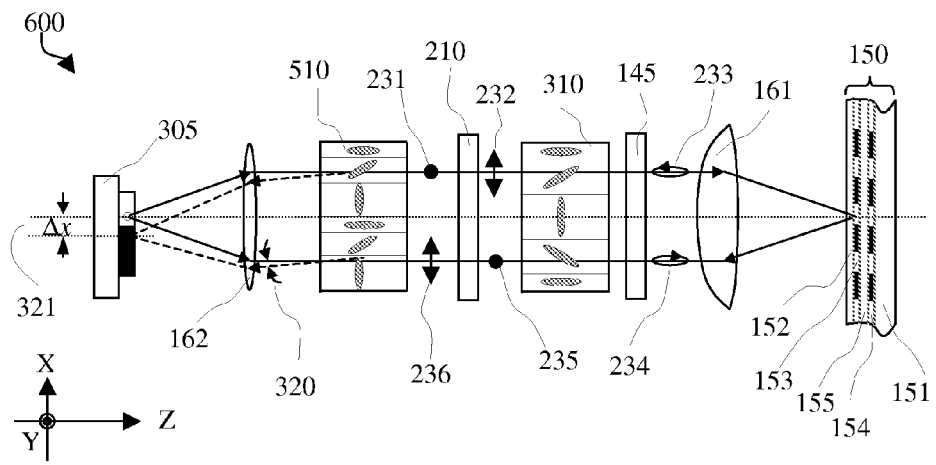
FIG. 20 is a schematic diagram showing part of an OPU including polarization-selective non-etched flat holographic optical elements as the polarization-selective wavefront aberration compensator and the beam steering device.

Referring to FIG. 20, a schematic diagram of an OPU 600 in accordance with an embodiment of the instant invention is shown, wherein a first NEF thin hologram 510, which is a periodic grating, functions as holographic beam splitter and a second NEF thin hologram 310, which is a non-periodic phase mask, pre-conditions the wavefront of a reading/writing beam when the objective lens is refocused onto a non-design information layer depth. In this embodiment, the first 510 and second 310 NEF thin holograms function as described with reference to FIGS. 17 and 14, respectively. The disc 150 is shown to include a first information layer 153 and a second information layer 154, which are disposed on a substrate 151 and separated with a spacer layer 155.

Figure 21:
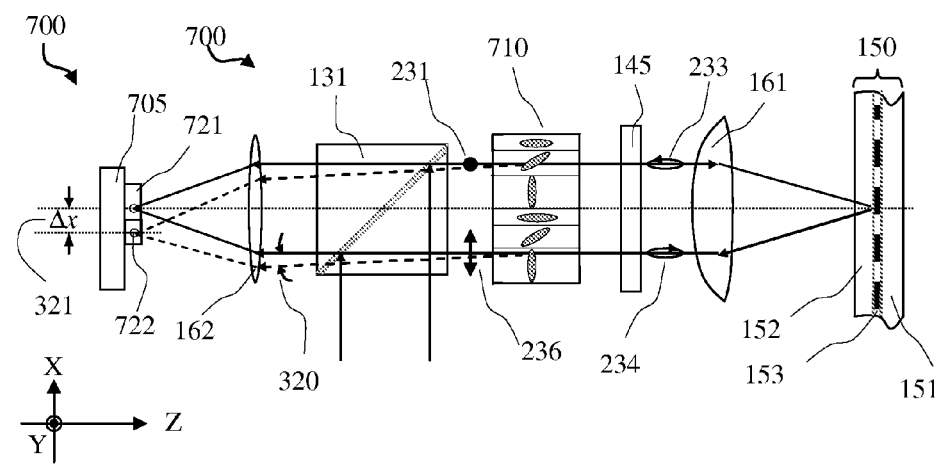
FIG. 21 is a schematic diagram showing part of an OPU including a polarization-selective non-etched flat holographic optical element as the polarization-selective beam steering device for tapping off beamlets in disc-tracking and objective lens focusing, control and feedback.

Referring to FIG. 21, a schematic diagram of an OPU 700 in accordance with another embodiment of the instant invention is shown, wherein a NEF thin hologram 710 is used to tap off a small amount of the return beam. In commercial OPU systems, a small amount of the return beam is frequently tapped in order to track the spiral grooves on the disc media, astigmatism induced by disc warpage, and/or disc placement at an angle versus the read/write beam. The tap-off beam is often imaged to multiple element arrayed-detector. The actual signal beam is allowed to go through to the main photodiode. In such a scenario, the LC hologram design may seek to contain the main beam within the zeroth order and allow a small fraction (say 5%) of the light to one or more replay orders. The OPU system 700 launches one or more channels of laser diode output to the common path via the reflecting port of the PBC 131. The S-polarization is not diffracted by the polarization-selective LC hologram 710 in the first pass. On the return pass, the polarization is converted to one that is parallel to the tilt plane of the LC hologram. The LC hologram is now designed and encoded to replay a large zeroth order. Accordingly, a co-packaged detector array 705 includes the main photodiode 721 for detecting the main signal and one or more auxiliary photodetectors 722 for detecting the tracking beam(s). This predominantly zeroth-order replay can be accomplished, for example, by deliberately providing inadequate phase range. The ideal phase range (e.g., the difference of the first to the last phase steps available for pixel encoding) is $2\pi*(m-1)/m$, where m is the number of phase levels. For example, lossless binary and quarternary phase-only holograms require $\pi$ and $1.5\pi$ phase ranges. The zeroth order undiffracted light (e.g., the sum of the geometric center replay) and all high replication centers is given by, $$DC = \frac{\sinc^2\left(\frac{m}{(m-1)}\frac{\Phi}{2}\right)}{\sinc^2\left(\frac{1}{(m-1)}\frac{\Phi}{2}\right)}, \qquad (8)$$

where $\Phi$ is the total phase range available for encoding up to m levels of phase steps, $\sinc(x)=\sin(x)/x$ and $\sinc(0)=1$. For a binary phase hologram, the DC undiffracted light fraction is $\cos^2(\Phi/2)$. A binary hologram may be the most suitable for tracking purpose in an OPU, where the symmetric replay orders may be useful in detecting geometric skewing and most of the light has to be contained in the zeroth order (i.e., where the diffracted orders do not have to be efficient). For example, if 90% of the light is to be retained as the zeroth order, a binary grating only has to have a phase modulation of ~37 degrees. Under ideal encoding condition, including equal pixel widths of 0 and 37-deg, phase steps, the $\pm 1^{st}$ orders can be expected to yield about 4% light output for tracking purpose. In other embodiments, the polarization-selective LC hologram may be configured to replay the signal beam to the first diffraction order and the tracking beams to other replay orders.

In the embodiments described above, the polarization-selective thin LC holograms provide a phase map for one linear polarization and appear transparent for the orthogonal linear polarization. For example, in one embodiment, the phase map is an aberration correcting non-periodic wavefront map. In another embodiment, the phase map is a periodic grating or hologram that provides beam steering. In these embodiments, the polarization-selective thin LC holograms are supported by a single substrate mounted separately in the corresponding OPU systems. As described above, it is also possible for the polarization-selective thin LC holograms to be supported by another optical element. For example, referring to FIG. 21 the polarization-selective thin LC hologram 710 may be integrated with the quarter waveplate 145.

Figure 22:
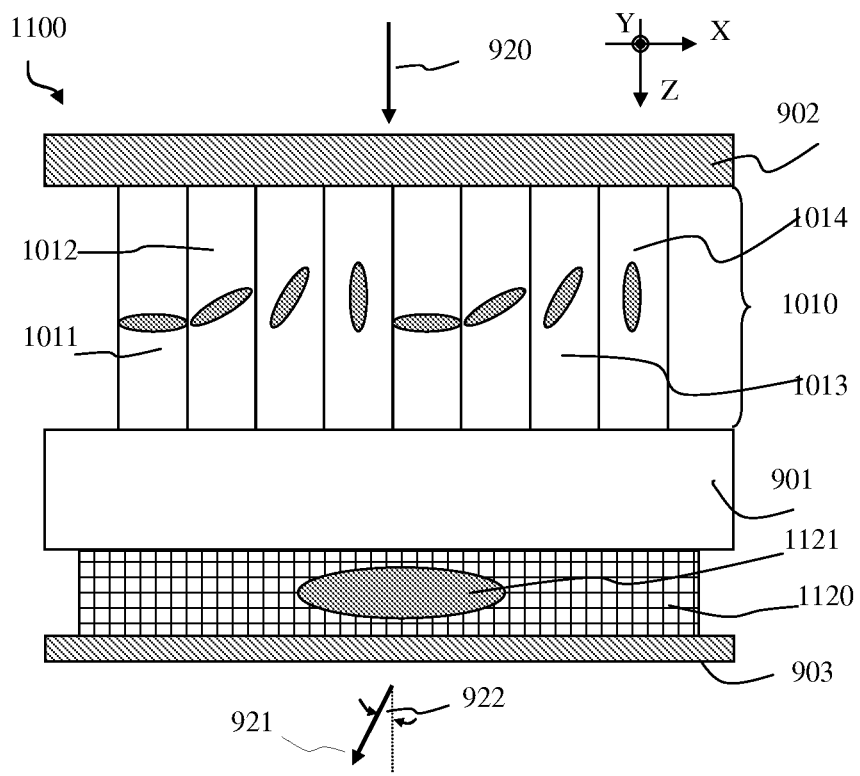
FIG. 22 is a schematic diagram of a thin LC hologram incorporated with a quarter-wave plate in accordance with one embodiment of the instant invention.

Referring to FIG. 22, a compound polarization-selective device 1100 in accordance with one embodiment of the instant invention includes a substrate 901 onto which a LC hologram 1010 is disposed. The LC hologram 1010 includes several pixels 1011, 1012, 1013, 1014 patterned to effect beam steering. The LC tilt plane is aligned parallel to XZ plane, such that the linear polarization parallel to the XZ plane is beam steered whereas linear polarization parallel to the Y-axis is not affected. On the opposite side of the substrate 901, a quarter-waveplate 1120 having one or more layers of birefringent materials is disposed. The slow- and fast-axis of the QWP 1120 are typically aligned at ±45 degree with respect to the X or Y-axis. As a result, the indicatrix 1121 shown is a projection of the full indicatrix onto the plane of drawing. The device 1100 also includes optical AR coatings 902 and 903 to enhance the overall transmittance. In the embodiment described with reference to FIG. 22, the QWP is integrated on the opposite side of the substrate. In another embodiment, the QWP is integrated one the same side of the substrate as the LC hologram, either above or underneath the LC hologram layer. Regardless of the configuration, when this compound element 1100 is used in an OPU, such as that described with reference to FIG. 21, it is preferably positioned such that the LC hologram is within the linear-polarization segment of the OPU.

In operation, a light beam incident parallel to the Z-axis 920 is spatially modulated by the encoded phase profile in 1010. The exiting beam deviates from the specular direction by a small angle. The beam is passed through the QWP 1120, which converts the linear polarization to a circular polarization. This beam then exits the assembly as 921 having an angle offset of 922.

Figure 23:
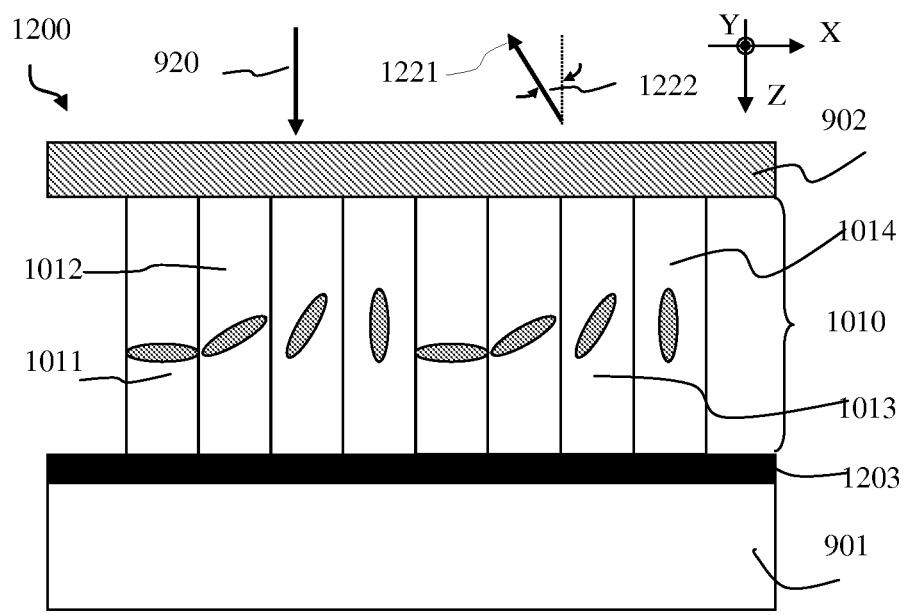
FIG. 23 is a schematic diagram of a thin LC hologram mounted on a reflective substrate or on a reflective layer on a transparent substrate, in accordance with one embodiment of the instant invention.

Referring to FIG. 23, a compound polarization-selective device 1200 in accordance with another embodiment of the instant invention is shown. This compound device 1200 includes a LC hologram 1010 that is disposed on a reflector 1203, which is in turn disposed on a transparent substrate 901. The opposite side of the LC hologram is coated with an AR coating 902.

In operation, an incoming light beam 920 is transmitted through the device 1200 such that wavefront is sampled in the first pass towards the reflector, and a second time on its return from the reflector. Accordingly, the required phase range is half that of a transmissive LC grating device. The output beam 1221 is steered towards the angular direction having the denser pixels (i.e., pixels having A-plate or $n_e$ index of refraction within a grating period). For an identical LC hologram configuration (e.g., same pixel size, phase range, phase encoding at each pixel and wavelength of operation) as the transmissive LC grating device 500 illustrated in FIG. 17, device 1200 will steer through twice as large diffraction angle. Note, however, that the diffraction efficiency may not be maintained, since the double pass gives an effect of having fewer phase steps.

In the embodiments described above, the NEF thin LC holograms function as linear polarization-selective beam steering devices. When configured as a single-spot high efficiency grating replay, the LC hologram transmits the ordinary wave unaffected and steers the extraordinary wave by a small angle. The angle offset is approximately the ratio of the wavelength and grating pitch length (eq. 2). Within the visible and NIR wavelength bands and with practical micron-size pixels, a 16-pixel grating can be configured to steer the main beam to about 2 degrees at >98% efficiency ($\sin^{-1}(0.55/16)$ as steering angle). This quantum of walk-off angle is useful in many applications.

Figure 24:
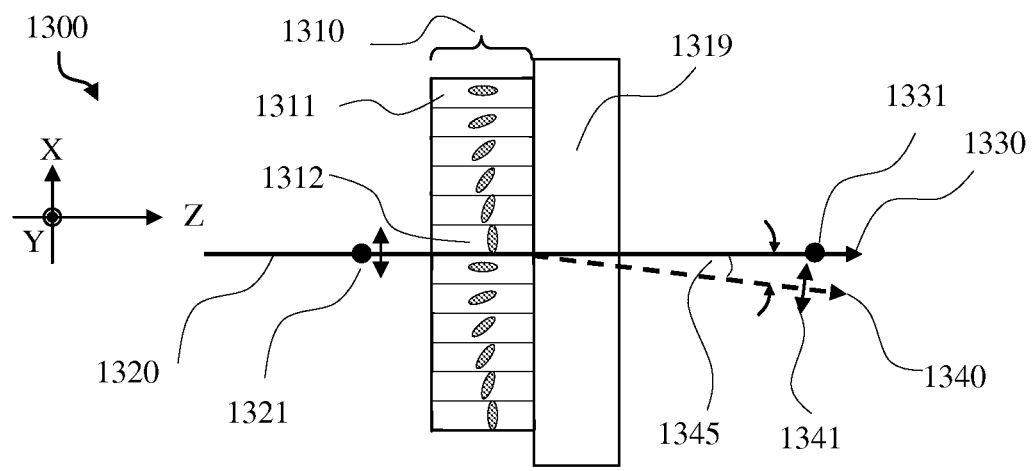
FIG. 24 is a schematic diagram of a flat LC hologram used for polarization-selective beam-steering.

Referring to FIG. 24, a high efficiency LC grating is used as a standalone beam-steering device 1300. The device 1300 includes a transparent substrate 1319 for supporting a LC grating film 1310. The LC grating film 1310 includes a plurality of pixels with tailored phase profile effected by arranging the LC out-of-plane tilt as required. One of the phase pixels 1311 is shown to have C-plate optical symmetry. Another of the pixels 1312 is shown to have A-plate optical symmetry. There intervening pixels (e.g., between 1311 and 1312) are shown to be configured as pixels with O-plate optical symmetry.

In operation, an unpolarized light beam of light 1320 is incident on the left side of the device 1300. The unpolarized beam of light 1320 includes equal amounts of light polarized parallel to the LC tilt plane and light polarized orthogonal to the LC tilt plane, as indicated by 1321. As the unpolarized beam of light 1320 passes through the LC grating 1310, the linear polarization orthogonal to the LC tilt plane samples the o-wave index of the grating pixels and is transmitted unaffected. This o-beam exits as 1330 having a linear polarization perpendicular to the tilt plane 1331. On the other hand, the linear polarization parallel to the LC tilt plane samples the effective e-wave index of the grating pixels. The spatial phase profile of the grating 1310 creates a differential-phase wavefront, which steers the e-wave to non-zero output angles along a direction parallel to the grating vector plane. The e-wave 1340 exits the LC grating device 1300 having a linear polarization 1341 parallel to the tilt-plane. The steering angle is given by 1345. It is noted that in general the tilt-plane does not have to be parallel to the grating vector plane. The tilt-plane selects the diffracted linear polarization whereas the grating vector selects the plane of diffraction.

Figure 25:
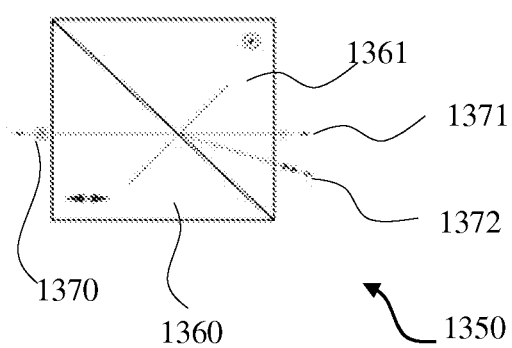
FIG. 25 is a schematic diagram of a prior art Rochon polarizer utilizing negative uniaxial birefringent crystal such as calcite or α-BBO.

Notably, this single-stage LC hologram device 1300 is functionally equivalent to a prior-art Rochon polarizer made of two crystal wedges. A schematic diagram of a Rochon polarizer is shown FIG. 25. The crystal polarizer 1350 includes a first wedge 1360 which is aligned with its optic axis parallel to the nominal beam direction and a second wedge 1361 which is aligned with its optic axis orthogonal to the plane of drawing. A light ray input 1370 having polarization components parallel and orthogonal to the plane of drawing samples the ordinary index of refraction while propagating through the first wedge unchanged. At the wedge boundary, the linear polarization parallel to the plane of drawing continues to sample the ordinary index in the second wedge and therefore exits the polarizer unaffected (without change in polarization and beam direction). The other linear polarization which is orthogonal to the plane of drawing samples the extraordinary index in the second wedge. With the use of negative uniaxial crystal materials, the resultant drop in index values means the ray is refracted away from the normal line to the wedge boundary. The second linear polarization is steered to an angle while exiting the polarizer. If the wedges are made of calcite crystals, having $n_o$ and $n_e$ indices of [1.66 and 1.49] at $\lambda=550$ nm, the large birefringence is calculated to provide about 7-degrees of beam steering within the second wedge which is equivalent to about 10 degree in air. Notably, the NEF diffractive optical elements in accordance with various embodiments of the instant invention have been calculated to yield about 2 degree for 16-phase levels of 1 µm pixel width. While this beam steering is not as large, the NEF diffractive elements provide the advantage of large aperture and thin form factor.

Another application of a polarization-selective hologram in accordance with one embodiment of the instant invention is as a beam-steering element in external cavity lasers. In external-cavity laser systems, a linear polarizer is often used to preferentially select the lasing polarization. The polarizer absorbs/reflects the unwanted polarization and allows the required polarization to continue to build up the round trip amplification before exiting the cavity. Organic absorptive polarizers often lack the reliability requirements for high power operation. A reflective type wiregrid based polarizer creates other issues such as grid cleaning and metal layer absorption.

Figure 26:
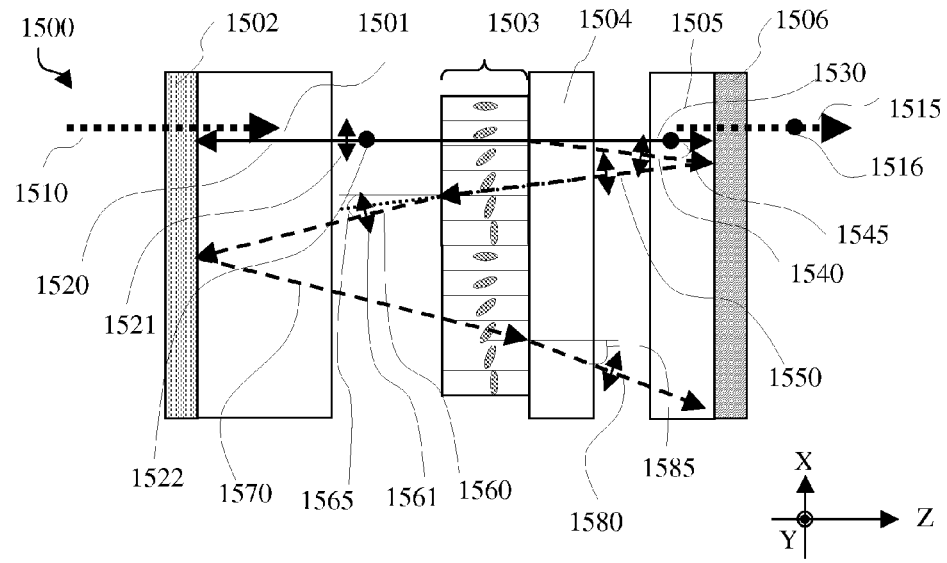
FIG. 26 is a schematic diagram of an external-cavity laser utilizing plano-plano reflectors, wherein the laser includes a laser crystal, a flat LC hologram polarization-selective beam-steering device, and a second harmonic generation crystal.

Referring to FIG. 26, an external-cavity solid-state laser system 1500 is shown to include a laser crystal 1501 having a front facet coating 1502, a polarization-selective beam-steering device 1503 disposed on a transparent substrate 1504, and a second harmonic generation crystal 1505 with an rear (exit) facet reflector 1506. The laser crystal 1501 is typically doped with rare-earth metal elements, such as Nd:YAG (neodymium doped yttrium aluminum garnet), Nd:YV$_{O4}$ (neodymium doped yttrium vanadate), etc., in order to produce an emission of the desired wavelength. For example, the diode-pumped light maybe 808 nm whereas the emission is 1064 nm. The second harmonic generation crystal, for example KTP (potassium titanyl phosphate), is a bulk non-linear crystal which converts the laser crystal emission into another wavelength (e.g, 532 nm with the 1064 nm input light). The second harmonic generation may also be obtained within the confined waveguide modes of periodically poling lithium niobate. The polarization-selective grating 1503 allows a single polarization of the fundamental frequency light to lase within the laser cavity. The second harmonic light generated with the frequency doubler crystal will then output the same polarization.

In operation, a diode-pump launches a light beam 1510 (e.g., λ=808 nm) into the laser crystal 1501 through the pump-light HT (high transmission) coating 1502. This light is absorbed by the laser crystal 1501, which causes an emission of the fundamental frequency light (e.g., λ=1064 nm). The emitted light propagates forward as light ray direction 1520 having a mixture of two orthogonal linear polarizations which are parallel to the plane of drawing 1521 and perpendicular to the plane of drawing 1522. The polarization-selective LC grating 1503 allows the o-wave (e.g., linear polarization perpendicular to the plane of drawing) to transmit through without deviation as beam 1530, while diffracting the e-wave (e.g., linear polarization parallel to the plane of drawing) as beam 1540 having small deflection 1545. The equivalent deflection angle in air, after the first pass through the LC grating, $\theta_1$, is $\sin^{-1}(\lambda/\Lambda)$. Upon reflection from the high reflector 1506 at the fundament frequency light, the deflected beam travels at $-\theta_1$ to the system axis as beam 1550. This beam is again incident on the polarization-selective grating 1503, and is transmitted through as beam 1560 which is steered further from the system axis. This second pass beam maintains the linear polarization parallel to the plane of drawing 1561, at an equivalent deflection angle in air, $\sin(\theta_2)=\sin(-\theta_1)-\lambda/\Lambda$; $\sin(\theta_2)=-2\lambda/\Lambda$. The beam that has passed the LC grating twice is reflected at the front facet reflector 1502 and propagates as beam 1570 at $-\theta_2$ with respect to the system axis towards the LC grating. This beam is again deflected a third time, giving 1580 and having a deflection angle 1585 given by $\sin(\theta_3)=\sin(-\theta_2)+\lambda/\Lambda$; $\sin(\theta_3)=3\lambda/\Lambda$. It can be seen that the linear polarization parallel to the plane of drawing is deflected away from the optical system of the laser system with each transmission through the polarization-selective LC grating. As a result, light having this polarization is highly deviated from the gain segment of the laser crystal such that a coherent lasing action is not permitted. The linear polarization corresponding to the e-wave of the LC grating is suppressed in the laser system and the second harmonic light generation at this polarization is also suppressed. While the linear polarization parallel to the plane of drawing is progressively deflected away from the optical axis of the laser system, the linear polarization perpendicular to the plane of drawing is reflected multiple times along the principal axis as beam 1530. With each reflection of the front facet 1502 and the rear-facet 1506 reflectors, the amplitude of the fundament frequency light, polarized perpendicular to the plane of drawing is built up. Some of this fundamental frequency light is converted into its second harmonic light by the non-linear crystal 1505. The second harmonic light exits the laser via a high-transmission rear-facet coating 1506.

Advantageously, the NEF polarization-selective LC hologram works as a polarization discriminator in the external cavity laser by steering off the unwanted linear polarization. The linear polarization that is suppressed in the system can be chosen by the tilt-plane. The LC hologram is fully flat and aids integrating, handling, and cleaning. In this application, the functionality of the LC hologram is analogous to that of a Rochon polarizer (e.g., where one beam of the first linear polarization is undeflected while the orthogonal beam is diffracted slightly). For a laser system amplification, a very slight angle deflection with each round trip traversing is enough to decrease gain and result in no lasing action for the polarization that is deflected. In addition, the NEF polarization-selective LC grating has a large aperture and a relatively thin form-factor. Note that the grating vector-plane selection is less of importance in a radially-symmetric laser system.

In the above described embodiments, the NEF diffractive optical elements have been single-layer LC grating films, which for example have been used for aberration correction and holographic beam-splitting in OPU systems and lasing polarization selection in external-cavity lasers. In other embodiments, the NEF diffractive optical elements are formed from more than one LC grating layer.

Figure 27:
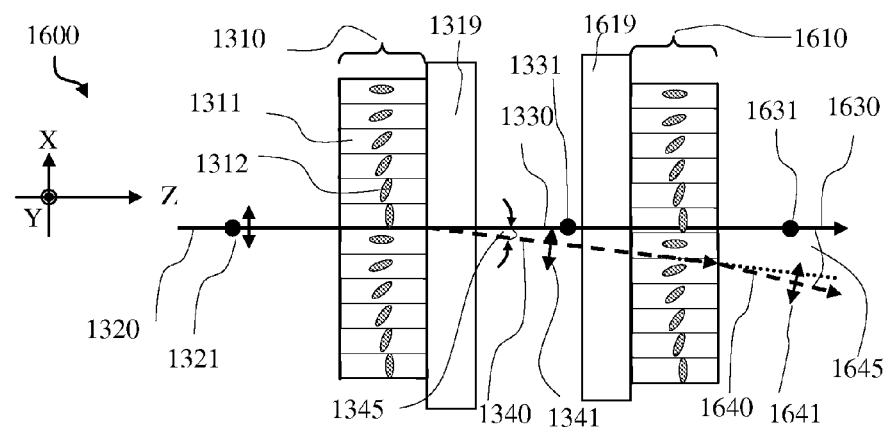
FIG. 27 is a schematic diagram of a dual-stage flat LC hologram beam steering device wherein the selected polarization in both stages are parallel.

Referring to FIG. 27, a dual-stage device 1600 in accordance with one embodiment of the instant invention includes two LC gratings similar to that illustrated in FIG. 24 disposed in series. More specifically, the compound device 1600 includes a first NEF diffractive optical element 1310 and a second NEF diffractive optical element 1610, which are fabricated to be close to identical, and which are disposed such that the deflection angles from the two stages are aligned with the same angle sense. For example, in one embodiment the both the LC tilt-plane and the grating vectors are the same in the each of the first and second stage LC gratings.

In operation, a light beam 1320 including both linear polarizations 1321 is split by LC grating 1310 as o-wave 1330 and e-wave 1340. The second LC grating 1610 placed after the first LC grating 1310 then steers the e-wave a second time, giving a compound deflection angle $\sin(\theta)=2\lambda/\Lambda$, where λ is the wavelength of illumination and Λ is the grating pitch. The e-wave output 1640 from the two-stage device has the linear polarization 1641 parallel to the plane of drawing, with the deflection angle 1645. The unaffected linear polarization perpendicular to the plane of drawing exits as beam 1630 with polarization 1631. This two-stage configuration may be useful if the LC grating thickness cannot be configured to provide a single-stage steering at the required angle of deflection.

Figure 28:
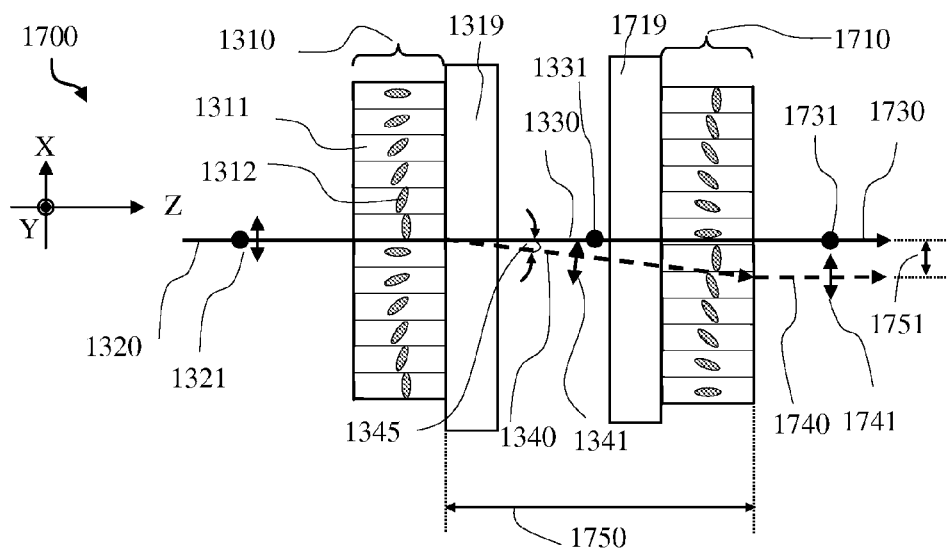
FIG. 28 is a schematic diagram of a dual-stage beam-displacer with flat LC hologram beam steering devices wherein the selected polarization in both stages are parallel and the diffraction angle sense is opposite.

Referring to FIG. 28, a dual-stage device 1700 in accordance with another embodiment of the instant invention includes two of the LC gratings illustrated in FIG. 24 disposed in series. More specifically, the compound device 1700 includes a first NEF diffractive optical element 1310 and a second NEF diffractive optical element 1710, which are fabricated to be close to identical, and which are disposed such that the deflection angles from the two stages are aligned in opposite angle sense. For example, in one embodiment the LC tilt-plane and grating vectors are parallel in the first and second stage LC gratings, although they do not necessarily coincide. Note, that although the tilt planes are parallel in the two gratings, the gratings are disposed such that the out-of-plane tilts are in opposite directions. For example, in one embodiment the second LC grating 1710 is placed after the first LC grating 1310 such that it is oriented with its azimuthal position rotated by 180 degree, and such that the two LC gratings steer light beams with oppositely signed angles.

In operation, a light beam 1320 including both linear polarizations 1321 is split by LC grating 1310 as o-wave 1330 and e-wave 1340. The e-wave output from the first stage LC grating 1310 is deflected with an angle $\sin(\theta)=\lambda/\Lambda$ and this becomes the angle of incidence in the second stage LC grating 1710. The e-wave output of the second stage hologram now steers the incoming beam by $-\sin^{-1}(\lambda/\Lambda)$ which restores the input beam direction. However, due to the propagation at angle θ between stage 1 and stage 2 for a given distance l 1750 the beam undergoes a lateral translation Δx. This lateral translation 1751 is approximately given by $\Delta x = l*\tan(\theta)$ in air. Accordingly, this two-stage device 1700 functions as a beam walk-off element or a beam displacer.

Accordingly, another application of a polarization-selective hologram in accordance with one embodiment of the instant invention is as a beam displacer in an optical circulator, isolator, optical low-pass filter, etc. Advantageously, the polarization-selective hologram, used as a walk-off device with parallel ordinary-ray (o-ray) and extraordinary-ray (e-ray) outputs, is fabricated by cascading two similar gratings. In particular, a first linear grating (1D) sets up a high-efficiency single-order grating replay such that the exiting beam propagates forwards at a characteristic deflection angle until a second, inverse signed angle steering 1D grating corrects for the non-normal beam angle. For a given grating geometry and depending on the gap between the two hologram stages, the lateral offset between the parallel o-ray and e-ray is set accordingly.

Figure 29:
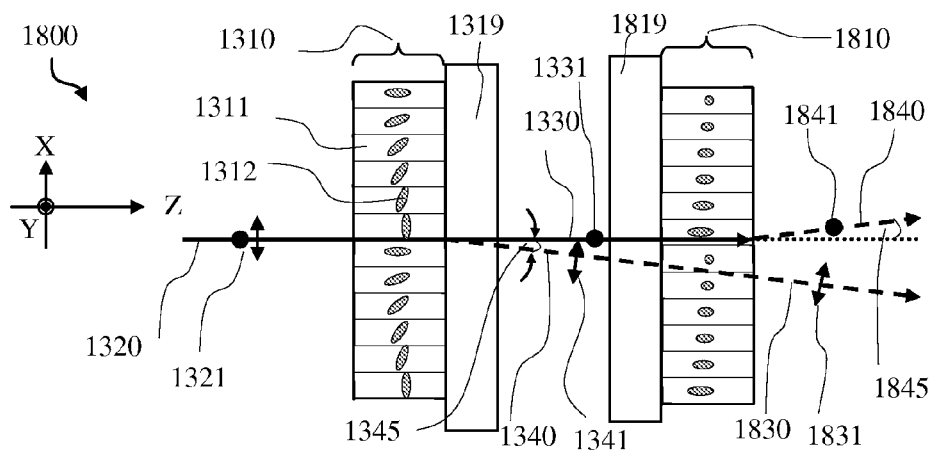
FIG. 29 is a schematic diagram of a dual-stage flat LC hologram beam steering device wherein the selected polarizations in both stages are orthogonal and both polarization beamlets are deflected to the opposite angular directions.

Referring to FIG. 29, a dual-stage device 1800 in accordance with another embodiment of the instant invention includes two of the LC gratings illustrated in FIG. 24 disposed in series. More specifically, the compound device 1800 includes a first NEF diffractive optical element 1310 and a second NEF diffractive optical element 1810, which are fabricated to be close to identical, and which are disposed such that the LC tilt planes of the two LC grating stages are aligned perpendicular, and such that the two LC hologram stages act on orthogonal linear polarizations. More specifically, the second stage LC grating 1810 is arranged to have its grating vector plane parallel to that of 1310, but with the LC tilt plane at perpendicular plane to that of 1310. The LC indicatrices shown are projections onto the plane of drawing. The second stage LC grating is also configured to steer to the opposite signed angle as the first stage LC grating. As a result of this configuration, the o-wave 1330 and e-wave 1340 outputs from the first LC hologram exit the second LC grating as e-wave 1840 and o-wave 1830, respectively. The e-wave 1840 is steered through an angle $-\sin^{-1}(\lambda/\Lambda)$ whereas the o-wave 1830 output is unaffected (exit at the original steering angle $\sin^{-1}(\lambda/\Lambda)$).

Figure 30:
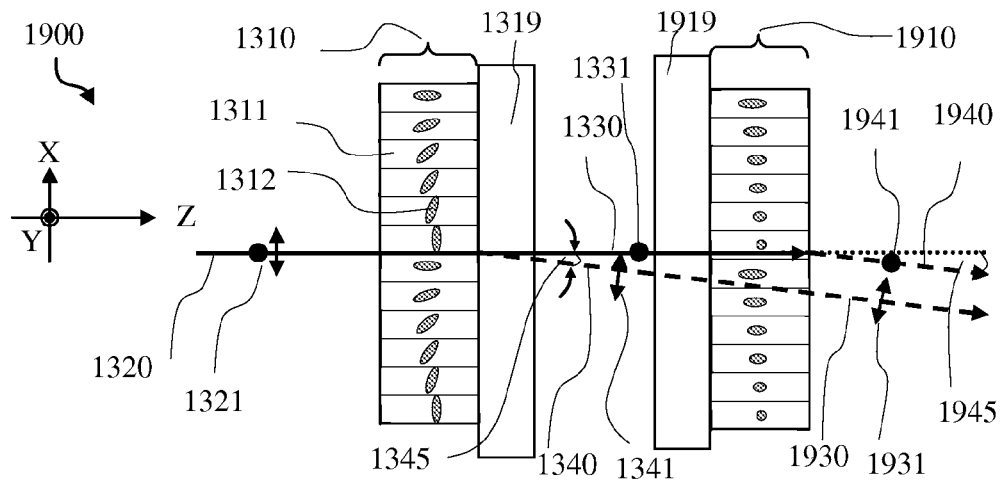
FIG. 30 is a schematic diagram of a dual-stage flat LC hologram beam walk-off device wherein the selected polarizations in both stages are orthogonal and both polarization beamlets are deflected to the same angular direction.

Referring to FIG. 30, a dual-stage device 1900 in accordance with another embodiment of the instant invention includes two of the LC gratings illustrated in FIG. 24 disposed in series. More specifically, the compound device 1900 includes a first NEF diffractive optical element 1310 and a second NEF diffractive optical element 1910, which are fabricated to be close to identical, and which are disposed such that the LC tilt planes of the two LC grating stages are aligned perpendicular, and such that both linear polarizations inputs to the device are beam-steered. More specifically, the second stage LC grating 1910 is arranged to have its grating vector plane parallel to that of 1310, but with the LC tilt plane at perpendicular plane to that of 1310. The LC indicatrices shown are projections onto the plane of drawing. The second stage LC grating is also configured to steer to the same signed angle as the first stage LC grating. As a result of this configuration, the o-wave 1330 and e-wave 1340 outputs from the first LC hologram exit the second LC grating as e-wave 1940 and o-wave 1930, respectively. The e-wave 1840 is steered through an angle $\sin^{-1}(\lambda/\Lambda)$ whereas the o-wave 1830 output is unaffected (exit at the original steering angle $\sin^{-1}(\lambda/\Lambda)$). Both o- and e-waves exit the compound device parallel. The unique functionality here is that this compound grating is no longer polarization-selective. Bar the small lateral offset due to the thickness of the LC gratings (say several microns), any polarization input is steered by angle θ to the optical axis. The two substrates in the depicted device 1319 and 1919 may be omitted by coating both the LC grating layers 1310 and 1910 successively on a single substrate.

Each of the four dual-stage configurations 1600, 1700, 1800 and 1900 discussed above, the devices have been configured to have parallel grating vectors in stage one and stage two. In other embodiments, a dual-stage configuration having arbitrary first stage and second stage steering planes (dictated by the grating vectors) is provided. In this case, the LC tilt planes in the first and second gratings will be either parallel or perpendicular to accept both linear polarization inputs.

Figure 31:
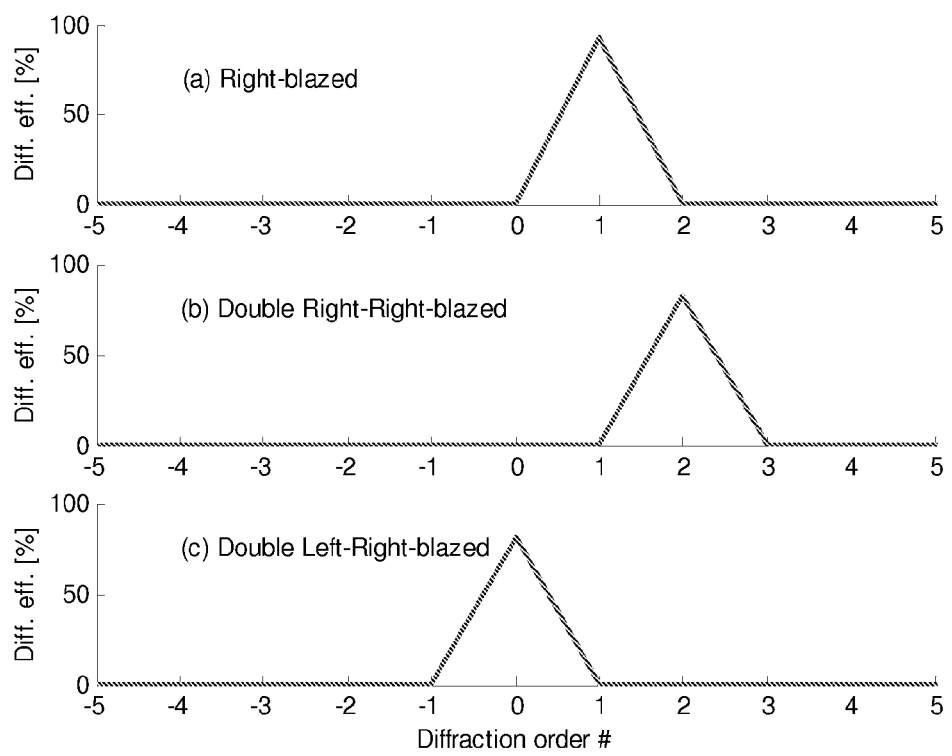
FIG. 31 shows a GSolver simulated single stage grating (a) and dual-stage right-right (b) and left-right (c) blazed gratings.

The two-stage LC holograms have been simulated with an RCWA [rigorous coupled-wave analysis, GSolver by Grating Solver Development Company, Allen, Tex., version 4.20b] program at $\lambda$=550 nm, by representing the LC grating as non-polarization-selective air/dielectric blazed grating having 16 phase pixels of 1 µm width each. The results are shown in FIG. 31. A right blaze is a stairs-steps like phase ramp with the right side of a single grating pitch having a longer optical path length when the observer is viewing the beam head-on. This blazed grating steers the beam to the first order, which is located to the right of the zeroth order, as shown in plot (a) of FIG. 31. In this case, the DE approaches 92%, without AR coating on the air/1.5 index grating. In plot (b) of FIG. 31 a first right blazed air/1.5 index grating is followed by a second right blazed air/1.5 index grating. This dual-stage grating steers the output light to twice the spatial frequency as compared to a single grating (plotted as order of 2). In the simulation, neither grating was AR coated and the inter-grating layer had an index of 1.5 and 220 µm physical thickness. The beam displacer is illustrated by results in plot (c) of FIG. 31. The compound grating had a first left-blazed grating nearer to the incidence, followed by a second right blazed grating adjacent to the substrate. The two gratings are separated by an inter-grating layer of 1.5 index and 220 µm physical thickness. Both gratings had identical 16 phase levels, forming a ramp over 16-µm grating pitch length. The result shows that the steering angle imposed by the first stage grating is corrected by the second stage grating. The output beams are co-linear but are spatially offset by a certain amount (not shown in diffraction simulation). Both dual-stage simulation examples produced about 82% of main order efficiency.

Figure 32:
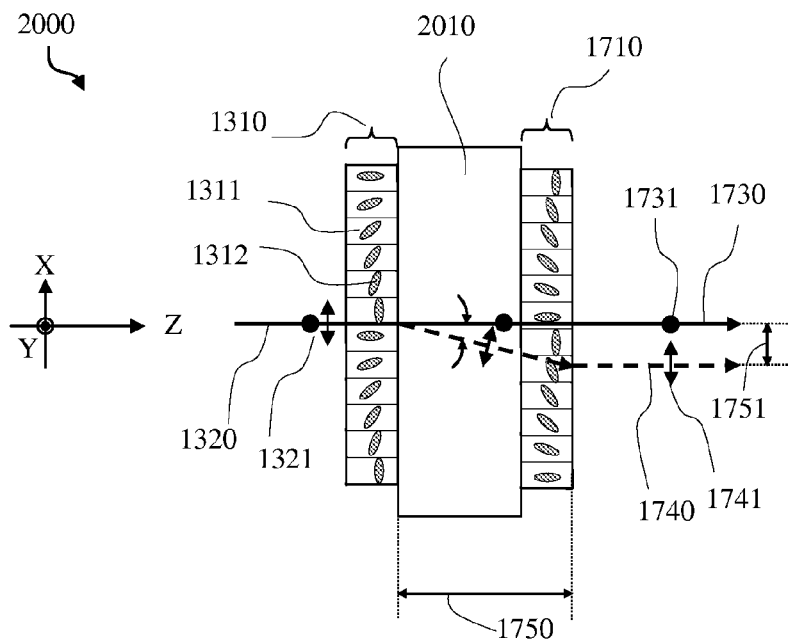
FIG. 32 is a schematic diagram of a dual-stage flat LC hologram beam walk-off device producing parallel o-beam and e-beam outputs.

Referring to FIG. 32 the first LC gratings 1310 and second LC gratings 1710 are shown disposed on opposite sides of a single substrate 2010, respectively. Note that the NEF diffractive optical element 2000 is functionally equivalent to the compound NEF diffractive optical element 1700. In these figures, like numerals are used to defined like elements. The transparent substrate 2010 supports the LC grating layers and functions as an inter-grating layer. Using the 2-degree steering example described previously (e.g., with 16-pixel grating at 1 µm pixel pitch) and assuming a 1.5 index for the inter-grating layer 2010, a ~220 µm inter-grating layer will give rise to approximately 5 µm of beam displacement. The exit beams, polarized parallel and perpendicular to the grating vector, are parallel headed. This walk-off of ~5 µm meets the requirement of optical low-pass filter applications. In digital imaging systems, an anti-aliasing technique is to utilize beam walk-off, to ensure that a minimum image spot size is focused onto the electronic CCD/CMOS array backplane. The walk-off is typically implemented with 45-degree cut uniaxial crystal plates of suitable thickness. Crystal plates are expensive to manufacture. Alternatively, spin-coated homogeneous LC films, aligned at 45-degree can be used to provide a suitable walk-off (e.g., see U.S. Pat. No. 7,088,510). However, the difficulty associated with the fabrication of thick LC layers (tens of microns) at the required 45-degree tilt makes a homogenous tilt LC film impractical. In comparison, the two-layer LC grating 2000 accomplishes the beam displacement by first providing a beam steering function in the first LC grating, allowing the deflected beam to accumulate spatial offset by an inter-grating layer and finally correcting the beam angle by a second LC grating.

Figure 33:
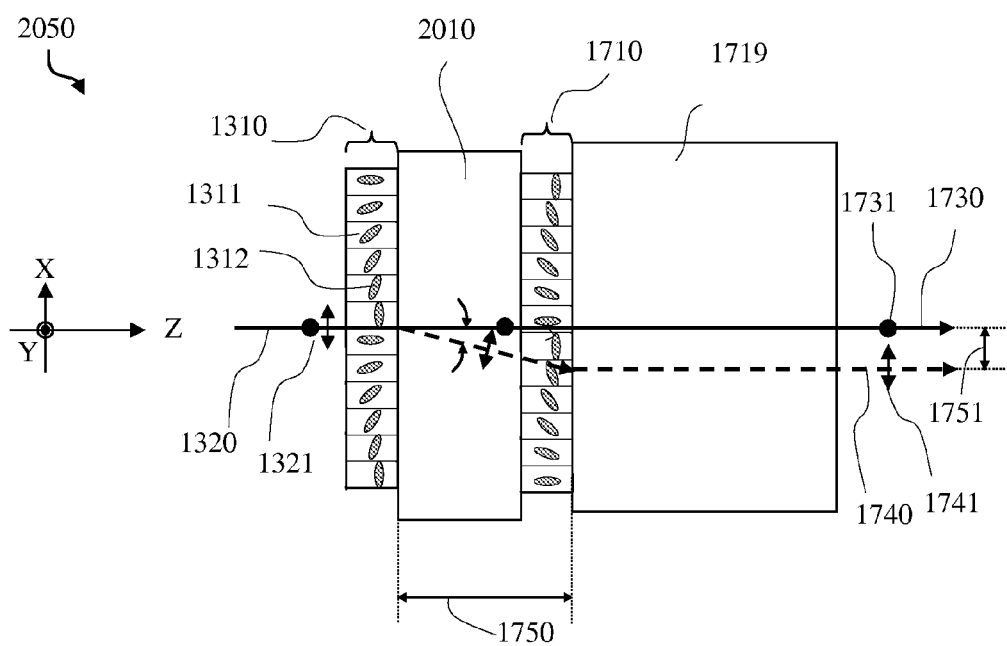
FIG. 33 is a schematic diagram of a dual-stage flat LC hologram beam walk-off device mounted on a substrate and producing parallel o-beam and e-beam outputs.

Referring to FIG. 33, there is shown another embodiment of the instant invention, wherein the LC gratings are separated by a deposited inter-grating layer, and are provided on a single-side of a substrate. More specifically, the device 2050 includes a transparent substrate 1719, onto which a first LC grating 1310 and a second LC grating 1710 are provided, wherein the first and second LC grating layers are separated by an inter-grating layer 2010. Like numerals have the same definitions as those in FIGS. 28 and 32. The exiting beams are polarized orthogonally and are co-linear. The beam separation at the exit is given by, $$\Delta x = l * \tan(\sin^{-1}(\lambda/(n\Lambda))), \quad (9)$$

where l is the layer thickness of the inter-grating layer having an index of refraction n, λ is the wavelength of illumination, and Λ is the grating pitch.

Figure 34:
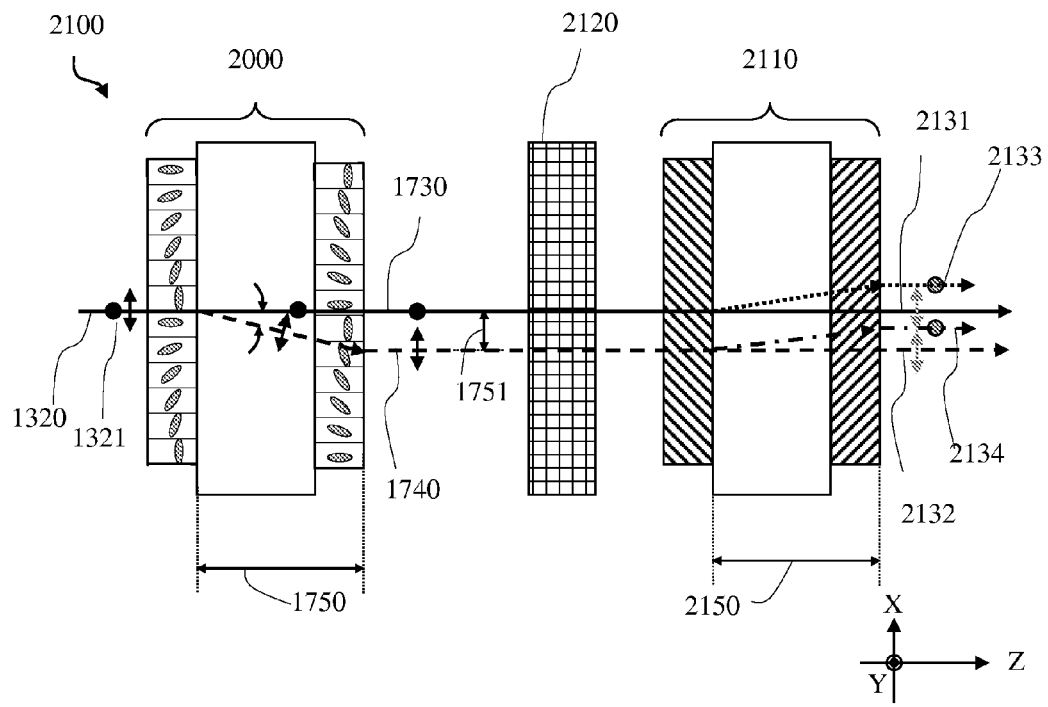
FIG. 34 is a schematic diagram of a two-dimensional beam walk-off device for optical low-pass filtering.

Another application of the NEF diffractive optical elements of the instant invention is as a two-dimensional (2D) walk-off element in an optical low pass filter (OLPF). For example in one embodiment, multiple stages of a walk-off device similar to that shown in FIG. 28 are cascaded to form a OLPF used to cut off high spatial frequency image components in digital imaging systems. Referring to FIG. 34, the 2D walk-off device 2100 includes a first walk-off LC grating device 2000, a second orthogonal-axis walk-off LC grating device 2110, and a polarization scrambler 2120. For an input wave 1320 having two orthogonal linear polarizations 1321, the first walk-off LC grating device 2000 displaces the e-wave beam 1740 by a predetermined amount 1751 relative to the unaffected o-wave beam 1730. The two co-linear beams (parallel in direction of propagation) at orthogonal linear polarizations are then scrambled by the polarization scrambler 2120 to yield both orthogonal linear polarizations for each beam. In one embodiment, the polarization scrambler 2120 is a retarder element, such as a quarter-waveplate. The two beams, which include linear polarizations both parallel and perpendicular to the plane of drawing, propagate to the second walk-off LC grating device 2110. The grating vector for the second LC grating device 2110 is arranged orthogonal to the grating vector of the first grating device 2000. By this arrangement, the output of the first grating device 2000 is displaced along the plane of drawing while the output of the second grating device 2110 is displaced perpendicular to the plane of drawing.

When the polarization scrambler 2120 is a quarter-waveplate, the fast/slow axis of the quarter-waveplate (QWP) is aligned typically at ±45 degree with respect to the plane of drawing. The two beams 1730 and 1740 exiting the first walk-off LC grating device are converted to circular polarization by the QWP (i.e. there is equal amount of linear polarizations along any two orthogonal directions). It may be common to choose the tilt-plane to be either parallel (shown in FIG. 34) or orthogonal (not shown) to the grating vector for the second walk-off LC grating device. Approximately half of each beam power is displaced into the plane of drawing by the second walk-off LC grating device. This set of two beams is shown as 2133 and 2134 in FIG. 34. They are polarized parallel to the tilt-plane of the second walk-off LC grating device. The remaining two beams 2131 and 2132, which were unaffected, are polarized perpendicular to the tilt-plane of the second walk-off LC grating device. Accordingly, the 2D OLPF produces four beam spots for each beam input arrangement in a square grid (or rectangular grid if the quantum of displacement for first stage is not the same as the second stage).

Figure 35:
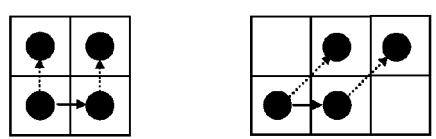
FIG. 35 is a schematic diagram showing a square 2D walk-off (a) and a diamond 2D walk-off (b)

The beam walk-off pattern is shown as plot (a) in FIG. 35. The first stage walk-off displaces a single input beam into two approximately equal intensity spots, as indicated by the solid arrow. Prior to the second stage walk-off, the polarizations of both beams are scrambled. A second stage walk-off along an orthogonal axis then results in four beam spots distributed at four adjacent CCD/CMOS pixels.

In case of walk-off via 45-degree cut crystal plate and without the use of a polarization scrambler, the second stage walk-off may be arranged to have the e-wave axis at ±45 degree with respect to the first walk-off stage output. Each first stage walk-off output beam is resolved into half e-wave and half o-wave. The e-wave is further displaced along the ±45 degree diagonal, resulting a diamond shape walk-off pattern (e.g., see plot (b) in FIG. 35).

Figure 36:
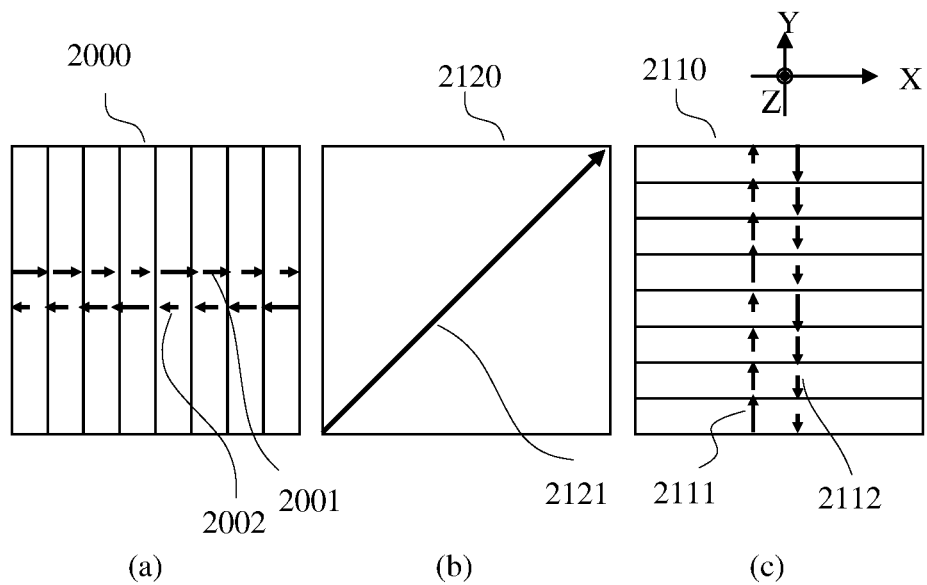
FIG. 36 is a plan view of (a) a first stage LC hologram, (b) second stage QWP, and (c) a third stage LC hologram with orthogonal steering.

In the case of the walk-off via polarization-selective LC gratings, the polarization scrambler stage may be omitted without sacrificing the ideal square walk-off pattern. The plan view of the two-stage walk-off OPLF with a quarter-waveplate polarization scrambler is depicted in FIG. 36. In (a) the walk-off LC grating device 2000 is shown with a horizontal grating vector. The LC indicatrix projections onto the plane of drawing are shown as 2001 and 2002 for the first layer and the second layer within the first walk-off device. The quarter-waveplate 2120 is shown with a slow-axis 2121 aligned at 45 degree with respect to the grating vector of the first walk-off device (e.g., see diagram (b)). The second walk-off grating device 2110 has its grating vector aligned vertically (e.g., perpendicular to the first grating vector). As was stated previously, the tilt-plane of the second grating device can be chosen arbitrarily since the polarization scrambler results in circular polarization input to the second walk-off grating device. The diagram in (c) illustrates tilt-plane aligned along the second grating vector. The LC indicatrix projections onto the plane of drawing are labelled 2111 and 2112. The second walk-off grating device displaces the beam in the vertical direction for the fraction of power aligned at vertical polarization.

Figure 37:
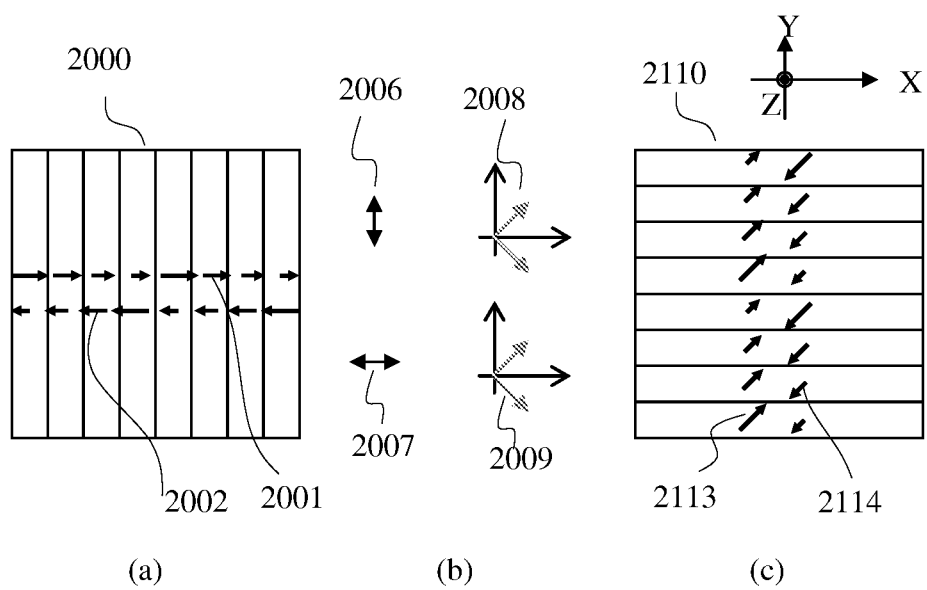
FIG. 37 is a plan view of (a) a first stage LC hologram with horizontal grating vector, (b) orthogonal linear polarization output of first stage LC hologram and their resolved components parallel and orthogonal to a new coordinate basis, and (c) a second stage LC hologram with orthogonal steering (vertical grating vector) and rotated tilt-plane.

As discussed above, it is also possible to configure the OPLF without the intermediate polarization scrambler. This scheme is illustrated with reference to FIG. 37. The first walk-off grating device is shown in (a) having a first grating vector in the horizontal plane, similar to that shown in (a) of FIG. 36. The two beams exiting the first walk-off grating device are polarized parallel 2006 and perpendicular 2007 to the plane of drawing. In order to obtain approximately equal e-wave and o-wave power fraction from each beam without polarization scrambling, the tilt-plane of the second walk-off grating device has to be aligned ±45 degree with respect to the first grating vector. The LC indicatrix projections of the first and second grating layers within the second walk-off grating device are shown as 2113 and 2114. The input to the second walk-off grating device having a 90 degree second grating vector alignment is shown as 2008 and 2009, each of which has approximately half beam power along the tilt-plane. The e-wave fractions are displaced vertically (e.g., 90 degree azimuth direction) whereas the o-wave fractions are unaffected. The overall device produces four beam spots for each incoming beam spot, with two-stage walk-off grating devices and without a polarization scrambler.

In the embodiments of the instant invention described above, the NEF polarization-selective diffractive optical element provides a thin hologram element, operating within the paraxial diffraction limit, by judicially arranging the LC out-of-plane tilt across a transverse spatial coordinate in a predetermined manner. The resultant NEF thin hologram has the LC directors aligned homogeneously along a given azimuthal plane. The plane containing the LC director distribution is also the tilt plane. Only light rays polarized along the tilt plane are affected by the variable amount of retardance encoded continuously or in a pixelated manner. The variable amount of retardance is a manifestation of variable optical path length modulation as a function of transverse spatial coordinate. Conversely, light rays polarized along a direction orthogonal to the tilt-plane sees only the ordinary index of refraction regardless of LC director tilt. The variable optical path length modulation is absent and this orthogonal polarization essentially experiences a zeroth-order grating.

Advantageously, the polarization-selectivity of these NEF thin holograms is exploited in various applications that use linearly polarized light. Some applications related to the polarization-selectivity have been outlined, which include aberration compensation and holographic beam splitting in OPU systems, beam steering based polarization-selection in an external-cavity solid-state laser, and beam walk-off device in optical low-pass filter. Obviously, more applications can be identified with either a single-layer LC hologram or multiple-layer or multiple-stage LC holograms which are polarization-selective. The polarization selectivity is inherent in the LC device with a homogeneous azimuthal orientation. However, in some applications, the selectivity is deliberately turned off, for example by coupling two LC hologram layers with orthogonal tilt plane orientations. Further advantageously, the fabrication technique used to create the NEF diffractive optical elements allows for multi-level phase-only holograms to be recorded such that high diffraction efficiencies are obtained.

Yet another application of the NEF diffractive optical elements is as a variable magnitude birefringent compensator. For example, consider the prior art Babinet-Soleil compensator, which includes two birefringent crystal wedges (e.g., quartz) disposed adjacent to another birefringent plate of the orthogonal birefringent axis alignment. By mechanically translating one of the wedges, a variable amount of retardance is presented to the narrow-diameter probing beam.

Figure 38:
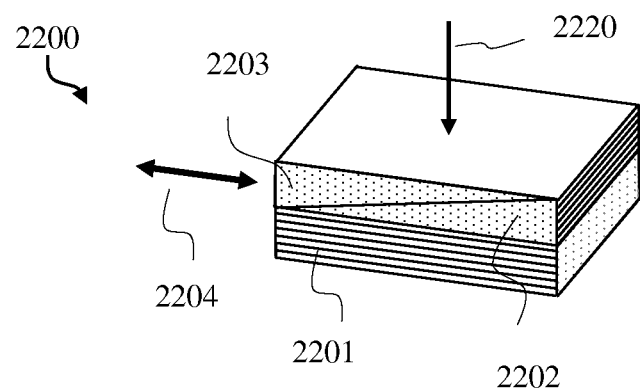
FIG. 38 is a schematic diagram of a prior art Babinet-Soleil's compensator with a movable top birefringent wedge.

A conventional Babinet-Soleil compensator is illustrated in FIG. 38. This variable-retardance compensator 2200 includes a first homogeneously aligned A-plate 2201 coupled to another birefringent plate made of two birefringent wedges 2202 and 2203. The A-plate 2201 has its optic axis aligned parallel to the striped direction. The birefringent wedges 2202/2203 are typically cut from crystalline material and are aligned with their optic axes parallel to the striped direction. In other words, the optical axes of the wedges are parallel to each other, but are orthogonal to the optic axis of the first birefringent plate. The top birefringent wedge 2203, which has its angled-facet facing the angled-facet of the other wedge 2203, can be translated mechanically in a direction parallel to the optic axis of the first birefringent plate (i.e., along 2204). This lateral translation results in an effective retardance provided by the combined two wedges. This retardance magnitude is then offset from a second retardance magnitude provided by the first birefringent plate. The retardance difference is the effective retardance as seen by the light input 2220. This device configuration is similar to a multiple-order waveplate, with the required retardance provided by the difference in retardance realized in each of the two crossed axes retarders. In the case of the Babinet-Soleil compensator 2200, the net amount of retardance is adjustable by lateral translation of the top-most wedge.

Figure 39:
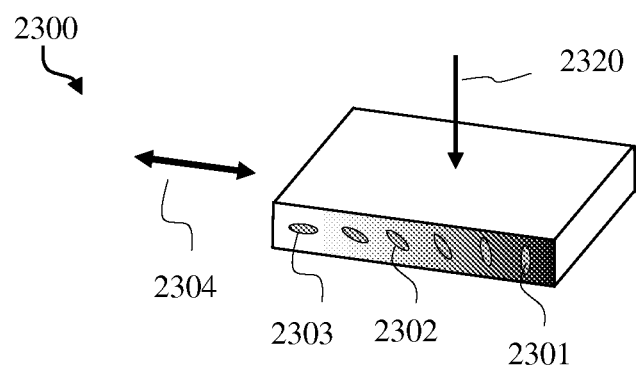
FIG. 39 is a schematic diagram of a variable retarder with a LC film having a polar-angle distribution, in accordance with one embodiment of the instant invention.

In accordance with an embodiment of the instant invention, a NEF diffractive optical element is used as a variable magnitude birefringent compensator. In particular, the LC out-of-plane director distribution is patterned to provide a precise and accurate variable magnitude birefringence. Referring to FIG. 39, the variable retarder 2300 includes a single layer of LCP, wherein the LC director is distributed in some predetermined manner in such a way that the resultant retardance along a given transverse spatial coordinate is varied in the required manner (e.g., linear versus X-coordinate). This monolithic variable retarder 2300 is shown with several segments of LC director distribution such as C-plate 2301, O-plate 2302 and A-plate 2303. The A-plate segment presents the largest amount of retardance relative to the O-plate and/or C-plate segments for a given physical LC thickness. If a linear retardance profile is desired versus transverse spatial coordinate, the LC tilt profile is tailored in a non-linear manner. To obtain a different amount of retardance for a given light input location 2320, the entire variable retarder is translated by mechanical actuation means 2304 such that a different spatial region is aligned to the input beam. A wide-band variable retarder according to the present invention is feasible, as in the prior-art crystal plate scheme. For example, a variable retarder covering λ=400 nm to 1600 nm with up to 1 wave of retardance at the longest wavelength can be configured with a single layer LC film having a continuous LC director variable from C-plate to A-plate. The LC film is assumed to yield about 0.1 birefringence at the long wavelength edge. Hence, the LC film is about 16 μm thick. The short wavelength will see more than 1 wave of retardance due to the normal material index dispersion within this band.

Advantageously, this tunable retarder, which is obtained by continuously splaying the LC out-of-plane tilt as a function of linear position while maintaining a given azimuthal direction, provides variable retardance up to small multiples of lambda with appropriate selection of the device thickness.

Further advantageously, the large substrate handling capability of a non-etched, flat retarder technology allows for multiple retarder magnitude ramps to be patterned and exposed onto a large format substrate. At the wafer level, a grating/hologram type coarse resolution pattern is obtained. Each "period" within the large wafer substrate can be diced into a discrete variable retarder at singulation stage. In general, the slow/fast-axis of the monolithic variable retarder will be anchored homogeneously along a required azimuth, such as ±45 degree versus the rectangular geometry of the retarder. Although polarization selectivity is inherent this NEF diffractive optical element due to the homogeneous azimuthal orientation, in use, the probing beam typically will be small relative to the dimension of the variable retarder (e.g., 1 mm beam size versus 10 mm end-to-end translation range), such that the variable retarder will not necessarily function as a polarization-selective diffractive optical element.

In each of the above-described embodiments, the fabrication technique used to create the NEF diffractive optical elements only requires a single substrate, and thus produces thinner passive optical elements that are relatively inexpensive, and that are suitable for a wide range of applications. In comparison, prior art references U.S. Pat. No. 7,375,784 and U.S. Pat. No. 6,304,312 both require two transparent substrates, which cooperate to induce alignment of the liquid crystal in the relatively thick liquid crystal cell. In addition, these prior art fabrication techniques are not compatible with providing multi-level phase-only holograms. In contrast, the instant invention provides multi-level phase-only holograms having features that are 1 μm or smaller (e.g., when an array of variable optical path regions are provided in a predetermined manner). Notably, the fabrication techniques used to for the NEF diffractive optical elements do not require the traditional masked and etched processes that provides a surface relief structure (SRS). The fabrication techniques for the present invention also do not require the fabrication of Liquid Crystal cells as an intermediate step and no transparent electrodes for applying electrical pulses for LC alignment are needed. In addition, unlike absorption-based (e.g., intensity modulation) holograms, the resultant phase-only holograms can be made lossless. These passive phase-only LC holograms are also expected to yield higher diffraction efficiencies due to better control of the pixel-fill duty cycle ratio when compared to the actively switched LC hologram, where the SLM pixel array requires row/column addressing lines and pixel addressing circuitry.

The instant invention also relates to methods for creating a liquid crystal (LC) material layer having the tilt angle of its director, or optic axis, spatially varied over an area of the substrate on which the LC layer is deposited. The LC material may be a conventional liquid crystal (non-polymer), or a liquid crystal polymer (LCP). The term tilt angle refers to the angle between the optic axis of the LC and the plane of the substrate. For a positive uniaxial LC material, the optic axis is also called the slow axis (SA).

Figure 40B:
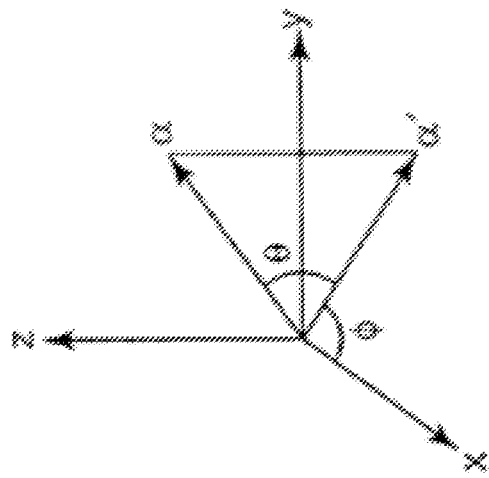
FIG. 40*b* is a schematic illustration of the coordinate system for the optic axis of the LC layer.
Figure 40A:
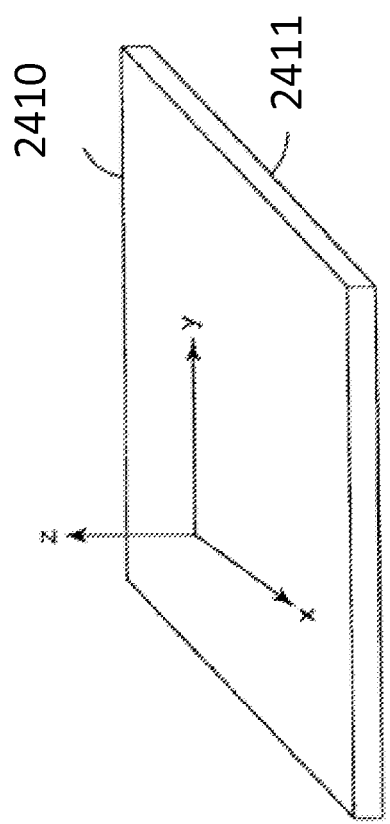
FIG. 40*a* is schematic illustration of a coordinate system relative to an LC layer.

Referring to FIG. 40a, an LC layer 10 is shown disposed on a substrate 2411. The plane of the substrate 2411 is shown to be parallel to the x-y plane, whereas the z axis is perpendicular to the major surface. In accordance with one embodiment of the instant invention, the tilt axis of the LC layer is spatially varied over an area of the substrate (i.e., varies across the x-y plane). Referring to FIG. 40b, the optical axis, which is depicted as vector $\alpha$, can be defined by a polar angle $\theta$ and an azimuthal angle $\phi$. The azimuthal angle $\phi$ refers to the azimuthal orientation of the optical axis projected in the plane of the substrate, measured relative to some arbitrary reference direction associated with the plane of the substrate (e.g., shown to be the x-axis). The polar angle $\theta$ is the tilt angle of the director and corresponds to the angle at which the vector deviates from the x-y plane.

An LC material having a spatially constant tilt angle equal to 0° is typically referred to as an A-plate, and is said to possess homogenous alignment. An LC material having a spatially constant tilt angle equal to 90° is typically referred to as a C-plate, and is said to possess homeotropic alignment. An LC material having a uniform tilt angle between 0° is 90° is typically referred to as an O-plate, and is understood to have both A-plate and C-plate retardation components.

Figure 40C:
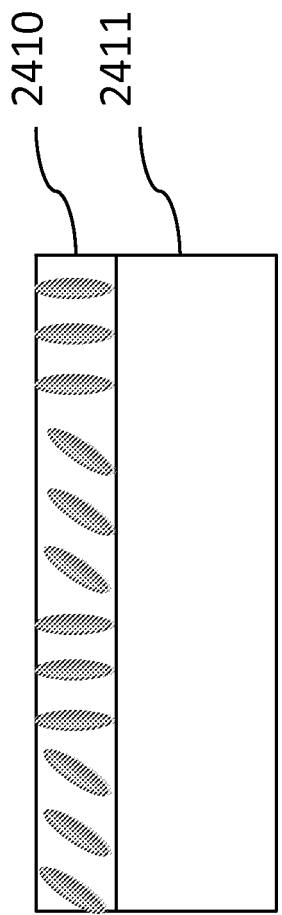
FIG. 40*c* is a schematic illustration showing a side view of an LC layer on a substrate having a discretely varied tilt axis.
Figure 40D:
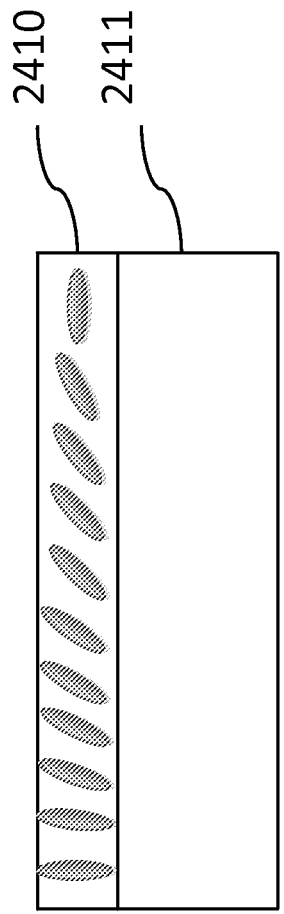
FIG. 40*d* is a schematic illustration showing a side view of an LC layer on a substrate having a continuously varied tilt axis.

In general, a spatially varying tilt angle means that the tilt angle varies across the surface of the LC layer in a predetermined or random order. For example, with regard to the former, FIG. 40c shows a spatially varied tilt axis having a discrete pattern, whereas FIG. 40d shows a spatially varied tilt axis following a continuous pattern (e.g., a gradient). As the tilt angle of the LC material is varied, also varied is the effective in-plane (or A-plate component) birefringence $\Delta n_A$. For example, as the tilt of a positive uniaxial LC material increases from 0° to 90°, its $\Delta n_A$ value decreases from the LC material's intrinsic $\Delta n$ value to zero. Directly dependent on $\Delta n_A$ is in-plane (A-plate) retardance $\Gamma_A$, which is the product of $\Delta n_A * d$, where d is the physical thickness of the LC material layer. Therefore, as the tilt angle of the LC material varies, $\Gamma_A$ also varies. Similarly, as the tilt of the LC varies, the out-of-plane (C-plate) retardance $\Gamma_C$ varies. Another result of variation in $\Delta n_A$ is variation in the average in-plane refractive index $n_{A,avg}$.

In general, the spatially varying tilt angle is created in a layer of LC material that is capable of forming an O-plate having two or more different tilt angles between 0 and 90 degrees. More specifically, the LC material is coated over a substrate, over the area of which, the tilt angle is made to vary either continuously, discretely, or randomly. While the tilt angle $\theta$ is varied across a surface of the LC material layer, the azimuthal angle $\phi$, may be uniform, or may also be made to vary either continuously or discretely, over the area of the LC material layer. In general, the spatially varying tilt angle refers to an average tilt angle that varies in a transverse direction along the surface of the substrate. More specifically, the tilt angle at each point on the surface will be an average of the LC directors across the thickness of the layer (i.e., the tilt angle typically will be higher closer to the alignment layer).

In one embodiment, the LC layer is formed from an O-plate type LCP precursor, the tilt angle of which is determined by experimental conditions. For example, in one embodiment the LCP precursor is ROF5106 LCP precursor available from Rolic. In other embodiment, the LC layer is formed from ROF5106 blended in various ratios with ROF5113 LCP precursor, also available from Rolic. Blended mixtures are advantageous because they readily allow for various ranges of tilt angles to be obtained. The O-plate type LCP precursors are employed in conjunction with an alignment layer material, which is first coated on to the substrate before depositing the LCP precursor layer. In general, the alignment layer material will exhibit a mechanism by which the tilt angle of the subsequently coated LCP precursor can be controlled. In one embodiment, the alignment layer is a linearly photopolymerizable (LPP) polymer, which upon irradiation of controlled doses of linearly polarized ultraviolet (LPUV) radiation at a non-zero angle of incidence (AOI), will induce a predetermined azimuthal orientation and a predetermined tilt angle in the subsequently coated LCP precursor layer. In the case of the LPP/LCP system described above, the predetermined tilt angle is achieved by controlling the LPUV energy dose. For example, in one embodiment, ROP119, available from Rolic is used to form the LPP layer and the LCP layer is formed from ROF5106 LCP precursor available from Rolic, or ROF5106 blended in various ratios with ROF5113 LCP precursor, also available from Rolic. The resulting LPP/LCP system has been show provide controlled tilt angle, within a range, in the LCP. Advantageously, this process is not highly sensitive to the exact AOI used, however, in general, the AOI will be substantially different from zero.

Referring again to FIG. 3, there is shown a system for fabricating an optical element having an LC layer with a spatially-varying tilt angle. The optical setup 60 includes a mount for supporting the device under fabrication 65, a linearly polarized ultra-violet (LPUV) light exposure system 70, and a photo-mask 75. The device under fabrication 65 includes a substrate 66 onto which a linear photo-polymerizable (LPP) alignment layer 67 is deposited. The LPUV exposure system 70 includes a UV light source 71, a collimating lens 72, and a UV polarizer 73. Alternatively, the collimating lens 72 is replaced with a collimating reflector. In one embodiment, the photo-mask 75 is patterned/designed to provide varying levels of light to the alignment layer in a predetermined manner. In particular, the photomask 75 is patterned to provide varying levels of energy density to the alignment layer as a function of transverse spatial coordinate. In one embodiment, the photomask 75 is a variable transmission mask. In another embodiment, the photomask 75 is a variable size aperture mask. In another embodiment, a series of binary masks are used individually to produce the effect of varying levels of energy density delivered to the alignment layer as a function of transverse spatial coordinate. In yet another embodiment, a combination of masked and maskless exposures are used to produce the effect of varying levels of energy density delivered to the alignment layer as a function of transverse spatial coordinate.

In operation, the light source 71 provides LPUV light at an oblique angle to the surface of the substrate 66. In this embodiment, the light source is shown to be tilted relative to the horizontal substrate. In other embodiments, the substrate is tilted relative to the light source. The non-normal LPUV light incidence and its energy density dose induce a change in the alignment layer 67 that causes the LC director in a subsequently deposited LCP pre-cursor layer to be aligned at an oblique angle (tilted out of the plane of the substrate at some azimuthal angle). In this embodiment, the UV polarizer 73 is oriented to transmit, with high transmission, UV light polarized parallel to the plane of drawing (e.g., which is the plane of incidence). Depending on the chemistry of the LPP material, this configuration will typically result in the LC director of the subsequently deposited LCP layer to be aligned in an azimuthal plane that is parallel or orthogonal to the LPUV plane of incidence. The actual out-of-plane tilt of the LC director is dependent on the LPUV energy density dose delivered to the LPP alignment layer 67. Since the photomask 75 provides various energy densities to the alignment layer 67 in a predetermined pattern, a subsequently formed LCP film having a spatially variable tilt angle, which has variable in-plane retardance, results. Although the out-of-plane tilt of the LC director varies in a predetermined manner across the film, in this embodiment the azimuthal angle of the LC directors is constant. Once the LPP layer is exposed to LPUV in this manner, then a thin layer of liquid crystal polymer precursor is coated on the alignment layer. This layer is then exposed to UV light (e.g., which does not have to be polarized) to cross-link the LCP precursor and fix the LC directors at the predetermined oblique angles. Accordingly, relatively stable LCP layers, which only need to be supported by a single substrate, are provided.

Note that this fabrication technique has been described with reference to an LCP precursor, which is preferably cross-linked with a subsequent UV irradiation to convert it to LCP. In general, the O-plate LCP layer may be formed using any of the LPP and O-plate LC compounds known in the art, the latter of which may be polymerized and/or cross-linked with UV irradiation and/or thermally. For example in one embodiment, the LPP layer is formed by spin-coating a 2 wt % solution of ROP119 in cyclopentanone on a glass substrate (e.g., for 60 seconds at 2000 RPM) to obtain a 50 nm thick alignment layer. In other embodiments, the LPP layer is formed using another coating method such as wire-coating, gravur-coating, slot-coating, etc. to coat the ROP119 layer. In general, the LPP will often include cinnamic acid derivatives and/or ferulic acid derivatives, as is well known in the art. In accordance with the instant invention, the LPP layer will be of the type to generate an out-of-plane tilt in the subsequently applied LC or LCP layers. In one embodiment, the LPP coated glass is baked on a hot plate for a predetermined time (e.g., 5 minutes) at a predetermined temperature (e.g., 180 degrees) before being LPUV irradiated through the photomask. In one embodiment, the LCP layer is formed from liquid crystalline material that includes a LCP precursor. LCP precursor materials, which for example may include a cross-linkable diacrylate nematic liquid crystalline compound, are well known in the art. In accordance with the instant invention, the LCP material will be of the type that will appropriately respond to the tilt inducing LPP layer. Various LCP precursor compounds suitable for forming the LCP layer are available from Rolic (Allschwil, CH). In one embodiment the LCP precursor layer is spin-coated on the LPP layer as a 15 wt % solution of ROF5106 LCP precursor, or a mixture of ROF5106 LCP precursor and ROF5113 LCP precursor, in anisole. In other embodiments, the LCP layers are formed using another coating method such as wire-coating, gravur-coating, slot-coating, etc. The resulting LPP/LCP device is then typically baked (i.e., annealed) for a predetermined time to promote good alignment of the LCP to the LPP alignment layer. Advantageously, the subsequent photochemical cross-linking of the LCP precursor to form LCP solidifies the film and makes permanent the orientations of the LC directors. This is believed to provide improved reliability under high power illumination and short wavelength laser exposure.

Figure 41:
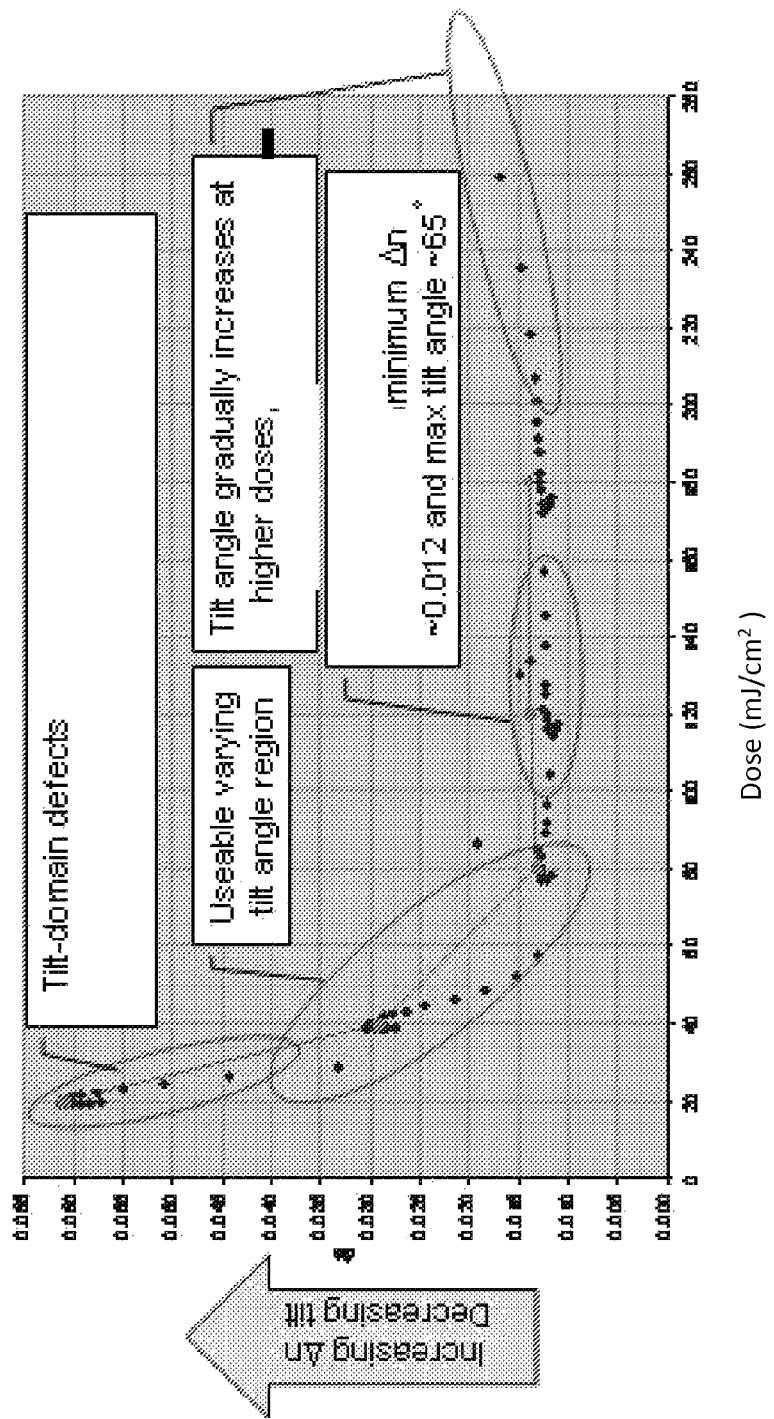
FIG. 41 is a plot illustrating the in-plane birefringence behaviour versus LPUV dose for the ROP119/ROF5106 system.

As discussed above, one method of controlling the tilt imposed by the LPP layer is to alter the LPUV dose on the LPP layer. Referring to FIG. 41, there is shown a plot of $\Delta n_A$ response versus LPUV dose, applied an angle of incidence of 40 degrees, for the ROP119/ROF5106 LPP/LCP system discussed above. For LPUV doses less than ~80 mJ/cm$^2$ there is a high rate of change in tilt angle and $\Delta n_A$. For LPUV doses greater than ~180 mJ/cm$^2$ there is a gradual change in tilt and $\Delta n_A$. At low doses, below ~40 mJ/cm$^2$ various tilt-domain defects are observed in this system. More specifically, "low tilt-domains", which appear somewhat as isolated phase-separated domains, within a matrix LCP phase, having distinctly different tilt than the matrix LCP, are observed. In accordance with one embodiment of the instant invention, these observations are used to produce birefringent optical elements having a spatially varying or patterned tilt angle (e.g., and thus and $\Delta n_A$, $\Gamma_A$, $\Gamma_C$, $n_{A,av}$). The spatial variations may be discrete or continuous, macroscopic in scale, or microscopic in scale.

In accordance with one embodiment of the instant invention, a LPUV dose pattern is established by exposing the LPP layer through a series of one or more individual photomasks. More specifically, the spatially modulated LPUV dose is applied as a range of doses or as two or more discrete doses via one or more photomasks, or via a combination of masked and maskless exposures.

For example, in one embodiment a spatially varying tilt is provided in the ROP119/ROF5106 LPP/LCP system discussed above, by irradiating the LPP layer using a two step process. In the first step, the layer is exposed to linearly polarized light without the photomask (e.g., through a standard aperture, to set the lowest tilt-angle at all locations). In a second step, the layer is exposed to the linearly polarized light through the photomask (e.g., to set the higher tilt-angles at select locations corresponding to the transmitting areas of the photomask). In this embodiment, the total energy density (i.e. dose) delivered will be higher at those regions exposed in the first and second irradiation steps, as compared to those regions only exposed in the first irradiation step. In general, the required energy density and wavelength of illumination will be dependent on the LPP material. For the ROP119/ROF5106 LPP/LCP system discussed above, the energy density will be typically between 30-300 mJ/cm2, while the wavelength range will be typically between 280 and 365 nm. The incident angle of LPUV will be typically between 20 and 60 degrees. Notably, the angle of incidence (AOI) has not been found to have a significant effect on the process, however, in general, the AOI should be substantially different from zero.

In this embodiment, the photomask has a first plurality of regions that block the LPUV and a second plurality of regions that transmit the LPUV (i.e. a binary mask). Since the total dose delivered at any given point on the LPP layer is the sum of the doses delivered to that point in each of the exposures (e.g., if the azimuthal orientation of the LPUV is the same for all exposures), the LPP will induce a spatially varying tilt angle in the subsequently applied LC layer, wherein the spatially varying tilt angle is arranged in a discrete pattern dictated by the photomask. For example, in one embodiment, the spatially varying tilt angle provides an alternating in-plane retardance pattern (e.g., corresponding to the tilt angle pattern illustrated in FIG. 40c).

In general, the photomask will be patterned in dependence upon the intended application. In one embodiment, the photomask is patterned to provide varying energy densities to the alignment layer in a pixelated manner. In general, the pixels will be periodic (e.g., at regular intervals) or non-periodic (e.g., random or in a predetermined pattern). Advantageously, the use of the photomask allows the LCP layer to be patterned with a large number of phase profile levels and with increased precision. In one embodiment, the photomask is patterned to provide two levels of phase profile. In another embodiment, the photomask is patterned to provide more than two levels of phase profile. In general, if the LC having the spatially varying tilt angle is a diffraction grating or more complicated hologram, it will have typically at least 4 levels of phase profile in order provide reasonable diffraction efficiency.

In another embodiment, the spatially varying tilt is provided in the ROP119/ROF5106 LPP/LCP system discussed above, by irradiating the LPP layer through a single photomask. In this embodiment, the photomask is a gradient mask having an optical density profile that provides a spatially varying LPUV dose that is continuously varied, rather than discretely varied. For example, in one embodiment, the spatially varying tilt angle forms a continuously varying gradient (e.g., the retardance pattern illustrated in FIG. 40d).

In each of these embodiments, the optic axis of the LC director has a spatially varying tilt angle and a substantially uniform azimuthal angle. In other embodiments, the LPP layer is irradiated a plurality of times, each time with the LPUV having a different azimuthal orientation. For example, in one embodiment, the azimuthal orientation of the LPUV differs among the various exposures delivered to different points on the LPP layer, such that a superimposed pattern of spatially varying tilt angles and azimuthal orientations is provided in the LCP layer. In this case, the prediction of the resulting tilt angle and in-plane orientation of the LCP is more complicated.

In addition, in each of the above described embodiments, the substrate is optionally provided with a non-reflective back surface, which is non-reflecting for the UV wavelengths for which the LPP material responds. For example, in one embodiment the back surface of the substrate is coated with a UV anti-reflection coating or a UV absorbing coating. Advantageously, the non-reflective coating prevents strong back reflections of LPUV from the back surface of a UV transparent substrate, which can tend to degrade the dose pattern. Notably, this is more of an issue if the photomask employed contains a microscopic or relatively small-featured pattern, where it is more difficult to realize the expected tilt angle pattern. In other embodiments, where the intrinsic reflectivity of the substrate material is sufficiently low, or where the substrate is non-transmissive to UV, a non-UV-reflective back surface is typically not needed for the LPUV process.

Figure 42:
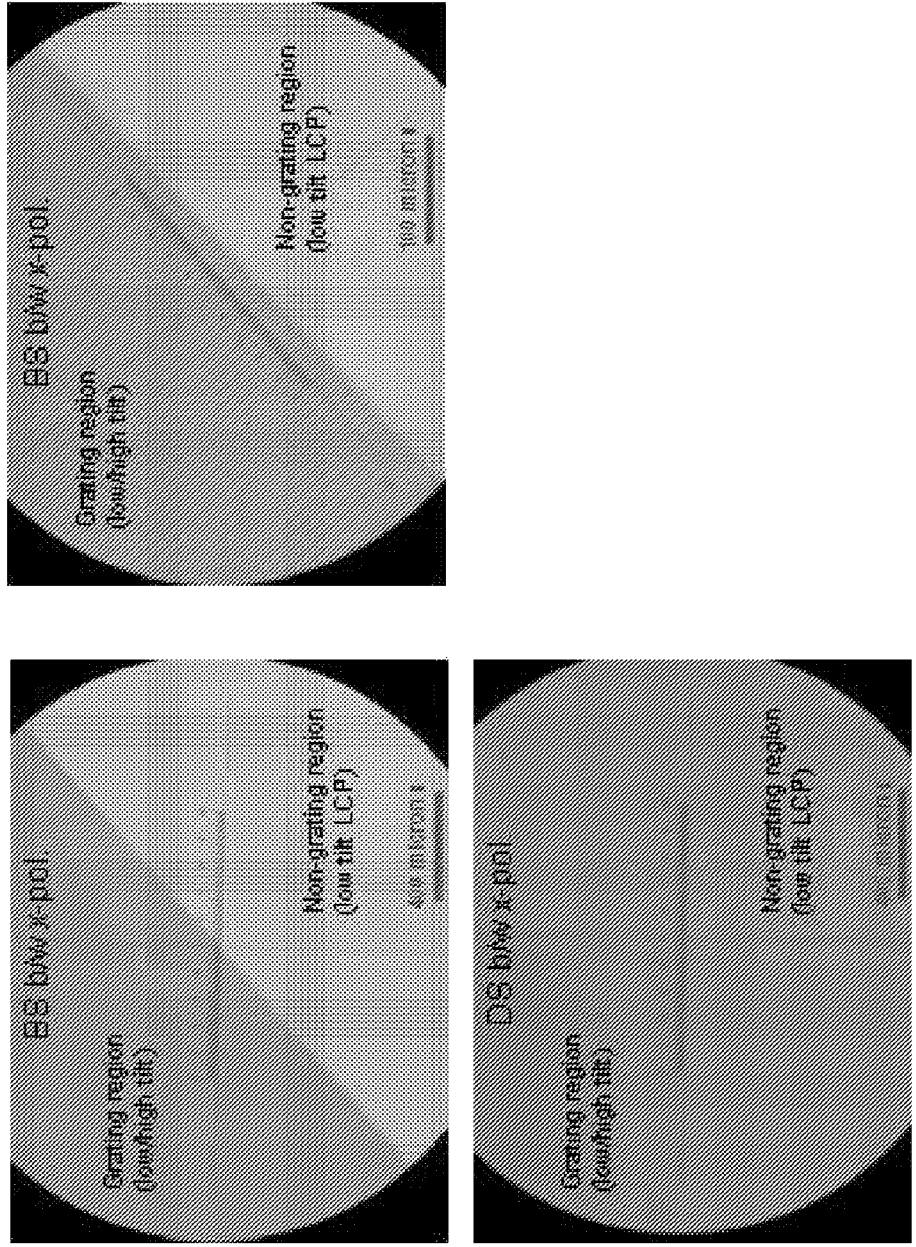
FIG. 42 shows an example of LCP tilt-angle grating structure in accordance with one embodiment of the instant invention.

Referring to FIG. 42, there is shown an example of a microscopically patterned tilt angle structure. More specifically, the photos show images wherein the structure includes a first area having a spatially varying tilt angle (i.e., labelled the grating region) and a second area having a uniform tilt angle (i.e., labelled the non-grating region). The upper photos are bright-state (BS) images with the sample being viewed in transmission between crossed polarizers, whereas the lower photo is a dark state (DS) image with the sample being viewed in transmission between crossed polarizers.

The spatially varying tilt angle LCP structure was formed by spin-coating a LPP layer including a 2 wt % solution of ROP119 in cyclopentanone on a 200 mm fused silica substrate wafer (e.g., for 60 seconds at 2000 RPM) to obtain a 50 nm thick alignment layer. In this embodiment, no anti-reflection coating was provided on the substrate. The LPP coated substrate was then subject to a two-step irradiation process. In the first step, the layer was exposed in a first exposure to LPUV without the photomask to set the lowest tilt-angle at all locations. More specifically, this first LPUV exposure provides a uniform low dose (i.e., 40 mJ/cm$^2$) corresponding to the lower tilt angle. In the second step, the grating region is exposed in a second exposure to the LPUV light through a grating photomask having 5 µm lines/5 µm spaces to set the higher tilt-angles at select locations corresponding to the transmitting areas (the 5 µm spaces) of the photomask. More specifically, the second LPUV exposure provides a patterned high dose (i.e., 100 mJ/cm$^2$) such that the sum of the first low dose exposure and the second high dose exposure correspond to the high tilt angle generated at locations corresponding to the transmitting areas of the photomask. For both exposures, the azimuthal angle of the LPUV light was the same measured relative to some arbitrary reference (in this case, the azimuthal angle was nominally parallel to the grating direction). For both exposures the incident angle of LPUV was 40 degrees. Subsequently, an LCP layer was formed by spin-coating a 37% wt % solution of ROF5106 LCP precursor on the LPP layer (i.e., at 1000 rpm). The LC directors in the LCP layer adopted a tilt angle pattern defined by the patterned LPUV exposure doses. The LCP precursor layer was subsequently annealed, UV cured to form LCP, post-baked.

The resulting LCP layer included a grating having 5 micron wide lines, alternating in tilt angle. Mores specifically, the grating included a pattern of alternating lines of high and low retardance, due to LCP tilt angle alternating between ~50° and ~65° (i.e., corresponding to the retardance alternating between 75~80 nm and 25 nm, respectively). The grating direction is parallel to the tilt plane of both tilt angles.

Figure 43:
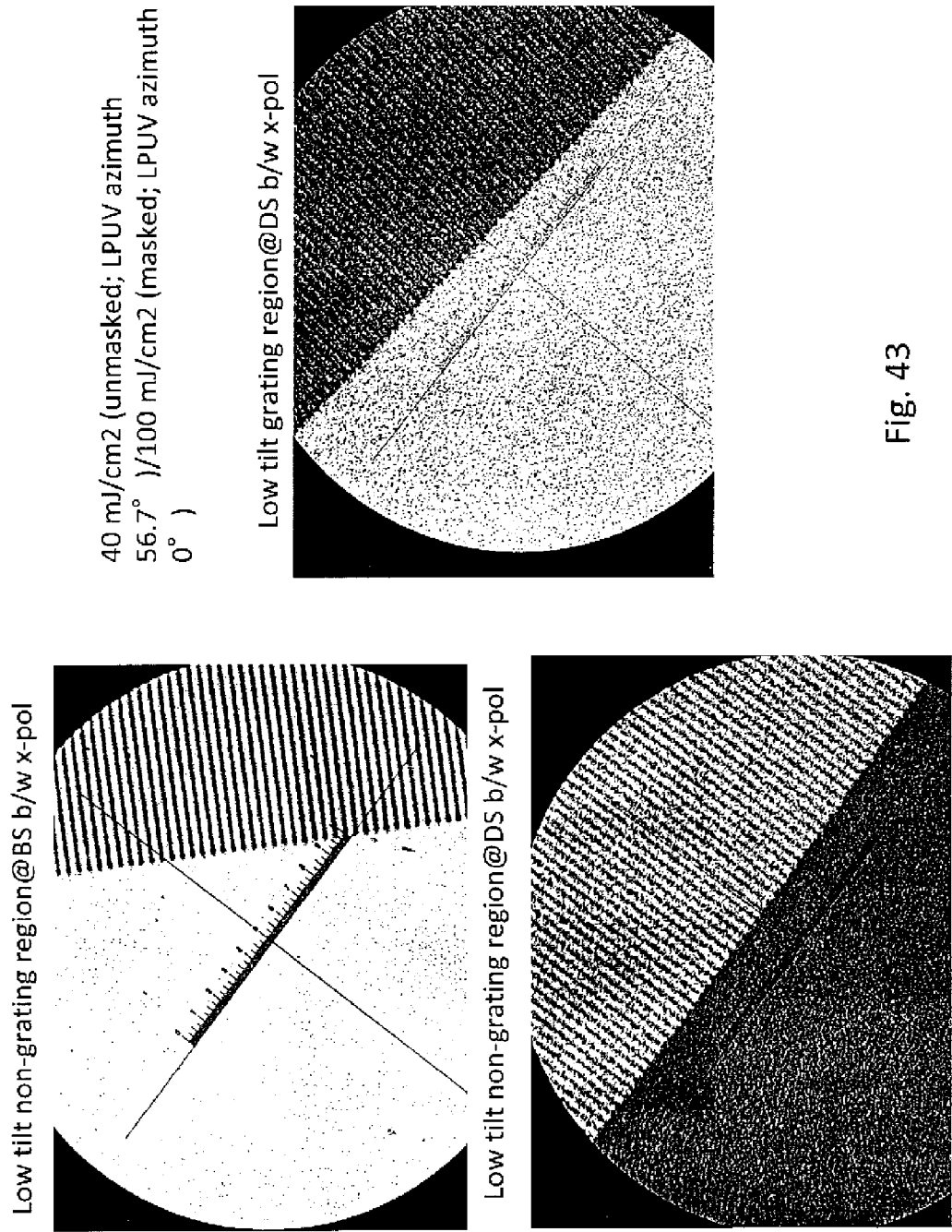
FIG. 43 shows an example of LCP tilt-angle grating structure, in combination with an azimuthal orientation grating, in accordance with another embodiment of the instant invention.

Referring to FIG. 43, there is shown another example of a microscopically patterned tilt angle structure. More specifically, the photos show images wherein the structure includes a first area having a spatially varying tilt angle (i.e., labelled the grating region) and a second area having a uniform tilt angle (i.e., labelled the non-grating region). The upper photo is a BS image with the sample being viewed in transmission between crossed polarizers, whereas the lower photos are DS images with the sample being viewed in transmission between crossed polarizers.

The spatially varying tilt angle LCP structure was formed by spin-coating a LPP layer including a 2 wt % solution of ROP119 in cyclopentanone on a 200 mm fused silica substrate wafer (e.g., for 60 seconds at 2000 RPM) to obtain a 50 nm thick alignment layer. In this embodiment, no anti-reflection coating was provided on the substrate. The LPP coated substrate was then subject to a two step irradiation process. In the first step, the LPP layer was exposed in a first exposure to LPUV without the photomask (e.g., through a standard aperture, to set the lowest tilt-angle at all locations). More specifically, this first LPUV exposure provides a uniform low dose (i.e., 40 mJ/cm$^2$) corresponding to the lower tilt angle. In the second step, the grating region is exposed in a second exposure to the LPUV light through a grating photomask having 5 µm lines/5 µm spaces to set the higher tilt-angles at select locations corresponding to the transmitting areas (the 5 µm spaces) of the photomask. More specifically, the second LPUV exposure provides a patterned high dose (i.e., 100 mJ/cm$^2$) such that the sum of the first low dose exposure and the second high dose exposure correspond to the high tilt angle generated at locations corresponding to the transmitting areas of the photomask. For the first exposure, the azimuthal angle of the LPUV light was 56.7 degrees. For the second exposure, the azimuthal angle of the LPUV light was 0 degrees. For both exposures the incident angle of LPUV was 40 degrees. Subsequently, an LCP layer was formed by spin-coating a 37% wt % solution of ROF5106 LCP precursor on the LPP layer (i.e., at 1000 rpm). The LC directors in the LCP layer adopted the tilt angle pattern and azimuthal angle pattern defined by the patterned exposure doses and azimuthal angles of the LPUV. The LCP precursor layer was subsequently annealed, UV cured to form LCP, post-baked.

The resulting LCP layer included a grating of high/low tilt lines with a slow axis (SA) azimuthal offset between lines. In particular, the high/low tilt lines exhibited an approximately 45 degree SA offset. More specifically, the 45 degree SA offset was observed based on the resulting low tilt SA being approximately 57 degrees from grating direction, and the resulting high tilt SA being approximately 14 degrees from grating direction. Notably, the SA offset between high/low tilt grating lines appears to be less than offset of the azimuthal angles of the first and second LPUV exposures. This is due to the fact that the high tilt regions defined by the second exposure actually receive two different LPUV exposure doses with different azimuthal angles.

In accordance with another embodiment of the instant invention, a LPUV dose pattern is established by exposing the LPP layer to LPUV while the LPP layer is translated in a single direction. More specifically, the moving LPP layer is exposed through a stationary aperture and/or mask, or series of apertures and/or masks, interposed between the LPP layer and the LPUV source. As a result, an LPUV dose pattern is established along one direction of the substrate surface, while being substantially constant along another direction.

For example, in one embodiment a spatially varying tilt is provided in the ROP119/ROF5106 LPP/LCP system discussed above, by irradiating the LPP layer using a two step process. In the first step, the stationary LPP layer is uniformly exposed to a low dose of linearly polarized light through a regular aperture. In a second step, the LPP layer is exposed to a higher dose of linearly polarized light through a sawtooth photomask while the LPP layer is translated in a first direction. In this embodiment, the energy density (i.e. dose) will vary in a predetermined continuous manner. More specifically, LPUV dose delivered to each point on the LPP layer is determined by the product of exposure time and LPUV power. The exposure time is a function of the translation velocity of the substrate and the width of the aperture. The LPUV power is a function of the transmission of the aperture opening. In general, the required energy density and wavelength of illumination will be dependent on the LPP material. For the ROP119/ROF5106 LPP/LCP system discussed above, the energy density will be typically between 30-300 mJ/cm2, while the wavelength range will be typically between 280 and 365 nm. The incident angle of LPUV will be typically between 20 and 60 degrees. The translation velocity and the width of the sawtooth aperture needed to achieve a desired dose are dependent upon the power output of the polarized UV light source.

Figure 44:
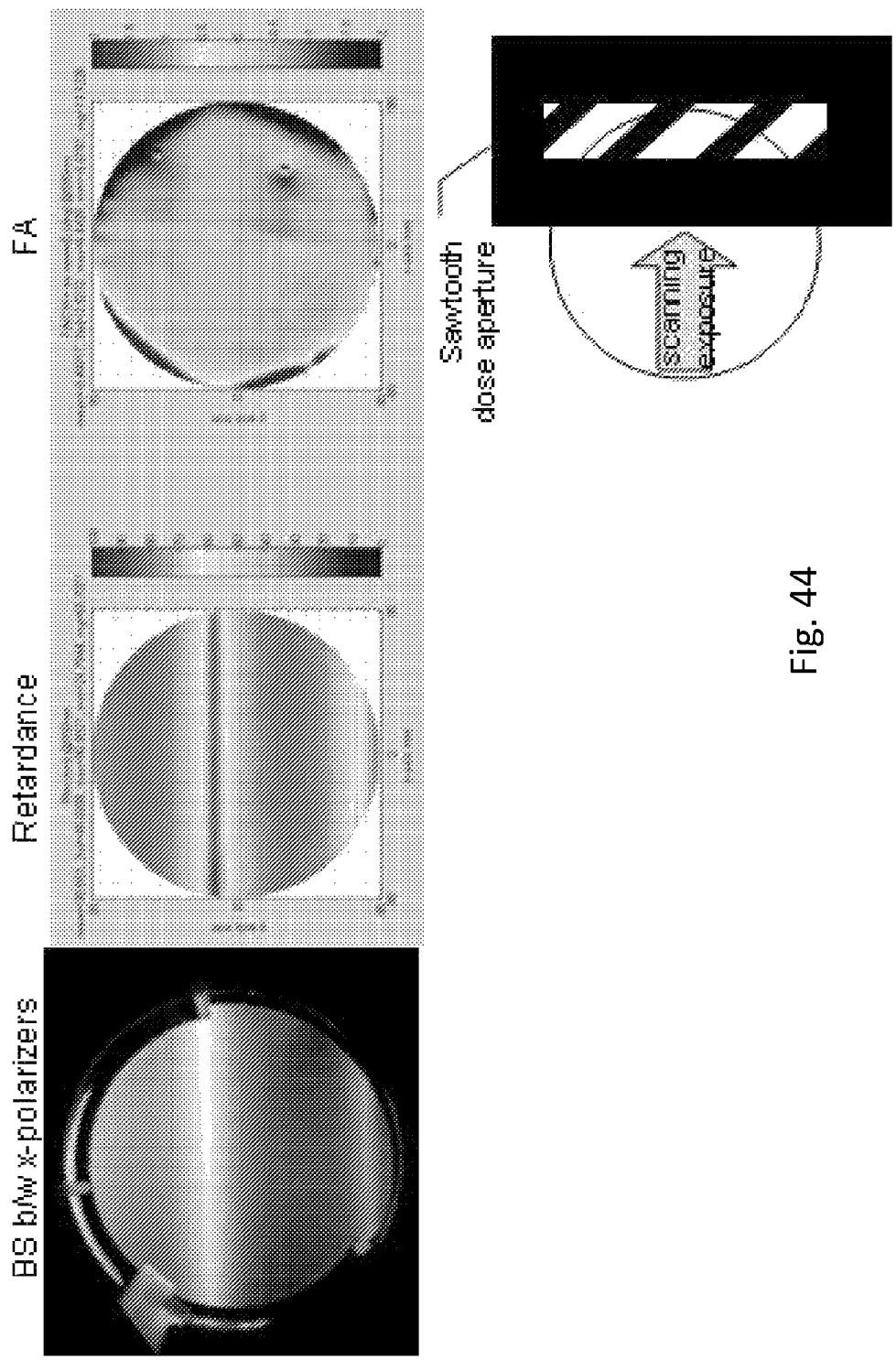
FIG. 44 shows an example of a continuous tilt angle gradient in an LCP layer in accordance with another embodiment of the instant invention.

Referring to FIG. 44 there is shown an example of a macroscopic continuously varied tilt angle structure produced on a 200 mm glass substrate. More specifically, the left side of FIG. 44 shows a BS image of the structure viewed between crossed polarizers, the middle plot shows the spatially varying retardance, and the right side shows the azimuthal direction of the FA axis to be substantially uniform. Also shown in the bottom right of the figure is the sawtooth photomask.

The spatially varying tilt angle LCP structure was formed by spin-coating a LPP layer including a 2 wt % solution of ROP119 in cyclopentanone on a 200 mm fused silica substrate wafer (e.g., for 60 seconds at 2000 RPM) to obtain a 50 nm thick alignment layer. In this embodiment, no anti-reflection coating was provided on the substrate. The LPP coated substrate was then subject to a two step irradiation process where the LPP coated substrate was exposed through certain apertures in a translation scanning manner. In the first step, the layer was exposed in a first exposure to LPUV through a parallel aperture, scanning in a single direction at a constant speed to provide a uniform dose of 40 mJ/cm$^2$ at all locations. In the second step, the layer was exposed in a second exposure to LPUV through a sawtooth dose aperture (e.g., as illustrated in FIG. 44), scanning in the same direction as in the first exposure at a constant speed to produce a periodically varying dose from 0 to 60 mJ/cm$^2$ in the direction perpendicular to the scanning direction. More specifically, resulting from this two step exposure process, the LPP layer receives an oscillating LPUV dose from 40 to 100 mJ/cm$^2$ across the surface of the LPP layer in the direction perpendicular to the scanning direction. For both exposures, the azimuthal angle of the LPUV light was 0 degrees. For both exposures the incident angle of LPUV was 40 degrees. Subsequently, an LCP layer was formed by spin-coating a 37% wt % solution of ROF5106 LCP precursor on the LPP layer (i.e., at 1000 rpm). The LC directors in the LCP layer adopted a tilt angle pattern defined by the patterned LPUV exposure doses. The LCP precursor layer was subsequently annealed, UV cured to form LCP, post-baked.

The resulting LCP layer has an in-plane retardance value that varies in a sawtooth pattern in one direction on the substrate. More specifically, the roughly linearly varying retardance varies between approximately 25 to 85 nm, due to the tilt angle varying between 65 and 50 degrees (i.e., corresponding to a Δn range of 0.012 and 0.04).

In the above describe embodiment, the substrate was translated in a direction perpendicular to the azimuthal angle of the LPUV, which produced a FA in the LCP layer that was parallel to the translation direction and constant. In other embodiments, the LPUV azimuthal orientation is rotated during the second exposure in order to make the FA azimuthal orientation of an LCP layer vary spatially. In yet other embodiments, the LPP layer is rotated rather than translated.

For example, in one embodiment a spatially varying tilt is provided in the ROP119/ROF5106 LPP/LCP system discussed above, by irradiating the LPP layer using a two step process. In the first step, the stationary LPP layer is exposed in a first exposure to a low dose of linearly polarized light through a first stationary narrow arc-shaped aperture (i.e. with a vertex angle of only a few degrees) while the substrate is rotated 360 degrees from a starting position about an axis normal to its surface and coincident with the vertex of the aperture. In a second step, the LPP layer is exposed in a second exposure to a higher dose of linearly polarized light through a second stationary narrow arc-shaped aperture (i.e. with a vertex angle of only a few degrees), whose transmission varies in the radial direction from its vertex, while the substrate is rotated 360 degrees from the same starting position about an axis normal to its surface and coincident with the vertex of the aperture and also coincident with the rotation axis of the first exposure. In both exposures the apertures are placed in the same location relative to the starting position of the substrate, and the azimuthal angle of the LPUV illumination is the same relative starting position of the substrate. The dose delivered to each point on the LPP layer is still the product of exposure time and LPUV power, however, the exposure time is a function of the angular velocity of the substrate and the angular width of the aperture. The LPUV power remains a function of the transmission of the aperture opening. In general, the required energy density and wavelength of illumination will be dependent on the LPP material. For the ROP119/ROF5106 LPP/LCP system discussed above, the energy density will be typically between 30-300 mJ/cm2, while the wavelength range will be typically between 280 and 365 nm. The incident angle of LPUV will be typically between 20 and 60 degrees. The rotational velocity needed is dependent upon the desired dose, the LPUV power, and the angular width of the aperture opening. The combined effect of the two exposures provides a dose that, with respect to the substrate, varies radially from the point corresponding to the apertures' vertex locations, and is constant in the azimuthal direction about the point. Also, in the azimuthal direction relative to the substrate, about that point the LPUV's orientation varies by 1 degree per 1 degree of change in azimuthal location. Subsequently, an LCP layer was formed by spin-coating a 37% wt % solution of ROF5106 LCP precursor on the LPP layer (i.e., at 1000 rpm). The LC directors in the LCP layer adopted a tilt angle pattern defined by the patterned LPUV exposure doses. The LCP precursor layer was subsequently annealed, UV cured to form LCP, post-baked. In this embodiment, the LC directors of the LCP adopt a vortex azimuthal alignment (order m=2) about a point on the substrate, but also adopt a tilt angle that varies in the radial direction from the point.

In the above describe embodiments, wherein the substrate and/or LPUV light is altered (e.g., translated, rotated, etc.), the LPP layer is optionally subject to more than one of the variations discussed above. For example, in one embodiment, more than one high dose rotational exposure of the LPP is made, wherein the center of rotation differs between exposures. In another embodiment, both the LPP layer and the LPUV orientation relative to the substrate is varied during the rotational exposure process. In other embodiments, the LPP layer is exposed a plurality of times, each time with a different photomask and/or aperture. In the latter instance, one or more translation directions are optionally employed, in which a rotational orientation of the substrate in the plane of the substrate is made prior to each translation, and in which the LPUV orientation is optionally rotated prior to each translation. In effect, a complex 2-dimensional dose and azimuthal orientation pattern is readily realized.

In each of the above-described embodiments, wherein the substrate and/or LPUV light source is altered, the translation velocity, angular velocity, and LPUV source are constant. In other embodiments, the translational velocity or angular velocity is modulated while the substrate is being translated or rotated. In yet other embodiments, the LPUV source power is modulated during the translation or rotation process.

In each of the above-described embodiments, wherein the substrate and/or LPUV light source is altered, the photomask has one or more sections that allow LPUV to pass through to the LPP layer, completely block LPUV, and/or that allow a fraction of the LPUV to pass through to the LPP layer. For example, in one embodiment the photomask is a plate fabricated from a UV-blocking material (i.e., a metal plate) having an aperture. In one embodiment, the aperture has an opening profile that varies (modulates) in width measured in the direction that is parallel to the substrate's translation direction. In another embodiment, the aperture has sections that are completely blocked. In yet another embodiment, the aperture opening has a varying optical transmission (e.g., if a gradient optical density photomask is used as the photomask).

Advantageously, the above-described embodiments based on a stationary photomask and a stationary substrate are particularly useful for producing complex and finely patterned tilt angle structures, while the above-described embodiments based on a mechanically actuated substrate and/or LPUV light source are particularly useful for producing less complex and macroscopic tilt angle structures.

In accordance with another embodiment of the instant invention, a spatially varying tilt angle is established by exposing the LPP layer with a relatively low LPUV dose (i.e., below ~40 mJ/cm$^2$). Optionally, the low LPUV dose is provided through a series of one or more individual photomasks, as a range of doses or as two or more discrete doses.

As indicated in FIG. 41, for the LPP/LCP system described above, irradiating the LPP layer with a low LPUV dose (i.e., below ~40 mJ/cm$^2$ and particularly below 30 mJ/cm$^2$), will result in the formation of microscopic low tilt-domains (LTD) in the subsequently applied LCP layer. The term LTD refers to regions having a relatively low tilt angle compared to the surrounding LCP material. More specifically, the LTD appear somewhat as isolated phase-separated domains, within a surrounding "normal behaving" higher tilt LCP phase. Since the LTD have a distinctly lower tilt, they exhibit higher in-plane retardance (or birefringence) than the surrounding material. Since the spatial distribution of the LTD is typically random within the LCP layer, the result is a binary (or nearly binary) spatially varying tilt angle with a random distribution. In general, the size and area density of the LTD will increase as the LPUV dose is decreased. At some point, if the dose is sufficiently low, a continuous network of LTD is expected.

Figure 45:
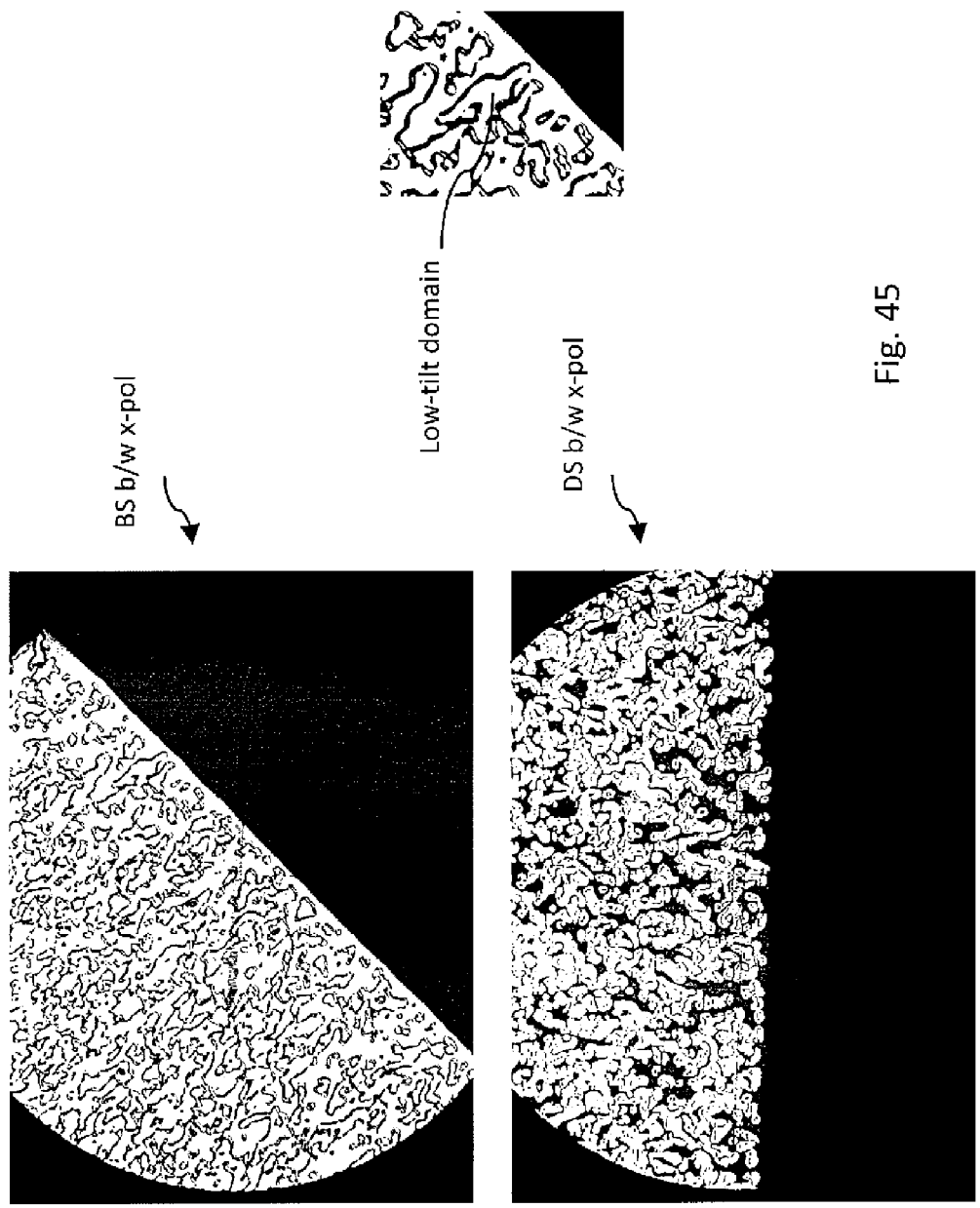
FIG. 45 shows an example an LCP layer having low-tilt domains (LTD) within a region of an LCP layer having a higher tilt, in accordance with another embodiment of the instant invention.

Referring to FIG. 45, there is shown an example of the microscopic LTD formed using the LPP/LCP system described above with a single exposure at 20 mJ/cm$^2$. More specifically, the photos show images wherein the structure includes a first area having a spatially varying tilt angle (i.e., the upper regions showing the LTD) and a second area have a uniform tilt angle (i.e., the lower area). The upper photo is a BS image with the sample being viewed between crossed polarizers, whereas the lower photo is a DS image with the sample being viewed between crossed polarizers. The lower right photo shows a close-up of the LTD in the BS image with the sample being viewed between crossed polarizers.

The spatially varying tilt angle LCP structure was formed by spin-coating a LPP layer including a 2 wt % solution of ROP119 in cyclopentanone on a 200 mm fused silica substrate wafer (e.g., for 60 seconds at 2000 RPM) to obtain a 50 nm thick alignment layer. In this embodiment, no anti-reflection coating was provided on the substrate. The LPP coated substrate was first exposed in a first exposure to LPUV at relatively low uniform dose of 20 mJ/cm$^2$. The lower portion of the LPP coated substrate only was then exposed in a second exposure to an LPUV dose of 100 mJ/cm$^2$ (i.e., for a total dose of 120 mJ/cm$^2$). The azimuthal angle of the LPUV light was 0 in each case. Subsequently, an LCP layer was formed by spin-coating a 37% wt % solution of ROF5106 LCP precursor on the LPP layer (i.e., at 1000 rpm). The LCP precursor layer was subsequently annealed, UV cured to form LCP, post-baked.

The resulting LCP layer has a spatially varying in-plane retardance. In particular, the lower region will have a uniform retardance corresponding to the relatively high-tilt angle, whereas the upper region has a binary spatially varying retardance. More specifically, the in-plane retardance value spatially varies across a surface of the substrate in a random binary fashion. Referring to FIG. 45, the binary spatially varying tilt angle results from the formation of the LTD (i.e., the brighter phase in the BS images). Notably, the LTD are separated from the main LC matrix via a disclination line (i.e., the darker line that boarders the lower tilt phase). In general, the two phases will exhibit the same slow axis (SA) orientation, although, the exact tilt angle and in-plane birefringence has not been measured.

Advantageously, this embodiment provides a random spatial distribution of two discrete LCP tilts angles (i.e., one from the LTD and one from the "normal" behaving LCP) using a single exposure. In general, the relative size and area density of the LTD within the LCP layer depends on the exposure dose, and may depend by other processing conditions.

In the embodiment discussed with reference to FIG. 45, the spatially varying spatially varying tilt angle was achieved with a single exposure. In other embodiments, the formation of LTD with sufficiently low dose LPUV light is combined with any of the above described embodiments. For example, referring to FIG. 46, there is shown an example of the microscopic LTD formed using a method similar to that used to form the structure illustrated in FIG. 42.

More specifically, the spatially varying tilt angle LCP structure was formed by spin-coating a LPP layer including a 2 wt % solution of ROP119 in cyclopentanone on a 200 mm fused silica substrate wafer (e.g., for 60 seconds at 2000 RPM) to obtain a 50 nm thick alignment layer. In this embodiment, no anti-reflection coating was provided on the substrate. The LPP coated substrate was then subject to a two step irradiation process. In the first step, the layer was exposed in a first exposure to LPUV without a photomask to set the lowest tilt-angle at all locations. More specifically, this first LPUV exposure provides a uniform low dose (i.e., 20 mJ/cm$^2$) corresponding to the lower tilt angle. In the second step, the upper portion is exposed in a second exposure to the LPUV light through a grating photomask having 5 μm lines/5 μm spaces to set the higher tilt-angles at select locations corresponding to the transmitting areas (the 5 μm spaces) of the photomask. More specifically, the second LPUV exposure provides a patterned high dose (i.e., 100 mJ/cm$^2$) such that the sum of the first low dose exposure and the second high dose exposure correspond to the high tilt angle generated at locations corresponding to the transmitting areas of the photomask. For both exposures, the azimuthal angle of the LPUV light was the same measured relative to some arbitrary reference (in this case, the azimuthal angle was nominally parallel to the grating direction). Subsequently, an LCP layer was formed by spin-coating a 37% wt % solution of ROF5106 LCP precursor on the LPP layer (i.e., at 1000 rpm). The LC directors in the LCP layer adopted a tilt angle pattern defined by the patterned LPUV exposure doses. The LCP precursor layer was subsequently annealed, UV cured to form LCP, post-baked.

Figure 46:
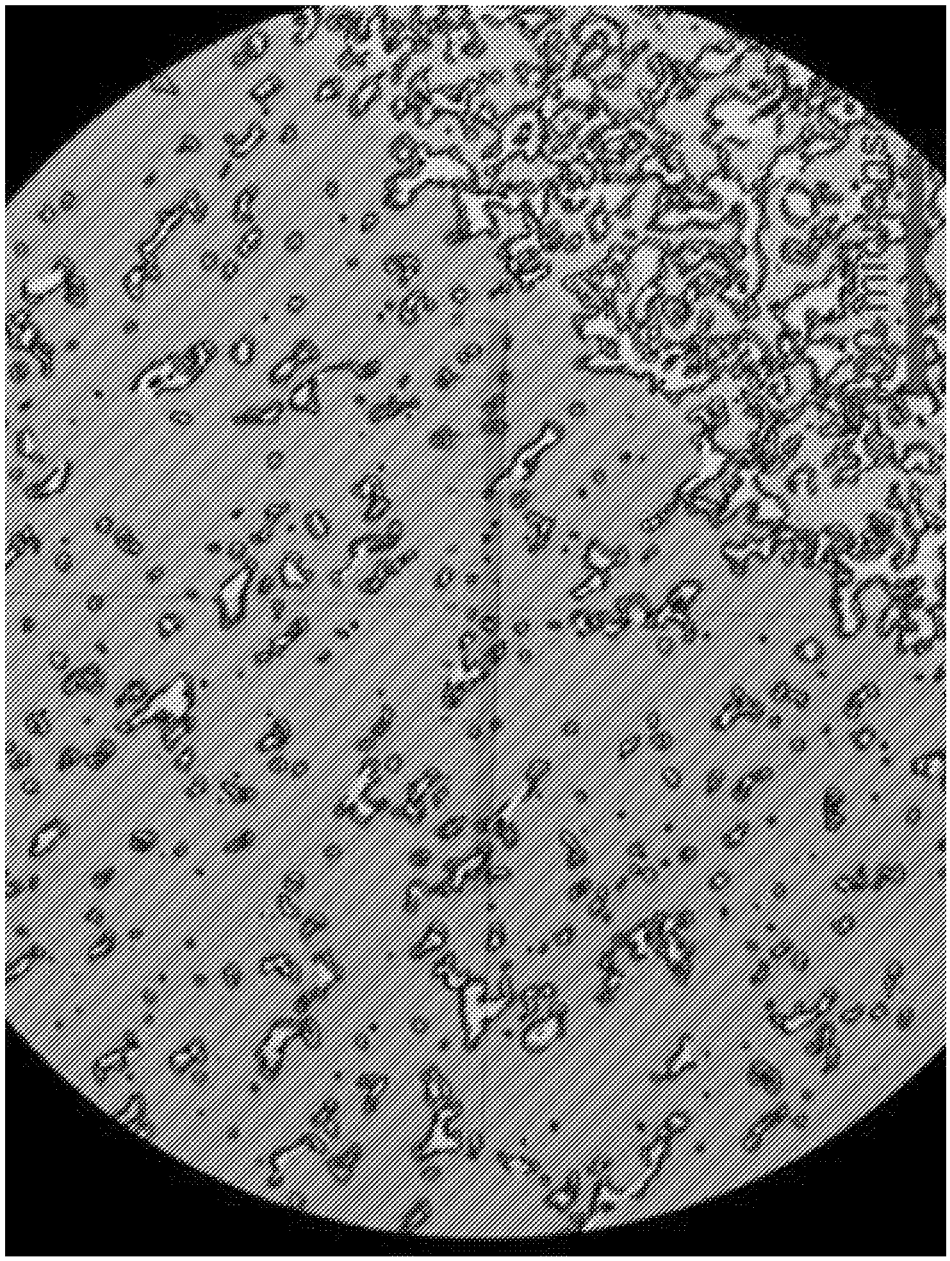
FIG. 46 shows an example of an LCP layer having LTD nucleated on lower tilt grating lines in accordance with another embodiment of the instant invention.

The resulting LCP layer included an upper area having a grating with 5 micron wide lines, alternating in tilt angle (e.g., corresponding to alternating doses of 20 and 120 mJ/cm$^2$), and a lower area with randomly distributed LTD (e.g., corresponding to a single dose of 20 mJ/cm$^2$). Referring to FIG. 46, the darker grating lines correspond to the 120 mJ/cm$^2$ dose, and therefore have the highest tilt, whereas the brighter grating lines correspond to the 20 mJ/cm$^2$ dose, and thus have a lower tilt than the 120 mJ/cm$^2$ dose lines. Notably, the LTD appear to preferentially form on the low dose grating lines. In particular, it is evident that smaller-sized LTD have nucleated only on the brighter 20 mJ/cm$^2$ dose lines. Some larger-sized LTD, however, have been found to bridge across 120 mJ/cm$^2$ lines, between two or more 20 mJ/cm$^2$ dose lines.

Advantageously, LCP layers exhibiting the LTD bridging effect have potential in applications where a pseudo-random distribution of three or more LCP tilt angles is required, and/or where the range of available tilt angles without LTD is insufficient. For example, in one embodiment an LPP layer is exposed to a pattern of alternating small features, for example as in a microscopic checker-board pattern, where the alternating features are alternately exposed to high and low LPUV doses. In this case, the process is optimized to cause LTD to randomly nucleate on some proportion of the low dose features, and for some of those LTD to bridge to other nearby low dose features.

In other embodiments, LTD bridging is reduced and/or eliminated by increasing the width of the high dose features, increasing the width of the low dose features, or increasing the dose applied to the low dose lines in order to decrease the size and area density of the LTD.

Many applications for LCP layers having spatially varying tilt angle, and in particular, having LTD, are envisioned. For example, in one embodiment, an LCP layer having a spatially varying tilt angle is used to reduce speckle in a laser illumination system.

Laser illumination systems are commonly used in projection displays to provide high power illumination and saturated color. However, while lasers provide bright images with good color, the image quality can be degraded due to speckle. Speckle arises when coherent light is reflected from a rough or dusty surface, or propagates through a medium with random refractive index variations. More specifically, it arises when the reflected light, which includes multiple beams with differential delays greater than the wavelength of light, interfere at the detector (e.g. human eye, or square law photodetector). This interference provides an uneven, random, fluctuation of light intensity commonly referred to as a speckle pattern.

In projection displays, speckle generally originates when the light reflects off of the display screen, which typically has a surface roughness greater than one quarter of the wavelength of the laser light. The resulting random spatial interference of the reflected laser light produces a speckle pattern that significantly degrades the quality of the image (e.g., making it appear grainy and/or less sharp). In addition, depending on the view point, the speckle pattern may change due to the different characteristics of relative phase delays in a given direction. As a result, the image being observed changes with view point and the optical system fails to reliably recreate a high fidelity image.

While refractive index variation, dust on optical components, and screen roughness all cause speckle, the effect is typically only a significant problem when a coherent light source, such as a laser, is used. There are several ways to reduce/destroy the coherence of the laser output so that the display is not susceptible to image quality degradation. One approach is to increase the number of longitudinal modes, so that the speckle patterns from multiple wavelengths average to a smooth profile. Another approach is to tile an array of coherent laser diodes (LD), which provides for a spatially incoherent illumination. Unfortunately, this provision of wavelength diversity is an expensive approach (i.e., many miniature projectors typically rely on a single LD chip to output tens of lumens illumination). Yet another approach is to create polarization diversity in the laser illumination. For example, one laser beam can be split into two polarizations, with the first polarization being allowed through a PBS and a second polarization delayed by greater than the coherence length of the laser. Unfortunately, this approach is bulky and has limited speckle contrast reduction.

Apart from changing the laser diode (LD) arrangement (i.e., decreasing spatial coherence) or manipulating the laser device characteristics (i.e., providing polarization and wavelength diversities) to reduce the spatial and temporal coherence of the laser beam, an alternate approach is to create many small grains of varied boiling speckle patterns which shift through the XY plane in time and allow for temporal averaging for the detector (i.e., eye) to reduce intensity non-uniformity. This approach typically requires an external optical element, such as a diffuser [J. W. Goodman et al., "Speckle reduction by a moving diffuser in laser projection displays," Annual Meeting of the Optical Society of America, Rhode Island, 2000], a phase plate [U.S. Pat. Nos. 6,323,984 and 06,747,781], or a random diffractive optical element [L. Wang et al., Speckle reduction in laser projection systems by diffractive optical element," Appl. Opt. 37, pp. 177-1775, 1998], which are vibrated or spun to yield multiple phase delays for each XY site over time.

In U.S. patent application Ser. No. 12/424,168, for Retarder-based Despeckle Device for Laser Illumination Systems, which is hereby incorporated by reference, Tan et al. propose another approach to creating many varied boiling speckle patterns using an actuatable waveplate element. In particular, the actuatable waveplate element produces the varied speckle patterns by providing a variable phase modulation generated by the mechanical agitation and/or electronic switching of a near half-wave optical retarder, which has a spatially varied slow axis orientation including a plurality of vortices (i.e., the tilt angle is constant, but the azimuthal angle varies across the surface of the retarder).

In accordance with one embodiment of the instant invention, the LCP layer having a spatially varying tilt angle is used to create a random phase diffuser used to reduce speckle in laser projection systems.

Figure 47:
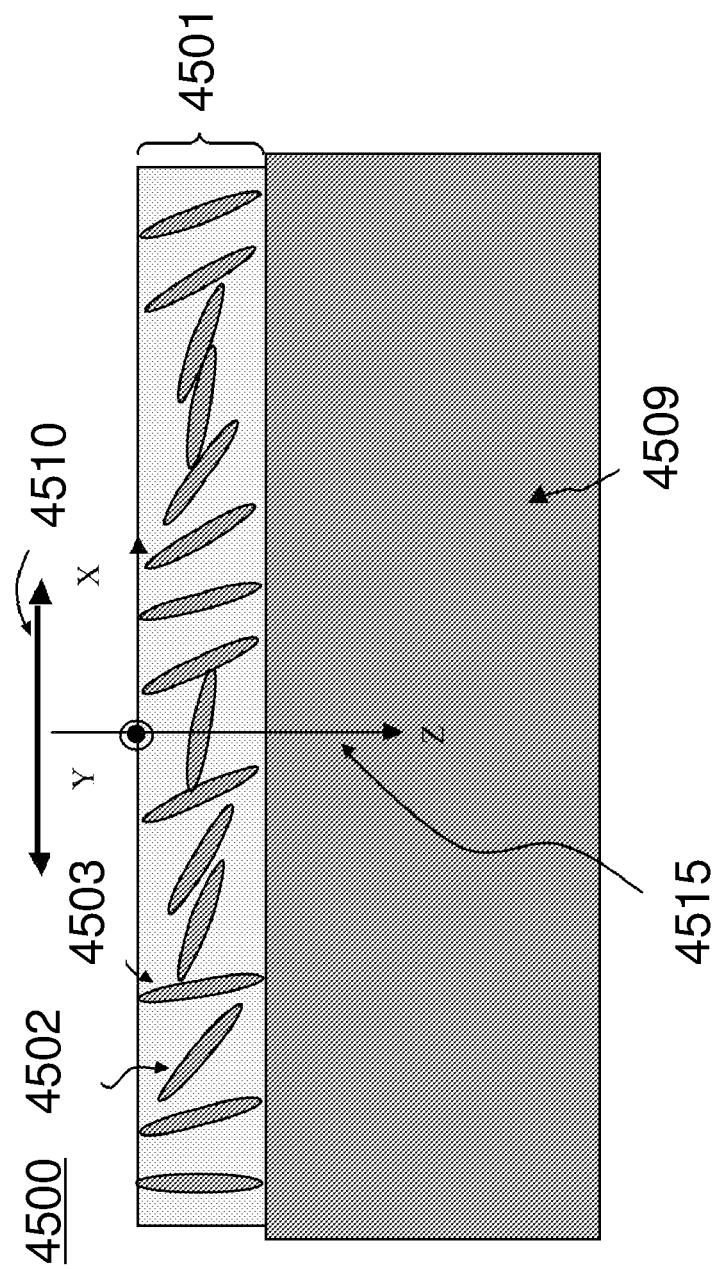
FIG. 47 is a schematic diagram showing a LD device having a random tilt angle and a uniform azimuthal orientation.

Referring to FIG. 47, there is shown an example of a randomly tilted liquid crystal device forming the random phase diffuser. The device 4500 includes a variable tilt LC layer 4501 disposed on a substrate 4509. The LC layer 4501 includes a plurality of differently tilted directors, two of which are shown as 4502 and 4503. For illustrative purposes, the LC layer 4501 is shown parallel to the XY plane, while the incident light propagates parallel to the the Z-axis 4515. The plane of tilt for the LC molecules is parallel to XZ plane. The input linear polarization 4510 is aligned to the plane of tilt.

Figure 48:
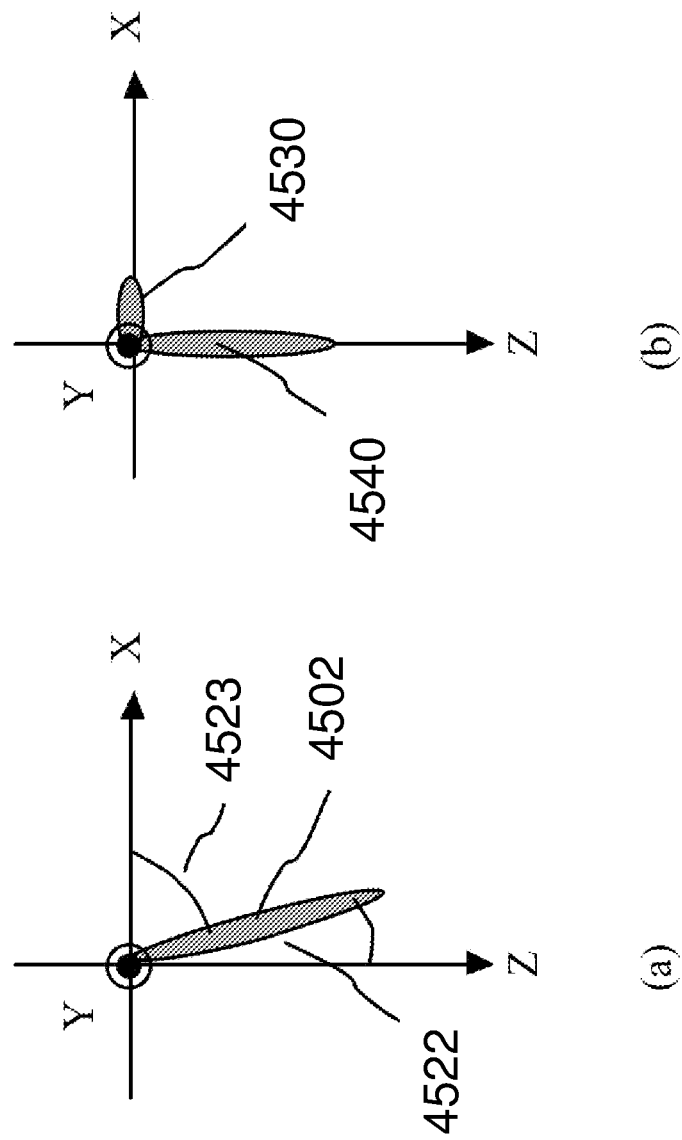
FIG. 48 shows the projection of a uniaxial O-plate director in (a) into in-plane and out-of-plane birefringence components in (b)
Figure 49:
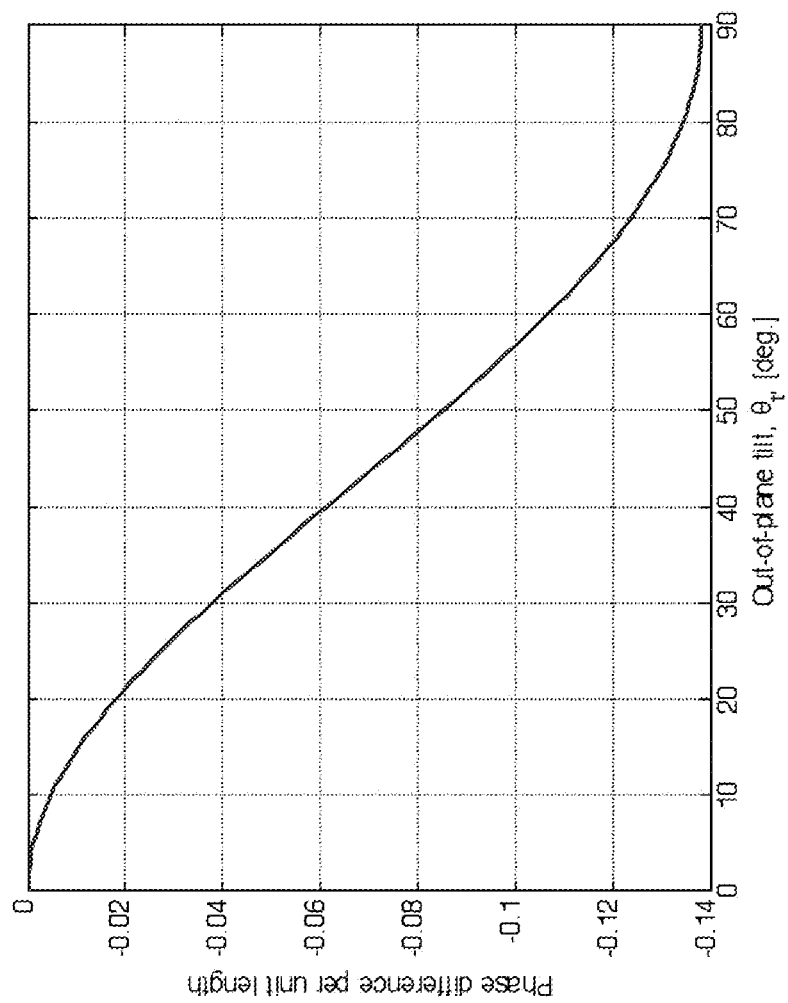
FIG. 49 is a plot illustrating the phase difference of a given LC director tilt as compared to an A-plate configured pixel using of an LCP uniaxial material at λ=400 nm.

Without loss of generality, a single encoding element is represented by an LC director inclined at an angle with respect to the Z-axis and contained within the XZ plane. Referring to FIG. 48, the birefringence of this LC director, which has uniaxial O-plate birefringence as shown in (a), can be projected into in-plane and out-of-plane birefringence components as shown in (b). More specifically, the LC director 4502 forms a polar angle offset 4522 $\theta_c$ with the Z-axis, whereas the out-of-plane tilt 4523 $\theta_t$ is given by $\pi/2 - \theta_c$. In the extreme cases, the LC alignment has A-plate symmetry ($\theta_t=0$ degrees) or C-plate symmetry ($\theta_t=90$ degrees). From the quadratic equations describing the index ellipsoid, the in-plane $n_a$ and out-of-plane $n_c$ effective indices are represented by the projection onto the XY-plane 4530 and projection along the Z-axis 4540. These effective indices are given by, $$\frac{1}{[n_A(\theta_t;\lambda)]^2} = \frac{\cos^2(\theta_t)}{[n_e(\lambda)]^2} + \frac{\sin^2(\theta_t)}{[n_o(\lambda)]^2}, \quad (10)$$

and $$\frac{1}{[n_C(\theta_t;\lambda)]^2} = \frac{\sin^2(\theta_t)}{[n_e(\lambda)]^2} + \frac{\cos^2(\theta_t)}{[n_o(\lambda)]^2}, \quad (11)$$

where $n_e(\lambda)$ and $n_o(\lambda)$ are the dispersion of the extraordinary and ordinary indices of the uniaxial material. In terms of advancing phase, relative to an A-plate aligned pixel ($\theta_t=0$), Eq. (10) gives a non-linear increase of phase ramp with increase of out-of-plane tilt. The phase difference relative to an A-plate configured pixel (i.e., $n_a(\theta_t;\lambda) - n_e(\lambda)$) is plotted in FIG. 49. From the plot, an encoding pixel, aligned with the LC tilt at ~56.7°, yields a phase difference per unit length of −0.1. In other words, a 2 mm pixel height provides for 200 nm phase advance relative to the A-plate pixel. This gives the required $\pi$ phase step at $\lambda=400$ nm.

In this manner, the relative phase delay through each microscopic LC domain is made to be dependent on the out-of-plane tilt of the LC molecules. This is pure phase modulation. The constant amplitude term at each XY site can be neglected. The complex amplitude of each phase cell partition, arriving at the detector resolution is given by, $$A_{ij}(x,y;t) = \exp[j\phi_{ij}(x,y;t;\theta_t)]. \quad (12)$$

Figure 50:
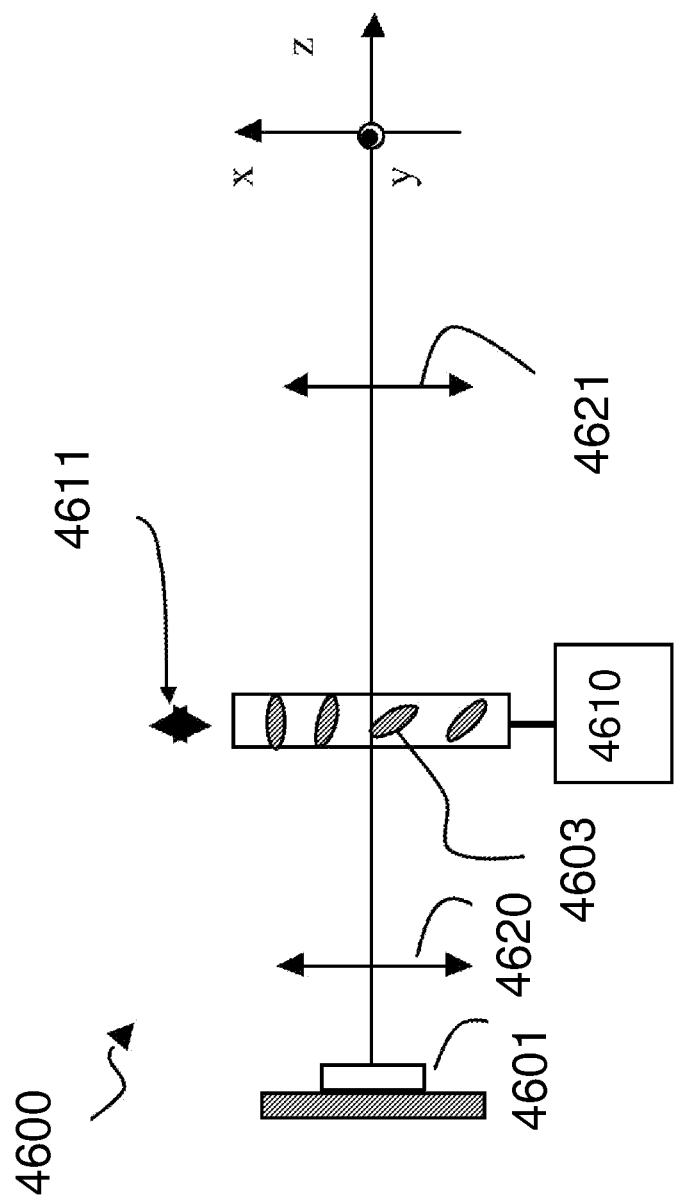
FIG. 50 is a schematic diagram illustrating a sub-system of a laser based illumination system including a phase cell with XY random LC director polar tilt, for reducing speckle by temporally vary the phase modulation at each XY site.

In order for the spatially varying tilt LC layer to function as a random modulation device for reducing speckle, the tilt angle is typically varied in time in order to create an active diffuser. Referring to FIG. 50, a sub-system 4600 of a projection system including an actuated active diffuser for applying the random modulation to sub-resolution beams is shown. In particular, the sub-system 4600 includes a coherent laser source 4601 having a linear output polarization 4620. The diffuser 4603 includes a LC retarder having randomly tilted micro-domains. For illustrative purposes, the projection of the LC director is shown along the device cross-section at different XY sites. The diffuser 4603 is translated in time by an actuator 4610 (e.g., electronics/opto-mechanics). Each optical stream propagates as e-wave in this configuration. As such, the output polarization is unchanged, as shown by the linear polarization 4621. The diffuser creates temporal modulation differences within each interval of the detector. In this example, the active diffuser is linearly translated along the LC director tilt plane, as shown by the arrow of 4611. The laser beam propagates along Z-direction. By randomly presenting varying phase of light beams to each sub-resolution area over one detector integration time, a series of uncorrelated or partially correlated speckle patterns are created at the detector. The averaging over sub-resolution areas and over time enables the intensity non-uniformity to be reduced.

The laser-based illumination sub-system depicted in FIG. 50 can be incorporated into display systems utilizing both an intensity modulation panel (e.g., DLP) and polarization-based modulation panels (e.g., transmissive LCD or reflective LC on silicon). Since the random diffuser can be fabricated such that the tilt angle is spatially varied while the fast axis is constant, the random diffuser advantageously preserves the state of polarization in the illumination, and thus is ideal for polarization-based systems. In the intensity based display system, the polarization output of the laser illumination and active diffuser does not need to be preserved. In each case, the fabricating the despeckle device to have LTD advantageously provides a variation in tilt angle on a scale ideal for reducing the perceived speckle pattern in laser illumination systems. For example, in general the average width of the LTD is typically less than 100 microns, often between 5 and 10 microns. Of course, LTDs having a smaller or larger width are both possible and envisaged.

In yet another embodiment of the instant invention, the spatially varying tilt retarders are used to form polarizing holograms, as for example, disclosed in US Pat. Appl. No. 20090009668, which is hereby incorporated by reference. In yet other embodiments, the spatially varying tilt retarders are used in optical trapping, optical tweezer, or optical coherence tomography applications.

Of course, the above embodiments have been provided as examples only. It will be appreciated by those of ordinary skill in the art that various modifications, alternate configurations, and/or equivalents will be employed without departing from the spirit and scope of the invention. In particular, the methods of forming LTD using sufficiently low dosage of LPUV light can be combined with any of the other methods of forming spatially varying tilt layers. In addition, while the LPP/LCP system described above has been shown to provide the LTD (e.g., the plurality of discrete regions), other O-plate LPP/LCP systems are expected to provide similar results with similar LPUV doses. Accordingly, the scope of the invention is therefore intended to be limited solely by the scope of the appended claims.

The invention claimed is:

1. A method of fabricating an optical element comprising:
   a) coating a substrate with a linearly photopolymerizable polymer layer;
   b) irradiating the linearly photopolymerizable polymer layer with linearly polarized ultra-violet light at an oblique angle;
   c) coating a layer of liquid crystal material on a surface of the irradiated linearly photopolymerizable polymer layer;
   wherein an out-of-plane tilt angle of liquid crystal directors in the liquid crystal material is dependent on a total dose of the linearly polarized ultra-violet light; and
   wherein the linearly polarized ultra-violet light is selected to induce the out-of-plane tilt angle of the liquid crystal directors in the liquid crystal material to vary across a surface of the liquid crystal material layer; and
   d) irradiating the layer of liquid crystal material to form a liquid crystal polymer film, the liquid crystal polymer film including a plurality of liquid crystal directors aligned parallel to a first plane, the first plane perpendicular to a surface of the liquid crystal polymer film.

2. A method of fabricating an optical element according to claim 1, wherein the out-of-plane tilt of the liquid crystal directors in the liquid crystal polymer film varies across the surface of the liquid crystal material layer in a predetermined pattern.

3. A method of fabricating an optical element according to claim 2, wherein the predetermined pattern is selected such that the liquid crystal polymer film forms a polarization-selective phase hologram, whereby linearly polarized light having a first polarization is transmitted through first and second spatially distinct regions of the liquid crystal polymer film with a relative phase delay to provide a non-zeroth order diffraction output, and linearly polarized light having a second polarization is transmitted through the first and second spatially distinct regions with substantially zero relative phase delay to provide a zeroth order diffraction output, the first polarization parallel to the first plane, the second polarization orthogonal to the first polarization, the first region including a first liquid crystal director, the second region including a second liquid crystal director, the first and second liquid crystal directors having different out-of-plane tilts.

4. A method of fabricating an optical element according to claim 1, wherein the linearly polarized ultra-violet light includes at least one exposure of linearly polarized ultra-violet light that provides a spatially varying energy density to the linearly photopolymerizable polymer layer such that an out-of-plane tilt of the liquid crystal directors in the liquid crystal material varies across the surface of the liquid crystal material layer in a predetermined pattern.

5. A method of fabricating an optical element according to claim 4, wherein the at least one exposure of linearly polarized ultra-violet light that provides a spatially varying energy density to the linearly photopolymerizable polymer layer is provided by moving at least one of a photomask and the substrate.

6. A method of fabricating an optical element comprising:
   a) coating a substrate with a linearly photopolymerizable polymer layer;
   b) irradiating the linearly photopolymerizable polymer layer with linearly polarized ultra-violet light at an oblique angle;
   c) coating a layer of liquid crystal material on a surface of the irradiated linearly photopolymerizable polymer layer;
   wherein an out-of-plane tilt angle of liquid crystal directors in the liquid crystal material is dependent on a total dose of the linearly polarized ultra-violet light; and
   wherein the linearly polarized ultra-violet light is selected to induce the out-of-plane tilt angle of the liquid crystal directors in the liquid crystal material to vary across a surface of the liquid crystal material layer; and
   wherein the linearly polarized ultra-violet light includes at least one dose of linearly polarized ultra-violet light selected to induce formation of a plurality of discrete regions within the liquid crystal layer that are randomly distributed, each discrete region having a larger in-plane birefringence than an adjacent region.

7. A method of fabricating an optical element comprising:
   a) coating a substrate with a linearly photopolymerizable polymer layer;
   b) irradiating the linearly photopolymerizable polymer layer with linearly polarized ultra-violet light at an oblique angle;
   c) coating a layer of liquid crystal material on a surface of the irradiated linearly photopolymerizable polymer layer;
   wherein an out-of-plane tilt angle of liquid crystal directors in the liquid crystal material is dependent on a total dose of the linearly polarized ultra-violet light; and
   wherein the linearly polarized ultra-violet light is selected to induce the out-of-plane tilt angle of the liquid crystal directors in the liquid crystal material to vary across a surface of the liquid crystal material layer; and
   wherein the linearly polarized ultra-violet light includes at least one dose of linearly polarized light sufficiently low to induce formation of a plurality of regions within the liquid crystal layer that are randomly distributed, each of the randomly distributed regions having a larger in-plane birefringence than an adjacent region.

8. A method of fabricating an optical element including a liquid crystal layer having a spatially-varying tilt angle, the method comprising the steps of:
   a) coating a substrate with a linearly photopolymerizable polymer layer;
   b) irradiating the linearly photopolymerizable polymer layer with linearly polarized ultra-violet light at an oblique angle; and,
   c) coating a layer of liquid crystal material on a surface of the irradiated linearly photopolymerizable polymer layer,
   wherein an out-of-plane tilt of liquid crystal directors in the liquid crystal material is dependent on a total dose of the linearly polarized ultra-violet light, and wherein the linearly polarized ultra-violet light is selected to induce formation of a plurality of discrete regions within the liquid crystal layer, each discrete region having a larger in-plane birefringence than an adjacent region.

9. A method according to claim 8, wherein the liquid crystal material includes a liquid crystal polymer precursor, and comprising the step of:
   d) irradiating the liquid crystal layer having the plurality of discrete regions with ultra-violet light to form a liquid crystal polymer.

10. A method according to claim 9, wherein step b) comprises:
   irradiating the linearly photopolymerizable polymer layer with a first dose of linearly polarized ultra-violet light; and
   irradiating the linearly photopolymerizable polymer layer with a second dose of linearly polarized ultra-violet light through a photomask.

11. A method according to claim 10, wherein the photomask includes at least two discrete regions of different levels of transmission for the linearly polarized ultraviolet light.

12. A method according to claim 10, wherein the photomask is a variable transmission mask having continuously varying transmission for the linearly polarized ultraviolet light.

13. A method according to claim 10, wherein the photomask is a grating photomask.

14. A method according to claim 10, wherein the first dose and the second dose are provided with linearly polarized light having different azimuthal orientations relative to the substrate.

15. A method according to claim 8, wherein step b) comprises:
   irradiating the linearly photopolymerizable polymer layer with a first dose of linearly polarized ultra-violet light; and
   irradiating the linearly photopolymerizable polymer layer with a second dose of linearly polarized ultra-violet light through a photomask.

16. A method according to claim 15, wherein step b) comprises:
   moving at least one of the photomask and the substrate while irradiating the linearly photopolymerizable polymer layer with the second dose of linearly polarized ultra-violet.

17. A method according to claim 8, wherein the plurality of discrete regions within the liquid crystal layer have a first in-plane birefringence, the adjacent region has a second other in-plane birefringence, and wherein the plurality of discrete regions within the liquid crystal layer and the adjacent region have a same slow axis azimuthal orientation.

18. A method according to claim 8, wherein the substrate includes one of an ultra-violet anti-reflection coating and an ultra-violet absorbing coating disposed on a back surface of the substrate.

19. A method according to claim 8, wherein the linearly polarized ultra-violet light includes at least one dose that is less than 40 mJ/cm$^2$.

20. A method according to claim 8, wherein the linearly polarized ultra-violet light includes at least one dose that is less than 30 mJ/cm$^2$.

21. A method according to claim 8, wherein the plurality of discrete regions are randomly or pseudo-randomly distributed.

22. A method according to claim 8, wherein the optical element is for reducing speckle in a laser illumination system.

23. A method according to claim 8, wherein there is a predetermined relationship between tilt angle of the liquid crystal material and total dose of linearly polarized ultra-violet light aligning the linearly photopolymerizable polymer layer, the predetermined relationship including at least one of an increasing and a decreasing out-of-plane tilt of the liquid crystal directors with increasing total dose of the linearly polarized ultra-violet light aligning the linearly photopolymerizable polymer layer.

24. A method according to claim 8, wherein the linearly polarized ultra-violet light includes a uniform dose of linearly polarized ultra-violet light sufficiently low to induce a the plurality of discrete regions to be randomly distributed within the liquid crystal layer.

* * * * *